(12) United States Patent
Narayanaswamy et al.

(10) Patent No.: US 12,452,310 B2
(45) Date of Patent: *Oct. 21, 2025

(54) SYNTHETIC REQUEST INJECTION FOR REAL-TIME CLOUD SECURITY POSTURE MANAGEMENT

(71) Applicant: Netskope, Inc., Santa Clara, CA (US)

(72) Inventors: Krishna Narayanaswamy, Saratoga, CA (US); David Tze-Si Wu, Fremont, CA (US); Prasenna Ravi, Thanjavur (IN)

(73) Assignee: Netskope, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,976

(22) Filed: Feb. 16, 2024

(65) Prior Publication Data

US 2024/0195840 A1 Jun. 13, 2024

Related U.S. Application Data

(63) Continuation of application No. 18/163,761, filed on Feb. 2, 2023, now Pat. No. 11,943,260.

(Continued)

(51) Int. Cl.
  H04L 9/40 (2022.01)
(52) U.S. Cl.
  CPC .......... H04L 63/20 (2013.01); H04L 63/0263 (2013.01); H04L 63/104 (2013.01)
(58) Field of Classification Search
  CPC .... H04L 63/20; H04L 63/0263; H04L 63/104
  See application file for complete search history.

(56) References Cited

U.S. PATENT DOCUMENTS

| | | |
|---|---|---|
| 5,440,723 A | 8/1995 | Arnold et al. |
| 6,513,122 B1 | 1/2003 | Magdych et al. |

(Continued)

FOREIGN PATENT DOCUMENTS

| | | |
|---|---|---|
| CN | 112199296 A | 1/2021 |
| CN | 112464250 A | 3/2021 |
| EP | 1063833 A2 | 12/2000 |

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

(Continued)

*Primary Examiner* — Oleg Korsak

(57) ABSTRACT

The technology disclosed describes a network security system (NSS) for managing cloud security posture. The NSS uses synthetic request injection to determine a security posture of a resource hosted on a cloud application for policy enforcement. The NSS receives an incoming request from a client directed toward a resource hosted on a cloud application during an application session. The NSS holds the incoming request, generates the synthetic request, and transmits the synthetic request to the cloud application. The synthetic request is designed to retrieve information specifying the security posture of the resource from the cloud application using the resource identifier. The NSS receives a response to the synthetic request from the cloud application that supplies the information specifying the security posture of the resource. The NSS applies a policy on the incoming request based on the security posture information.

20 Claims, 29 Drawing Sheets

Related U.S. Application Data

(60) Provisional application No. 63/306,074, filed on Feb. 2, 2022, provisional application No. 63/306,070, filed on Feb. 2, 2022, provisional application No. 63/306,058, filed on Feb. 2, 2022.

(56) References Cited

U.S. PATENT DOCUMENTS

| | | | |
|---|---|---|---|
| 6,622,248 | B1 | 9/2003 | Hirai |
| 7,080,408 | B1 | 7/2006 | Pak et al. |
| 7,298,864 | B2 | 11/2007 | Jones |
| 7,376,719 | B1 | 5/2008 | Shafer et al. |
| 7,735,116 | B1 | 6/2010 | Gauvin |
| 7,966,654 | B2 | 6/2011 | Crawford |
| 8,000,329 | B2 | 8/2011 | Fendick et al. |
| 8,296,178 | B2 | 10/2012 | Hudis et al. |
| 8,793,151 | B2 | 7/2014 | DelZoppo et al. |
| 8,839,417 | B1 | 9/2014 | Jordan |
| 9,197,601 | B2 | 11/2015 | Pasdar |
| 9,225,734 | B1 | 12/2015 | Hastings |
| 9,231,968 | B2 | 1/2016 | Fang et al. |
| 9,280,678 | B2 | 3/2016 | Redberg |
| 9,811,662 | B2 | 11/2017 | Sharpe et al. |
| 10,084,825 | B1 | 9/2018 | Xu |
| 10,237,282 | B2 | 3/2019 | Nelson et al. |
| 10,334,442 | B2 | 6/2019 | Vaughn et al. |
| 10,382,468 | B2 | 8/2019 | Dods |
| 10,484,334 | B1 | 11/2019 | Lee et al. |
| 10,826,941 | B2 | 11/2020 | Jain et al. |
| 11,032,301 | B2 | 6/2021 | Mandrychenko et al. |
| 11,036,856 | B2 | 6/2021 | Graun et al. |
| 11,281,775 | B2 | 3/2022 | Burdett et al. |
| 11,755,947 | B1 | 9/2023 | Hernandez Munuera et al. |
| 11,943,260 | B2 * | 3/2024 | Narayanaswamy .. H04L 63/104 |
| 2002/0099666 | A1 | 7/2002 | Dryer et al. |
| 2003/0055994 | A1 | 3/2003 | Herrmann et al. |
| 2003/0063321 | A1 | 4/2003 | Inoue et al. |
| 2003/0172292 | A1 | 9/2003 | Judge |
| 2003/0204632 | A1 | 10/2003 | Willebeek-LeMair et al. |
| 2004/0015719 | A1 | 1/2004 | Lee et al. |
| 2005/0010593 | A1 | 1/2005 | Fellenstein et al. |
| 2005/0271246 | A1 | 12/2005 | Sharma et al. |
| 2006/0156401 | A1 | 7/2006 | Newstadt et al. |
| 2007/0204018 | A1 | 8/2007 | Chandra et al. |
| 2007/0237147 | A1 | 10/2007 | Quinn et al. |
| 2008/0069480 | A1 | 3/2008 | Aarabi et al. |
| 2008/0134332 | A1 | 6/2008 | Keohane et al. |
| 2009/0144818 | A1 | 6/2009 | Kumar et al. |
| 2009/0249470 | A1 | 10/2009 | Litvin et al. |
| 2009/0300351 | A1 | 12/2009 | Lei et al. |
| 2010/0017436 | A1 | 1/2010 | Wolge |
| 2011/0119481 | A1 | 5/2011 | Auradkar et al. |
| 2011/0145594 | A1 | 6/2011 | Jho et al. |
| 2012/0278896 | A1 | 11/2012 | Fang et al. |
| 2013/0159694 | A1 | 6/2013 | Chiueh et al. |
| 2013/0298190 | A1 | 11/2013 | Sikka et al. |
| 2013/0347085 | A1 | 12/2013 | Hawthorn et al. |
| 2014/0013112 | A1 | 1/2014 | Cidon et al. |
| 2014/0068030 | A1 | 3/2014 | Chambers et al. |
| 2014/0068705 | A1 | 3/2014 | Chambers et al. |
| 2014/0259093 | A1 | 9/2014 | Narayanaswamy et al. |
| 2014/0282843 | A1 | 9/2014 | Buruganahalli et al. |
| 2014/0359282 | A1 | 12/2014 | Shikfa et al. |
| 2014/0366079 | A1 | 12/2014 | Pasdar |
| 2015/0100357 | A1 | 4/2015 | Seese et al. |
| 2015/0128103 | A1 | 5/2015 | Stratton et al. |
| 2016/0323318 | A1 | 11/2016 | Terrill et al. |
| 2016/0350145 | A1 | 12/2016 | Botzer et al. |
| 2017/0064005 | A1 | 3/2017 | Lee |
| 2017/0093917 | A1 | 3/2017 | Chandra et al. |
| 2017/0250951 | A1 | 8/2017 | Wang et al. |
| 2018/0367575 | A1 | 12/2018 | Narayanaswamy et al. |
| 2020/0050686 | A1 | 2/2020 | Kamalapuram et al. |
| 2020/0379874 | A1 | 12/2020 | Lu |

OTHER PUBLICATIONS

Huckaby, Jeff "Ending Clear Text Protocols," Rackaid.com, Dec. 9, 2008, 3 pgs.

Newton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.

Mccullagh, Declan, "How safe is instant messaging? A security and privacy survey," CNET, Jun. 9, 2008, 14 pgs.

Beck et al., "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54/.

Zetter, Kim, "Revealed: The Internet's Biggest Security Hole," Wired, Aug. 26, 2008, 13 pgs.

Adya et al., "Farsite: Federated, available, and reliable storage for an incompletely trusted environment," SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

Downing et al., Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html#:~:text=mode of communication.- ,What are the different email protocols%3F,and also has defined functions.

Niit, Special Edition Using Storage Area Networks, Que, 2002, 6 pgs.

Chapple, Mike, "Firewall redundancy: Deployment scenarios and benefits," TechTarget, 2005, 5 pgs. available at https://www.techtarget.com/searchsecurity/tip/Firewall-redundancy-Deployment-scenarios-and-benefits?Offer=abt_pubpro_AI-Insider.

Fortinet, FortiGate—3600 User Manual (vol. 1, Version 2.50 MR2) Sep. 5, 2003, 329 pgs.

Fortinet, FortiGate SOHO and SMB Configuration Example, (Version 3.0 MR5), Aug. 24, 2007, 54 pgs.

Fortinet, FortiSandbox—Administration Guide, (Version 2.3.2), Nov. 9, 2016, 191 pgs.

Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.

Fortinet, FortiOS—Administration Guide, (Versions 6.4.0), Jun. 3, 2021, 1638 pgs.

Heady et al., "The Architecture of a Network Level Intrusion Detection System," University of New Mexico, Aug. 15, 1990, 21 pgs.

Kephart et al., "Fighting Computer Viruses," Scientific American (vol. 277, No. 5) Nov. 1997, pp. 88-93.

Wang, L., Chapter 5: Cooperative Security in D2D Communications, "Physical Layer Security in Wireless Cooperative Networks," 41 pgs. first online on Sep. 1, 2017 at https://link.springer.com/chapter/10.1007/978-3-319-61863-0_5.

(56) References Cited

OTHER PUBLICATIONS

Lee et al., "A Data Mining Framework for Building Intrusion Detection Models," Columbia University, n.d. 13 pgs.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al., "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs.
Song et al., "Practical techniques for searches on encrypted data," In Proceeding 2000 IEEE symposium on security and privacy. S&P 2000, May 2000, pp. 44-55.
Dean, Tamara, Guide to Telecommunications Technology, Course Technology, 2003, 5 pgs.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.
Tittel, Ed, Unified Threat Management For Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.
U.S. Appl. No. 17/696,785—Non-Final Office Action, dated Oct. 1, 2024, 16 pages.
U.S. Appl. No. 17/721,268 Non-Final Office Action mailed Dec. 23, 2024, 16 pages.
Extended European Search Report for Application No. 22792499.0, mailed Feb. 12, 2025, 8 pages.

* cited by examiner

```
"response": {
    "status_code": 401,
    "status_msg": "Unauthorized",
    "close_connection": false,
    "add_contentlength": true,
    "response_hdrs": [{
        "name": "Content-Type",
        "value": "application/json; charset=UTF-8"
    },{
        "name": "XContent-Type-Options",
        "value": "nosniff"
    },{
        "name": "Server",
        "value": "GSE"
    }
    ],
    "response_body": "{\"error\":{\"errors\":[{\"domain\":\"global\",\"reason\":\"authError\",\"message\":\"Invalid Credentials\",\"locationType\":\"header\",\"location\":\"Authorization\"}],\"code\":401,\"message\":\"Invalid Credentials\"}}"
}
```

401 App-Expected Response 532

Figure 6

```
                                                      People Token Request 546
"request": {
        "method": "POST",
        "url": "https://oauthaccountmanager.googleapis.com/v1/issuetoken",
        "fixedhdrs": [ "User-Agent" ],
        "dynamichdrs": [{
                "name": "Accept",
                "value": "*/*"
        },
        {
        "name": "Host",
        "value": "oauthaccountmanager.googleapis.com"
        },
        {
        "name": "Accept-Language",
        "value": "en-us"
        },
        {
        "name": "Accept-Encoding",
        "value": "br,
        gzip, deflate"
        },
        {
        "name": "Content-Type",
        "value": "application/x-www-form-urlencoded"
        },
        {
        "name": "Authorization",
        "value": "Bearer {{master_token}}"
        }
        ],
        "request_body":
        "client_id=936475272427.apps.googleusercontent.com&device_id=
        {{device_id}}&hl=en-IN&lib_ver=3.
        3&passcode_present=YES&response_type=token&scope=https%3A%2F%
        2Fwww.googleapis.com%2Fauth%2Fpeopleapi.readonly"
        }
        }
```

Figure 7

Synthetic Request 568

```
"request": {
    "method": "GET",
    "url": "https://people-pa.
googleapis.com/v2/people?person_id=me&request_mask.
include_container=ACCOUNT&request_mask.
include_container=PROFILE&request_mask.
include_container=DOMAIN_PROFILE&request_mask.include_field.
paths=person.cover_photo&request_mask.include_field.paths=person.
email&request_mask.include_field.paths=person.photo&request_mask.
include_field.paths=person.metadata&request_mask.include_field.
paths=person.name&request_mask.include_field.paths=person.
read_only_profile_info&request_mask.include_field.paths=person.
read_only_profile_info.customer_info",
    "fixedhdrs": [ "User-Agent" ],
    "dynamichdrs": [{
        "name": "Accept",
        "value": "*/*"
    },
    {
        "name": "Host",
        "value": "people-pa.googleapis.com"
    },
    {
        "name": "Accept-Language",
        "value": "en-us"
    },
    {
        "name": "Accept-Encoding",
        "value": "br, gzip, deflate"
    },
    {
        "name": "Authorization",
        "value": "Bearer {{people_token}}"
    }
```

Figure 8

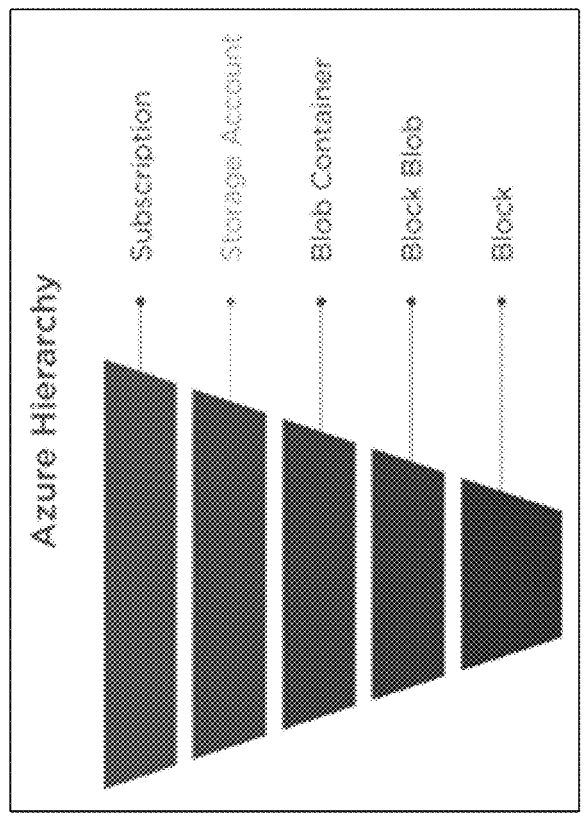
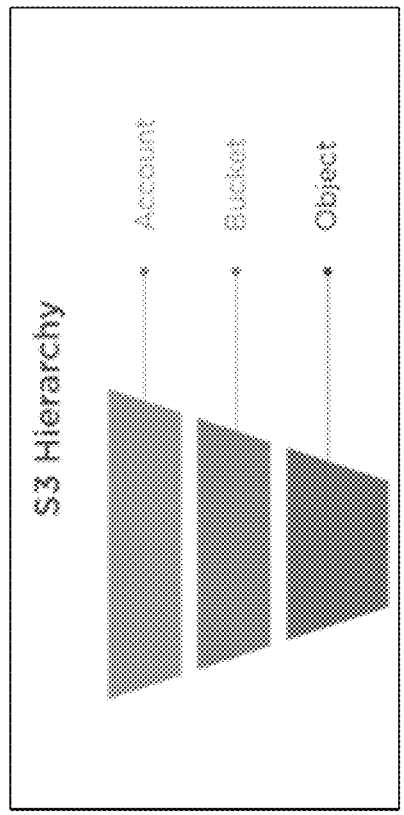
Figure 24

SYNTHETIC REQUEST INJECTION FOR REAL-TIME CLOUD SECURITY POSTURE MANAGEMENT

RELATED APPLICATIONS

This application is a continuation of and claims priority to U.S. patent application Ser. No. 18/163,761, titled "SYNTHETIC REQUEST INJECTION TO RETRIEVE METADATA FOR CLOUD POLICY ENFORCEMENT," filed Feb. 2, 2023, which is hereby incorporated by reference in its entirety for all purposes.

This application and U.S. patent application Ser. No. 18/163,761 are related to and claim priority to U.S. Provisional Patent Application 63/306,058, titled "SYNTHETIC REQUEST INJECTION TO RETRIEVE GROUP MEMBERSHIP METADATA FOR CLOUD POLICY ENFORCEMENT," filed Feb. 2, 2022, which is hereby incorporated by reference in its entirety for all purposes.

This application and U.S. patent application Ser. No. 18/163,761 are related to and claims priority to U.S. Provisional Patent Application 63/306,070, titled "SYNTHETIC REQUEST INJECTION TO RETRIEVE BUCKET-LEVEL OWNERSHIP METADATA FOR CLOUD POLICY ENFORCEMENT," filed Feb. 2, 2022, which is hereby incorporated by reference in its entirety for all purposes.

This application and U.S. patent application Ser. No. 18/163,761 are related to and claims priority to U.S. Provisional Patent Application 63/306,074, titled "SYNTHETIC REQUEST INJECTION FOR REAL-TIME CLOUD SECURITY POSTURE MANAGEMENT (CSPM)," filed Feb. 2, 2022, which is hereby incorporated by reference in its entirety for all purposes.

This application is related to U.S. patent application Ser. No. 17/237,964, filed Apr. 22, 2021, titled "Synthetic Request Injection to Generate Metadata for Cloud Policy Enforcement," now U.S. Pat. No. 11,178,188 issued Nov. 16, 2021, which is hereby incorporated by reference in its entirety for all purposes.

This application is related to U.S. patent application Ser. No. 17/238,545, filed Apr. 23, 2021, titled "SYNTHETIC REQUEST INJECTION TO GENERATE METADATA AT POINTS OF PRESENCE FOR CLOUD SECURITY ENFORCEMENT," which is hereby incorporated by reference in its entirety for all purposes.

This application is related to U.S. patent application Ser. No. 17/238,563, filed Apr. 23, 2021, titled "DATA FLOW LOGIC FOR SYNTHETIC REQUEST INJECTION FOR CLOUD SECURITY ENFORCEMENT," now U.S. Pat. No. 11,271,972 issued Mar. 8, 2022, which is hereby incorporated by reference in its entirety for all purposes.

This application is related to U.S. patent application Ser. No. 17/238,579, filed Apr. 23, 2021, titled "SYNTHETIC REQUEST INJECTION TO RETRIEVE OBJECT METADATA FOR CLOUD POLICY ENFORCEMENT," now U.S. Pat. No. 11,271,973 issued Mar. 8, 2022, which is hereby incorporated by reference in its entirety for all purposes.

This application is related to U.S. patent application Ser. No. 17/237,877, filed Apr. 22, 2021, titled "SYNTHETIC REQUEST INJECTION TO RETRIEVE EXPIRED METADATA FOR CLOUD POLICY ENFORCEMENT," now U.S. Pat. No. 11,647,052 issued May 9, 2023, which is hereby incorporated by reference in its entirety for all purposes.

This application is related to U.S. patent application Ser. No. 17/237,863, filed Apr. 22, 2021, titled "SYNTHETIC REQUEST INJECTION TO IMPROVE OBJECT SECURITY POSTURE FOR CLOUD SECURITY ENFORCEMENT," now U.S. Pat. No. 11,190,550 issued Nov. 30, 2021, which is hereby incorporated by reference in its entirety for all purposes.

This application is related to U.S. patent application Ser. No. 17/237,783, filed Apr. 22, 2021, titled "SYNTHETIC REQUEST INJECTION TO DISAMBIGUATE BYPASSED LOGIN EVENTS FOR CLOUD POLICY ENFORCEMENT," now U.S. Pat. No. 11,303,647 issued Apr. 12, 2022, which is hereby incorporated by reference in its entirety for all purposes.

This application is related to U.S. patent application Ser. No. 17/237,748, filed Apr. 22, 2021, titled "SYNTHETIC REQUEST INJECTION FOR CLOUD POLICY ENFORCEMENT," now U.S. Pat. No. 11,336,698 issued May 17, 2022, which is hereby incorporated by reference in its entirety for all purposes.

INCORPORATIONS

The following are incorporated by reference for all purposes as if fully set forth herein:

U.S. patent application Ser. No. 14/198,499, filed Mar. 5, 2014, titled "SECURITY FOR NETWORK DELIVERED SERVICES," issued as U.S. Pat. No. 9,398,102 on Jul. 19, 2016;

U.S. patent application Ser. No. 14/198,508, filed Mar. 5, 2014, titled "SECURITY FOR NETWORK DELIVERED SERVICES," issued as U.S. Pat. No. 9,270,765 on Feb. 23, 2016;

U.S. patent application Ser. No. 14/835,640, filed Aug. 25, 2015, titled "SYSTEMS AND METHODS OF MONITORING AND CONTROLLING ENTERPRISE INFORMATION STORED ON A CLOUD COMPUTING SERVICE (CCS)," issued as U.S. Pat. No. 9,928,377 on Mar. 27, 2018;

U.S. patent application Ser. No. 14/835,632, filed Aug. 25, 2015, titled "SYSTEMS AND METHODS OF PER-DOCUMENT ENCRYPTION OF ENTERPRISE INFORMATION STORED ON A CLOUD COMPUTING SERVICE (CCS)," issued as U.S. Pat. No. 10,114,966 on Oct. 30, 2018;

U.S. patent application Ser. No. 15/368,240, filed Dec. 2, 2016, titled "SYSTEMS AND METHODS OF ENFORCING MULTI-PART POLICIES ON DATA-DEFICIENT TRANSACTIONS OF CLOUD COMPUTING SERVICES," issued as U.S. Pat. No. 10,826,940 on Nov. 3, 2020;

U.S. patent application Ser. No. 15/368,246, filed Dec. 2, 2016, titled "MIDDLE WARE SECURITY LAYER FOR CLOUD COMPUTING SERVICES," issued as U.S. Pat. No. 11,019,101 on May 25, 2021;

U.S. patent application Ser. No. 15/256,483, filed Sep. 2, 2016, titled "MACHINE LEARNING BASED ANOMALY DETECTION," issued as U.S. Pat. No. 10,270,788 on Apr. 23, 2019;

U.S. patent application Ser. No. 15/628,547, filed Jun. 20, 2017, titled "SYSTEMS AND METHODS OF DETECTING AND RESPONDING TO A DATA ATTACK ON A FILE SYSTEM," issued as U.S. Pat. No. 10,476,907 on Nov. 12, 2019;

U.S. patent application Ser. No. 15/628,551, filed Jun. 20, 2017, titled "SYSTEMS AND METHODS OF DETECTING AND RESPONDING TO MALWARE ON A FILE SYSTEM," issued as U.S. Pat. No. 10,469,525 on Nov. 5, 3029;

U.S. patent application Ser. No. 15/795,957, filed Oct. 27, 2017, titled "NON-INTRUSIVE SECURITY ENFORCEMENT FOR FEDERATED SINGLE SIGN-ON (SSO)," issued as U.S. Pat. No. 10,243,946 on Mar. 26, 2019;

U.S. patent application Ser. No. 15/958,672, filed Apr. 20, 2018, titled "REDUCING LATENCY IN SECURITY ENFORCEMENT BY A NETWORK SECURITY SYSTEM (NSS)," issued as U.S. Pat. No. 10,805,352 on Oct. 13, 2020;

U.S. patent application Ser. No. 15/958,637, filed Apr. 20, 2018, titled "REDUCING ERROR IN SECURITY ENFORCEMENT BY A NETWORK SECURITY SYSTEM (NSS)," issued as U.S. Pat. No. 10,819,749 on Oct. 27, 2020;

U.S. patent application Ser. No. 16/044,326, filed Jul. 24, 2018, titled "COMPACT LOGGING OF NETWORK TRAFFIC EVENTS," issued as U.S. Pat. No. 10,834,113 on Nov. 10, 2020;

U.S. patent application Ser. No. 16/016,430, filed Jun. 22, 2018, titled "AGGREGATE NETWORK TRAFFIC MONITORING," issued as U.S. Pat. No. 10,812,353 on Oct. 20, 2020;

U.S. patent application Ser. No. 15/986,732, filed May 22, 2018, titled "DATA LOSS PREVENTION USING CATEGORY-DIRECTED PARSERS," issued as U.S. Pat. No. 11,064,013 on Jul. 13, 2021;

U.S. patent application Ser. No. 15/911,034, filed Mar. 2, 2018, titled "SIMULATION AND VISUALIZATION OF MALWARE SPREAD IN A CLOUD-BASED COLLABORATION ENVIRONMENT," issued as U.S. Pat. No. 10,862,916 on Dec. 8, 2020;

U.S. patent application Ser. No. 16/556,168, filed Aug. 29, 2019, titled "METHODS AND SYSTEMS FOR SECURING AND RETRIEVING SENSITIVE DATA USING INDEXABLE DATABASES," issued as U.S. Pat. No. 10,783,270 on Sep. 22, 2020;

U.S. patent application Ser. No. 16/118,278, filed Aug. 30, 2018, titled "ENRICHING DOCUMENT METADATA WITH CONTEXTUAL INFORMATION," issued as U.S. Pat. No. 11,403,418 on Aug. 2, 2022;

U.S. patent application Ser. No. 16/408,215, filed May 9, 2019, titled "SMALL-FOOTPRINT ENDPOINT DATA LOSS PREVENTION (DLP)," issued as U.S. Pat. No. 11,425,169 on Aug. 23, 2022;

U.S. patent application Ser. No. 16/257,027, filed Jan. 24, 2019, titled "INCIDENT-DRIVEN INTROSPECTION FOR DATA LOSS PREVENTION," issued as U.S. Pat. No. 11,416,641 on Aug. 16, 2022;

U.S. patent application Ser. No. 16/226,394, filed Dec. 19, 2018, titled "MULTI-LABEL CLASSIFICATION OF TEXT DOCUMENTS," issued as U.S. Pat. No. 11,087,179 on Aug. 10, 2021;

U.S. patent application Ser. No. 16/361,023, filed Mar. 21, 2019, titled "SYSTEMS AND METHODS FOR ALERT PRIORITIZATION USING SECURITY EVENTS GRAPH," issued as U.S. Pat. No. 11,539,749 on Dec. 27, 2022;

U.S. patent application Ser. No. 16/361,039, filed Mar. 21, 2019, titled "SYSTEM AND METHODS TO SHOW DETAILED STRUCTURE IN A SECURITY EVENTS GRAPH," issued as U.S. Pat. No. 11,165,803 on Nov. 2, 2021;

U.S. patent application Ser. No. 16/807,128, filed Mar. 2, 2020, titled "LOAD BALANCING IN A DYNAMIC SCALABLE SERVICES MESH," issued as U.S. Pat. No. 11,986,150 on Apr. 20, 2021;

U.S. patent application Ser. No. 16/807,132, filed Mar. 2, 2020, titled "RECOVERY FROM FAILURE IN A DYNAMIC SCALABLE SERVICES MESH," issued as U.S. Pat. No. 10,868,845 on Dec. 15, 2020;

U.S. patent application Ser. No. 17/157,947, filed Jan. 25, 2021, titled "METADATA-BASED DETECTION AND PREVENTION OF PHISHING ATTACKS," issued as U.S. Pat. No. 11,856,022 on Dec. 26, 2023;

U.S. patent application Ser. No. 16/411,039, filed May 13, 2019, titled "METADATA-BASED DATA LOSS PREVENTION (DLP) FOR CLOUD RESOURCES," issued as U.S. Pat. No. 11,405,423 on Aug. 2, 2022;

U.S. patent application Ser. No. 16/556,183, filed Aug. 29, 2019, titled "EFFICIENT SCANNING FOR THREAT DETECTION USING IN-DOC MARKERS," issued as U.S. Pat. No. 10,621,346 on Apr. 14, 2020;

U.S. patent application Ser. No. 16/891,647, filed Jun. 3, 2020, titled "DETECTING IMAGE-BORNE IDENTIFICATION DOCUMENTS FOR PROTECTING SENSITIVE INFORMATION," issued as U.S. Pat. No. 10,990,856 on Apr. 27, 2021;

U.S. patent application Ser. No. 16/891,678, filed Jun. 3, 2020, titled "DETECTING SCREENSHOT IMAGES FOR PROTECTING AGAINST LOSS OF SENSITIVE SCREENSHOT-BORNE DATA," issued as U.S. Pat. No. 10,949,961 on Mar. 16, 2021;

U.S. patent application Ser. No. 16/891,698, filed Jun. 3, 2020, titled "DETECTING ORGANIZATION IMAGE-BORNE SENSITIVE DOCUMENTS AND PROTECTING AGAINST LOSS OF THE SENSITIVE DOCUMENTS," issued as U.S. Pat. No. 10,867,073 on Dec. 15, 2020;

U.S. patent application Ser. No. 17/163,408, filed Jan. 30, 2021, titled "UNIFIED POLICY ENFORCEMENT MANAGEMENT IN THE CLOUD," issued as U.S. Pat. No. 11,159,576 on Oct. 26, 2021;

U.S. patent application Ser. No. 17/163,285, filed Jan. 29, 2021, titled "DYNAMIC POWER USER IDENTIFICATION AND ISOLATION FOR MANAGING SLA GUARANTEES," issued as U.S. Pat. No. 11,271,953 on Mar. 8, 2022;

U.S. patent application Ser. No. 17/154,978, filed Jan. 21, 2021, titled "PREVENTING PHISHING ATTACKS VIA DOCUMENT SHARING," issued as U.S. Pat. No. 11,082,445 on Aug. 3, 2021;

U.S. patent application Ser. No. 17/184,478, filed Feb. 24, 2021, titled "SIGNATURELESS DETECTION OF MALICIOUS MS OFFICE DOCUMENTS CONTAINING ADVANCED THREATS IN MACROS," issued as U.S. Pat. No. 11,222,112 on Jan. 11, 2022;

U.S. patent application Ser. No. 17/184,502, filed Feb. 24, 2021, titled "SIGNATURELESS DETECTION OF MALICIOUS MS OFFICE DOCUMENTS CONTAINING EMBEDDED OLE OBJECTS," issued as U.S. Pat. No. 11,349,865 on May 31, 2022;

U.S. patent application Ser. No. 17/163,411, filed Jan. 30, 2021, titled "DYNAMIC DISTRIBUTION OF UNIFIED SECURITY POLICIES IN A CLOUD-BASED SECURITY SYSTEM," issued as U.S. Pat. No. 11,848,949 on Dec. 19, 2023;

U.S. patent application Ser. No. 17/163,415, filed Jan. 30, 2021, titled "DYNAMIC ROUTING OF ACCESS REQUEST STREAMS IN A UNIFIED POLICY ENFORCEMENT SYSTEM"; and U.S. patent application Ser. No. 17/163,416, filed Jan. 30, 2021, titled "UNIFIED SYSTEM FOR DETECTING POLICY ENFORCEMENT ISSUES IN A CLOUD- BASED ENVIRONMENT," issued as U.S. Pat. No. 11,777,993 on Oct. 3, 2023.

FIELD OF THE TECHNOLOGY DISCLOSED

The technology disclosed relates to configuring a network intermediary or security middleware (e.g., CASBs, SWGs, firewalls) with a network request-response mechanism and methods to achieve a target network security objective. The request-response mechanism and methods can be implemented in various network protocols for inter-process communications like FTP, FTPS, GOPHER, HTTP, HTTPS, IMAP, IMAPS, LDAP, LDAPS, POP3, POP3S, RTMP, RTMPS, RTSP, SCP, SFTP, SMTP, SMTPS, SPDY and TFTP.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

For example, personally identifiable information (PII) refers to information which can be used to distinguish or trace an individual's identity, such as their name, Social Security number, and biometric records, alone, or when combined with other personal or identifying information which is linked or linkable to a specific individual, such as date and place of birth and mother's maiden name.

Data loss prevention, often shortened to DLP, is a set of processes and tools used to ensure that sensitive data is not lost, misused, or accessed by unauthorized persons. The term sensitive data often refers to personal data, which is defined by the European Union as any information relating to an identified or identifiable individual. For example, personally identifiable information (PII) refers to information which can be used to distinguish or trace an individual's identity, such as their name, Social Security number, and biometric records, alone, or when combined with other personal or identifying information which is linked or linkable to a specific individual, such as date and place of birth and mother's maiden name. Protected health information (PHI) refers to individually identifiable health information, including demographic data, that relates to the individual's past, present or future physical or mental health or condition, the provision of health care to the individual, or the past, present, or future payment for the provision of health care to the individual, the individual's identity or for which there is a reasonable basis to believe it can be used to identify the individual. Individually identifiable health information includes many common identifiers such as name, address, birth date and Social Security number. Financial information includes credit card data and business accounting records. Essentially, sensitive data can refer to any data of which the compromise with respect to confidentiality, integrity, or availability could have an adverse material effect on the interests of involved parties.

Data loss is a real problem faced by business to protect their sensitive data stems not only from financial factors, but also from the need to comply with laws and regulations of their respective countries and moral obligations. For example, Treaty No. 108 of the Council of Europe strictly mandates that appropriate security measures are taken for the protection of personal data stored in automated data files against accidental or unauthorized destruction or accidental loss as well as against unauthorized access, alteration, or dissemination. The failure to comply with such regulations can be punished by harsh penalties. For example, penalties stated in the General Data Protection Regulation (also known as GDPR) have recently garnered wide attention and have become a major concern for many companies.

Enterprise organizations have a business need to store sensitive data, such as financial or protected health information, intellectual property (IP) and other information in secured centralized locations so that they can be backed up and protected from data loss for business continuity purposes. These centralized repositories are typically network mounted file servers. With rapid proliferation and adoption of cloud-based services like Box™, Dropbox™, Google Drive™, Microsoft Office 365™, Salesforce.com™ which provide users utilities remote-accessible via the endpoints, a migration of sensitive data from network mounted file servers to cloud storage services has been occurring.

Cloud services like Amazon Web Services™ (AWS), Google Cloud Platform™ (GCP), Microsoft Azure™ and Alibaba Cloud™, which operate as platforms in the Infrastructure as a service (IaaS) category, provide consumers fundamental cloud computing resources with convenient, on-demand network access to a shared pool of configurable resources (e.g., networks, servers, storages, operating systems, applications and services) that can be rapidly provisioned on pay-as-you-go pricing. Additional information about the Infrastructure as a service and platforms can be found, e.g., at Infrastructure as a service, https://en.wikipedia.org/wiki/Infrastructure_as_a_service (last visited Nov. 12, 2021), which is incorporated by reference for all purposes as if fully set forth herein.

Public cloud-based applications, especially software as a service, are a special case with regard to data loss prevention. These applications deviate from the older on-premises DLP paradigm by storing and manipulating sensitive data outside the total control of the organization. The systems are hosted outside the premises of the companies and are managed by the cloud provider with limited options for configuration, management, and extensibility by the customer. This severely hinders the capabilities of traditional DLP systems focusing on on-premises infrastructure, as data is heavily manipulated remotely through web applications, is not always stored on endpoints and network shares that can be searched by traditional crawlers and is expected to be allowed to breach the on-premises barrier when communicating with the cloud.

A class of security solutions that focus on protecting data manipulated in cloud-based applications are cloud access security brokers, commonly shortened to CASBs. CASBs provide multiple types of security policy enforcement. These include authenticated access, single sign-on, authorization, credential mapping, DLP, IP restriction, device restriction, device profiling, geographical restriction, time zone restriction, encryption, tokenization, logging, altering, and malware detection and prevention.

CASBs are specialized security solutions developed by third parties to address security gaps in organizations' usage of cloud services. They provide protection concurrently across multiple cloud services and offer visibility into user activities and their granular control. The primary focus is on back-office and productivity applications delivered in the software as a service (SaaS) model. They operate inline between the client and the cloud server, intercepting traffic as a forward or reverse proxy. They can also function in an out-of-band fashion, by interfacing with the cloud service with an application programming interface (API) to perform their operations directly in the cloud environment.

There are two main types of architectural approaches used in proxy-based CASB systems. In the forward proxy model, the solution operates by leveraging a network gateway that intercepts all communication to the cloud services. Some solutions may even complement this by deploying endpoint agents or by other methods. This method can be fairly intrusive with regard to the infrastructure, as it requires all traffic from clients to the cloud servers to be forcibly routed through the gateway. An advantage of this approach is having more visibility into the usage of unsanctioned cloud services, as all traffic to them passes through the broker, and enforcement of real-time policy actions. The main disadvantage lies in the difficulty of addressing unmanaged devices and bring your own device (BYOD) scenarios.

In the reverse proxy model, the network nodes hidden behind the proxy are not the clients, but the cloud servers instead. The broker can be deployed either on-premises or cloud-based, using the software as a service model. This can be achieved by redirecting the authentication mechanism of the cloud service to the CASB by which it inserts itself between the endpoint users and the cloud service. The users can then use the cloud services in the same fashion as before but with rewritten uniform resource locators (URLs). An advantage of this model is easy support for the BYOD scenarios, as there are little to no configuration changes needed on endpoint devices. With regard to data loss prevention, systems that employ these inline protection methods are mainly focused on data in motion. The methods by which they protect sensitive data are very similar to those offered by on-premises DLP systems. They can utilize most of the previously described methods for data classification, as well as handle leakage incidents by blocking, quarantining, encryption, or tokenization before the data is passed to the cloud service.

A significantly different model to the proxy-based approach is used by API-based CASB systems. These solutions provide their functionality by interfacing with API exposed by the cloud service providers themselves, rather than intercepting traffic as a middleman. The point of difference in data loss prevention capabilities, compared to the proxy-based systems, is that these systems are better suited for protection of data at rest. They are capable of accessing the cloud file storage by themselves by leveraging the API to download and inspect the files for data classification. The data can then be protected by CASB-native methods or by leveraging native capabilities of the cloud services themselves to protect the data with access controls or encryption, for example with Salesforce Shield or Azure Information Protection. Systems utilizing this model can also increase their auditing capabilities by consuming audit and user activity logs collected by the services themselves. The logs from different services can then be consolidated into a single stream. As with other features derived from this approach, this assumes the cloud service providers expose an API for log consumption.

The assignee, Netskope, Inc., offers CASB solutions that use metadata for context-based policy enforcement. However, accessing metadata is a non-trivial challenge because cloud service providers require these CASB solutions to intermediate within an exacting sequence of traffic inspection. When the metadata is not available in a transaction stream, these CASB solutions have limited ability to garner the missing metadata and therefore unable to enforce appropriate policies.

An opportunity arises to make these CASB solutions self-sufficient to separately retrieve metadata from cloud applications and their infrastructures while adhering to the demanding intermediation protocols of the cloud service providers. Improved security posture and reduced risk of data loss, exposure, and exfiltration across multi-cloud, web, and email environment may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIG. 6 shows one example of a 401 App-Expected Response issued as a synthetic request to clients running native apps.

FIG. 7 shows one example of a people token request issued as a synthetic request to cloud applications.

FIG. 8 shows another example of a synthetic request.

FIG. 24 shows examples of resources in the context of cloud storage hierarchies of on AMAZON WEB SERVICE™ (AWS) and MICROSOFT AZURE™.

DETAILED DESCRIPTION

Figure 1:
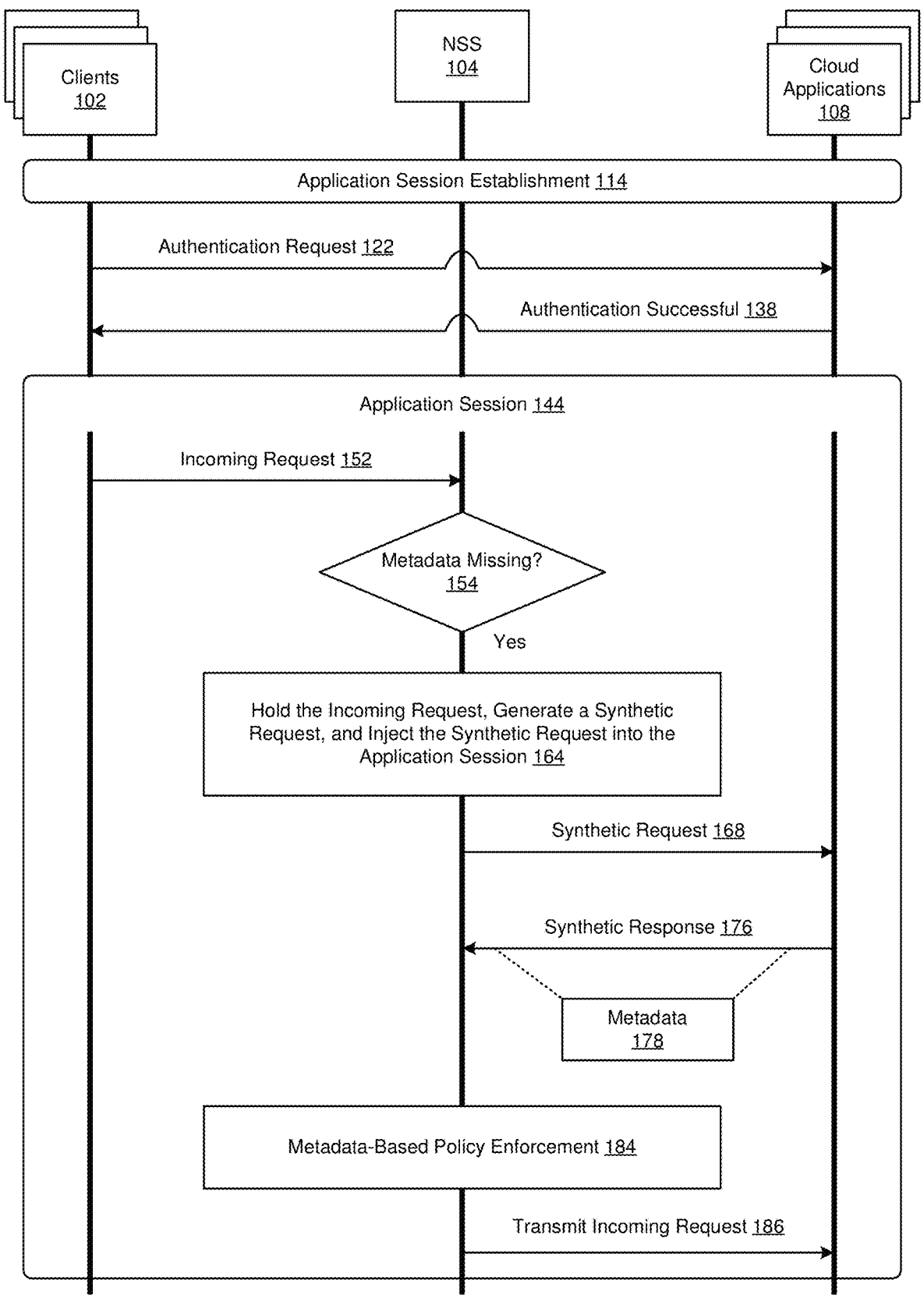
FIG. 1 shows one implementation of a network security system issuing a synthetic request during an application session of a cloud application to retrieve metadata that is otherwise missing from the application session.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

Cloud Applications

Cloud applications 108 are network services that can be web-based (e.g., accessed via a uniform resource locator (URL)) or native, such as sync clients. The cloud applications 108 can be cloud storage applications, cloud computing applications, hosted services, news websites, blogs, video streaming websites, social media websites, collaboration and messaging platforms, and customer relationship management (CRM) platforms. The cloud applications 108 can be provided as software-as-a-service (SaaS) offerings, platform-as-a-service (PaaS) offerings, and infrastructure-as-a-service (IaaS) offerings, as well as internal enterprise applications that are exposed via URLs.

Examples of common cloud applications today include Box™, Dropbox™, Google Drive™, Amazon AWS™, Google Cloud Platform (GCP)™, Microsoft Azure™, Microsoft Office 365™, Google Workspace™, Workday™, Oracle on Demand™, Taleo™, Jive™, Concur™, YouTube™, Facebook™, Twitter™, Google™, LinkedIn™, Wikipedia™, Yahoo™, Baidu™, Amazon™, MSN™, Pinterest™, Taobao™, Instagram™, Tumblr™, eBay™, Hotmail™, Reddit™, IMDb™, Netflix™, PayPal™, Imgur™, Snapchat™, Yammer™, Skype™, Slack™, HipChat™, Confluence™, TeamDrive™, Taskworld™, Chatter™, Zoho™, ProsperWorks™, Gmail™, and Salesforce.com™.

The cloud applications 108 provide functionality to users that is implemented in the cloud and that is the target of policies, e.g., logging in, editing documents, downloading bulk data, reading customer contact information, entering payables, deleting documents, in addition to the offerings of a simple website and ecommerce sites. Note that some consumer facing websites, e.g., Facebook™ and Twitter™, which offer social networks, are the type of cloud applications considered here. Some cloud applications, e.g., Gmail™, can be a hybrid with some free users using the application generally while other corporations use it as an enterprise subscription. Note that a cloud application can be supported by both web browser clients and application clients that use URL-based APIs (application programming interfaces). Thus, using Dropbox™ as an example, user activity on the Dropbox™ website, as well as activity of the Dropbox™ client on the computer could be monitored.

The cloud applications 108 often publish their APIs to allow a third party to communicate with them and utilize their underlying data. An API refers to a packaged collection of code libraries, routines, protocols methods, and fields that belong to a set of classes, including its interface types. The API defines the way that developers and programmers can use the classes for their own software development, just by importing the relevant classes and writing statements that instantiate the classes and call their methods and fields. An API is a source code-based application intended to be used as an interface by software components to communicate with each other. An API can include applications for routines, data structures, object classes, and variables. Basically, an API provides an interface for developers and programmers to access the underlying data, platform capabilities, and features of web services. Non-exclusive examples of APIs include remote invocation of services to return data, web service APIs such as HTTP or HTTPs based APIs like SOAP, WSDL, Bulk, XML-RPC and JSON-RPC and REST APIs (e.g., Flickr™, Google Static Maps™, Google Geolocation™), web socket APIs, library-based APIs like JavaScript and TWAIN (e.g., Google Maps™ JavaScript API, Dropbox™ JavaScript Data store API, Twilio™ APIs, Oracle Call Interface (OCI)), class-based APIs like Java API and Android API (e.g., Google Maps™ Android API, MSDN Class Library for .NET Framework, Twilio™ APIs for Java and C #), OS functions and routines like access to file system and access to user interface, object remoting APIs like CORBA and .NET Remoting, and hardware APIs like video acceleration, hard disk drives, and PCI buses. Other examples of APIs used by the technology disclosed include Amazon EC2 API™, Box Content API™, Box Events API™, Microsoft Graph™, Dropbox API™, Dropbox API v2™, Dropbox Core API™, Dropbox Core API v2™, Facebook Graph API™, Foursquare API™, Geonames API™, Force.com API™, Force.com Metadata API™, Apex API™, Visualforce API™, Force.com Enterprise WSDL™, Salesforce.com Streaming API™, Salesforce.com Tooling API™, Google Drive API™, Drive REST API™, AccuWeather API™, and aggregated-single API like CloudRail™ API.

Network Security System

A network security system (NSS) 104, also referred to herein as a policy enforcement system, intermediates network traffic that pass between clients 102 and the cloud applications 108. The network security system 104 consolidates multiple types of security enforcements. Examples of the security enforcements include authentication, federated single sign-on (SSO), authorization, credential mapping, device profiling, encryption, tokenization, data leakage prevention (DLP), logging, alerting, and malware detection and prevention.

Examples of the clients 102 include browsers, web apps, native apps, and hybrid apps. Examples of the network security system 104 include cloud access security brokers (CASBs), secure web gateways (SWGs), network firewalls, application firewalls, routing systems, load balancing systems, filtering systems, data planes, management planes, data loss prevention (DLP) systems, intrusion prevention systems (IPSs), zero trust network access (ZTNA), and secure access service edge (SASE). The network security system 104 can also be a network security stack that includes different security systems like the CASBs, the SWGs, the network firewalls, the application firewalls, the routing systems, the load balancing systems, the filtering systems, the data planes, the management planes, the DLP systems, and the IP systems. The network security system 104 can be implemented on-premises or can be cloud-based. Also, multiple geographically distributed points of presence of the network security system 104 can be implemented in a secure access service edge (SASE) network.

Employees now rely on the cloud applications 108 to perform business-critical functions and routinely upload sensitive and regulated data to the web. The network security system 104 intercepts network traffic in real-time to prevent loss of sensitive data by inspecting data en route to or from the cloud applications 108 and data resident in the cloud applications 108. The network security system 104 analyzes application layer traffic using APIs to deeply inspect cloud application transactions in real-time. The network security system 104 uses a combination of deep application programming interface inspection (DAPII), deep packet inspection (DPI), and log inspection to monitor user activity and perform data loss prevention (DLP). The network security system 104 uses DAPII to detect web transactions in real-time, including calls made to the cloud applications 108. The cloud transactions are decomposed to identify the activity being performed and its associated parameters. In one implementation, the cloud transactions are represented as JSON (JavaScript Object Notation) objects, which identify a structure and format that allows the network security system 104 to both interpret what actions a user is performing in the web service as it is happening. So, for example, the network security system 104 can detect for an organization that "Joe from Investment Banking, currently in Japan, shared his M&A directory with an investor at a hedge fund at 10 PM." The network security system 104 achieves DLP by subjecting data packets to content inspection techniques like language-aware data identifier inspection, document fingerprinting, file type detection, keyword search, pattern matching, proximity search, regular expression lookup, exact data matching, metadata extraction, and language-agnostic double-byte character inspection. The network security system 104 inspects data that is encoded in network packets and/or higher order encodings of the network packets such as secure sockets layer (SSL) and/or transport layer security (TLS) handshakes and Hypertext Transfer Protocol (HTTP) transactions.

In some implementations, the network security system 104 can run on server-side as a cloud resource. In other implementations, the network security system 104 can run on client-side as an endpoint agent. The network security system 104 is also referred to herein as a "proxy."

For additional information about the network security system 104, reference can be made to, for example, commonly owned U.S. patent application Ser. Nos. 14/198,499; 14/198,508; 14/835,640; 14/835,632; and 62/307,305; Cheng, Ithal, Narayanaswamy, and Malmskog. Cloud Security For Dummies, Netskope Special Edition. John Wiley & Sons, Inc. 2015; "Netskope Introspection" by Netskope, Inc.; "Data Loss Prevention and Monitoring in the Cloud" by Netskope, Inc.; "Cloud Data Loss Prevention Reference Architecture" by Netskope, Inc.; "The 5 Steps to Cloud Confidence" by Netskope, Inc.; "The Netskope Active Platform" by Netskope, Inc.; "The Netskope Advantage: Three "Must-Have" Requirements for Cloud Access Security Brokers" by Netskope, Inc.; "The 15 Critical CASB Use Cases" by Netskope, Inc.; "Netskope Active Cloud DLP" by Netskope, Inc.; "Repave the Cloud-Data Breach Collision Course" by Netskope, Inc.; and "Netskope Cloud Confidence Index™" by Netskope, Inc., which are incorporated by reference for all purposes as if fully set forth herein.

Application Session

An "application session" refers to a series of related client requests that emanate from a same client during a certain time period (e.g., a duration of fifteen minutes) and are directed towards a same cloud application. An application session identifier (ID) is a unique number that an application server of the cloud application assigns a specific client the duration of that client's visit (session). The application session ID can be stored as a cookie, form field (e.g., the HTTP header field set-Cookie: JSESSIOID=ABADID; path/1), or a URL (Uniform Resource Locator). The network security system 104 can use the session ID or the URL parameter to lookup session information of that application session maintained by the application server which assigns the session ID.

A sequence of events occurs in the context of an application session. The main events of note are: (a) login event—provide user credentials to a cloud application to authenticate the user; (b) application transactions—execute a set of application level transactions, e.g., upload documents, download documents, add leads, define new campaigns, etc.; and (c) time-out event—this event terminates the application session with an application server of the cloud application. In this context, the application session connects these interactions for the network security system 104. Deep packet inspection logic of the network security system 104 can identify these events and link policy evaluations to each transaction boundary enabling actions to be taken.

In contrast, a "connection" refers to a high-level non-network construct (e.g., not a TCP/IP connection) but rather a series of multiple related networks requests and responses. Thus, a series of requests and responses over the course of a day could be a single connection within an application, e.g., all use of Salesforce.com within a period without logging off. One definition of a connection is to look at the application session identifier, e.g., cookie or URL parameter, used by the cloud application so that each connection corresponds to a single session identifier. A connection can include a sequence of application sessions within the boundary of a login event and a log-out event, such that application sessions in the sequence of application sessions are partitioned by time-out events.

Synthetic Request

A "synthetic request" is a request generated by the network security system 104 during an application session and separate of client requests generated by a client during the application session. The synthetic requests can be generated by the network security system 104, for example, on an ad hoc basis. That is, the synthetic requests can be dynamically constructed and issued "on-the-fly" to get information when need arises. The synthetic requests may also be referred to as "synthetic URL requests."

Web transactions are typically accompanied with access tokens (e.g., embedded as request parameters or cookies). By extracting an access token for a given transaction, the network security system 104 can synthetically issue new requests (or transactions) to the cloud applications 108. The synthetic requests can be, for example, API calls that explicitly request the metadata-of-interest. Alternatively, the synthetic requests can trigger page requests that contain the metadata-of-interest. The synthetic requests can be configured to retrieve the metadata-of-interest from the cloud applications 108 or from another separate metadata store.

Client requests, referred to herein as "incoming requests," emanate from the clients 102 and directed towards the cloud applications 108 but are intercepted by the network security system 104 for policy enforcement. The synthetic requests are issued by the network security system 104, directed towards the cloud applications 108, and not subjected to policy enforcement by the network security system 104.

The synthetic requests are issued by the network security system 104 as network transactions of communications protocols (e.g., FTP, FTPS, GOPHER, HTTP, HTTPS, IMAP, IMAPS, LDAP, LDAPS, POP3, POP3S, RTMP, RTMPS, RTSP, SCP, SFTP, SMTP, SMTPS, SPDY and TFTP) that, for example, HTTP/HTTPS transactions specify a unified resource identifier (URI) or URL of a resource on the cloud applications 108. The synthetic requests can include different configurations of a request line, request header fields and values therefor, and request methods defined by the applicable communications protocols to indicate the desired action to be performed for a given resource.

Examples of request headers such as HTTP and HTTPS headers and header fields that can be used by the network security system 104 to construct the synthetic requests include cache-control, connection, content-encoding, content-length, content-type, date, pragma, trailer, transfer-encoding, upgrade, via, warning, accept, accept-charset, accept-encoding, accept-language, authorization, cookie, expect, from, host, if-match, if-modified-since, if-none-match, if-range, if-unmodified-since, max-forwards, proxy-authorization, range, referrer, TE, and user-agent. Additional examples and information about the request header fields can be found, e.g., at List of HTTP header fields, https://en.wikipedia.org/w/index.php?title=List_of_HTTP_header_fields&oldid=1012071227 (last visited Mar. 16, 2021), which is incorporated by reference for all purposes as if fully set forth herein.

One example of request methods, HTTP and HTTPS request methods that can be used by the network security system 104 to transmit the synthetic requests include GET, HEAD, POST, PUT, DELETE, CONNECT, OPTIONS, TRACE, and PATCH. Additional information about the HTTP/HTTPS request methods can be found at Hypertext Transfer Protocol, https://en.wikipedia.org/w/index.php?title=Hypertext_Transfer_Protocol&oldid=1012415417 (last visited Mar. 16, 2021), which is incorporated by reference for all purposes as if fully set forth herein.

The intended purpose of the synthetic requests can vary from use case-to-use case. However, opposite to the malicious intent of out-of-band requests triggered by middlemen who hijack application sessions, the synthetic requests are configured to enforce security policies, and thereby thwart data exfiltration and malicious attacks. For example, the synthetic requests can be configured to cause the cloud applications 108 to provide metadata to the network security system 104. In another example, the synthetic requests can be configured to update a security posture of resources (e.g., files) stored at the cloud applications 108. More examples follow.

In the context of this application, injecting a synthetic request in an application session refers to the network security system 104 generating the synthetic request during an already established application session and transmitting the synthetic request to the cloud applications 108 within the context of the already established application session. The synthetic request injection can also include receiving a synthetic response to the synthetic request within the already established application session. Within an application session, multiple synthetic requests can be injected, in parallel or in sequence. The notion of synthetic request injection analogously applies to connections, such that synthetic requests can be injected in an already established connection across multiple application sessions.

In some implementations, a synthetic request is constructed using fields, variables, events, and parameters that are part of the original client request (or incoming request). Examples of such fields, variables, events, and parameters include cookie data, fixed headers, custom headers, and other request header fields of the original client request.

Synthetic Response

A "synthetic response" is an answer that satisfies a corresponding synthetic request issued by the network security system 104. In preferred implementations, a synthetic request is sent by the network security system 104 to the cloud applications 108, and therefore the corresponding synthetic response is transmitted by the cloud applications 108 and received by the network security system 104. Unlike typical server responses, synthetic responses are not subjected to policy enforcement by the network security system 104. The synthetic responses are generated by the cloud applications 108 and received by the network security system 104 separately of the server responses that answer the client requests. Since the synthetic requests are network requests generated by the network security system 104 over a network protocol (e.g., HTTP, HTTPS), the synthetic responses can also be constructed in the like network protocols. Like a typical server response, a synthetic response can include different configurations of a status line, response header fields and values thereof, and content body.

Examples of response header fields such as HTTP/HTTPS response header fields that can be found in the synthetic responses include cache-control, connection, accept-ranges, age, ETag, location, proxy-authenticate, retry-after, server, set-cookie, vary, WWW-authenticate, allow, content-deposition, content-encoding, content-language, content-length, content-location, content-MD5, content-range, content-type, expires, IM, link, pragma, preference-applied, public-key-pins, trailer, transfer-encoding, Tk, strict-transport-security, upgrade, X-frame-options, via, warning, and last-modified. Additional examples and information about the response header fields can be found at, e.g., List of HTTP header fields, https://en.wikipedia.org/w/index.php?title=List_of_HTTP_header_fields&oldid=1012071227 (last visited Mar. 16, 2021), which is incorporated by reference for all purposes as if fully set forth herein.

Examples of Applicable Communication Protocols

The disclosed synthetic request-response mechanism can be implemented using a variety of communication protocols. Communications protocols define the basic patterns of dialogue over computer network in proper descriptions of digital and/or analog message formats as well as rules. The Synthetic Request and Synthetic Response can be implemented in the communication protocols capable of constructing request-response messaging patterns, for example, the HTTP and HTTPS protocols. The HTTP (Hypertext Transfer Protocol), HTTPS (HTTP secure) and subsequent revisions such as HTTP/2 and HTTP/3 are the common communication protocols which function as a request-response protocol in the client-server computing model.

Protocols alternative to the HTTP and the variants include the GOPHER protocol which was an earlier content delivery protocol but was displaced by HTTP in 1990s. Another HTTP alternative is the SPDY protocol which was developed by Google and superseded by HTTP/2. Other communication protocols which may support applications incorporating the use of the disclosed synthetic request-response mechanism include but not be limited to, e.g., FTP, FTPS, IMAP, IMAPS, LDAP, LDAPS, POP3, POP3S, RTMP, RTMPS, RTSP, SCP, SFTP, SMTP, SMTPS, and TFTP.

The communication protocols used to exchange files between computers on the Internet or a private network and implementable by the disclosed synthetic request-response mechanism include the FTP (File Transfer Protocol), FTPS (File Transfer Protocol Secure) and SFTP (SSH File Transfer Protocol). FTPS is also known as FTP-SSL. FTP Secure is an extension to the commonly used FTP that adds support for the TLS (Transport Layer Security), and formerly the SSL (Secure Socket Layer). The SSH File Transfer Protocol (i.e., SFTP, also Secure File Transfer Protocol) is an extension of the secure shell (SSH) protocol that provides secure file transfer capabilities and is implementable by the disclosed synthetic request-response mechanism.

Another file transfer protocol, secure copy protocol (SCP) is a means of securely transferring electronic files between a local host and a remote host or between remote hosts and is implementable by the disclosed synthetic request-response mechanism. A client can send (upload) file to a server, optionally including their basic attributes (e.g., permissions, timestamps). A client can also request files or directories from a server (download). Like SFTP, SCP is also based on the Secure Shell (SSH) protocol that the application server has already authenticated the client and the identity of the client user is available to the protocol. SCP is however outdated and inflexible such that the more modern protocol like SFTP is recommended for file transfer and is implementable by the disclosed synthetic request-response mechanism.

The FTP and the like provide commands which, similar to the HTTP request methods, can be used by the network security system 104 to transmit the synthetic requests include ACCT, ADAT, AUTH, CSID, DELE, EPRT, HOST, OPTS, QUIT, REST, SITE, XSEM. Additional information about the FTP Commands can be found, e.g., at List of FTP commands, https://en.wikipedia.org/wiki/List_of_FTP_commands (last visited Mar. 24, 2021), which is incorporated by reference for all purposes as if fully set forth herein.

A simple and lightweight file transfer protocol, Trivial File Transfer Protocol (TFTP) allows clients to get a file from or put a file onto a remote host which is typically embedded device retrieving firmware, configuration, or a system image during a boot process for a tftp server. In TFTP, a transfer is initiated by issuing a client (tftp) which issues a request to read or write a file on the server. The client request can optionally include a set of parameters proposed by the client to negotiate the transfer. The tftp client supports some commands that vary by the platforms. A list of tftp commands similar to HTTP request methods such as CONNECT, GET, PUT, QUIT, TRACE can be found at https://www.ibm.com/support/knowledgecenter/ssw_aix_72/t_commands/tftp.html, which is incorporated by reference for all purposes as if fully set forth herein.

The communication protocols used for retrieving email (i.e., electronic mail) messages from a mail server include the IMAP (Internet Message Access Protocol), IMAPS (secure IMAP over the TLS or former SSL to cryptographically protect IMAP connections) as well as the earlier POP3 (Post Office Protocol) and the secure variant POP3S. In addition to IMAP and POP3 which are the prevalent standard protocols for retrieving messages, other email protocols implemented for proprietary servers include the SMTP (Simple Mail Transfer Protocol). Like HTTP and FTP protocols, email protocols such as IMAP, POP3 and SMTP are based on the client-server model over a reliable data stream channel, typically a TCP connection. An email retrieval session such as a SMTP session including 0 or more SMTP transactions consists of commands originated by a SMTP client and corresponding responses from the SMTP server, so that the session is opened, and parameters are exchanged.

Like file transfer protocols, email protocols provide commands which, similar to the HTTP request methods, can be used by the network security system 104 to transmit the synthetic requests. Examples of the text-based commands include HELO, MAIL, RCPT, DATA, NOOP, RSET, SEND, VRFY and QUIT for SMTP protocol, and commonly used commands like USER, PASS, STAT, LIST RETR, DELE, RSET, TOP and QUIT for POP3 protocol. Additional information about email protocol commands can be found at Request for Comments (RFC Standard Track publications from the Internet Society, Internet Engineering Task Force (IETF)), e.g., RFC 2821 https://tools.ietf.org/html/rfc2821 for SMTP Commands; RFC 3501 https://tools.ietf.org/html/rfc3501 for IMAP Commands; RFC 1939 https://tools.ietf.org/html/rfc1939 for POP3 (last visited Mar. 24, 2021), which are incorporated by reference for all purposes as if fully set forth herein.

Another communication protocol which may support synthetic request-response paradigm is the Lightweight Directory Access Protocol (LDAP) and its secure variant LDAPS (i.e., LDAP over SSL). This communication protocol is an open, vendor neutral, industry standard application protocol for accessing and maintaining distributed directory information services over Internet network. A client starts an LDAP session by connecting to a LDAP server over a TCP/IP connection. The client then sends an operation request to the server which in turn sends a response in return. Analogous to HTTP request methods and FTP commands, a LDAP client may request from server the following operations: Bind, Search, Compare, Add, Delete, Modify, Modify DN, Unbind, Abandon, and Extended. Additional information about the LDAP protocol can be found at https://en.wikipedia.org/wiki/Lightweight_Directory_Access_Protocol, which is incorporated by reference for all purposes as if fully set forth herein.

Real-Time Streaming Protocol (RTSP), Real-Time Messaging Protocol (RTMP) and its secure variant RTMPS (RTMP over TLS/SSL) are some proprietary protocols for real-time streaming audio, video and data over the Internet network that are implementable by the disclosed synthetic request-response mechanism. For example, the RTSP protocol is used for establishing and controlling media sessions between two endpoints. Similar in some ways to HTTP, RSTP defines control sequences (referred as commands, requests or protocol directives) useful in controlling multimedia playback. Clients of media server issue RTMP requests, such as PLAY, RECORD and PAUSE to facilitate real-time control of streaming from a client to a server (Voice Recording), while some commands travel from a server to a client (Video on Demand). Some typical HTTP requests, e.g., the OPTIONS request, are also available in RSTP and are implementable by the disclosed synthetic request-response mechanism. Additional information about the RTSP and its commands can be found at https://en.wikipedia.org/wiki/Real_Time_Streaming_Protocol; additional information about the RTMP/RTMPS can be found at https://en.wikipedia.org/wiki/Real-Time_Messaging_Protocol, which are incorporated by reference for all purposes as if fully set forth herein.

In other implementations, the disclosed synthetic request-response mechanism can be implemented in real-time chat/instant messaging (IM) protocols like XMPP (Jabber), YMSG (Yahoo! Messenger), MSNP (Windows Live Messenger), Skype, IRC, etc. The disclosed synthetic request injection can be also implemented in collaborative apps such as Slack, Microsoft Teams, Cisco WebEx that also allow sharing information and messages in a channel for across companies, cross organizational collaboration. Some applications like Slack start out as HTTP/S and then fall into a web socket mode where they treat the connection as a TCP connection and use a non-HTTP/S protocol for communication.

Slack, an example collaborative app, offers IRC-style (Internet Relay Chat) features in messaging protocols like XMPP, including persistent chat rooms (channels) organized by topic, private groups, and direct messaging. Content, including files, conversations, and people, is all searchable within Slack. Slack also provides an API for users to create applications and automate process, such as sending automatic notifications based on human input, sending alerts on specified conditions, and automatically creating internal support tickets.

Slack is a collaboration hub, after all, designed to bring the right people together with the right information through features like search, teams, shared channels, apps and integration, and so on. Slack teams, one of Slack features, allow communities, groups, or teams to join a "workspace" via a specific URL or invitation sent by an administrator or owner of the team. Slack organizes conversations into dedicated spaces called channels. Slack's public channels, open to everyone in the workspace, allow team members to communicate without the use of email or group SMS (texting). Private channels allow for private conversations between smaller sub-groups. Direct messages allow users to send private messages to specific users rather than the whole group of the workspace.

The disclosed synthetic request-response injection can be implemented in such instant messaging protocols and for collaboration apps. Additional information about such instant messaging protocols can be found at Comparison of instant messaging protocols, https://en.wikipedia.org/w/index.php?title=Comparison_of_instant_messaging_protocols&oldid=1013553466 (last visited Apr. 8, 2021), which is incorporated by reference for all purposes as if fully set forth herein.

Overcoming Metadata Deficiency

Portions of the specification may refer to "metadata-deficient transactions," "metadata-deficient requests," "metadata-deficient application sessions," and "metadata-deficient connections." Metadata deficiency in a transaction/request/application session/connection is characterized by the absence of target metadata required to make a policy determination, and thereby to enforce a policy. Consider, for example, a policy that requires that only corporate user credentials be used to access the cloud applications 108 and not private user credentials. When metadata (e.g., request header fields) that typically specify user credentials are missing from the transaction/request/application session/connection, then there exists a metadata deficiency that can be overcome by the disclosed synthetic request injection.

The metadata deficiency may result for different reasons under different circumstances. Typically, CASB and SWG proxies operate in a passive mode—monitoring network traffic that pass through the proxies to extract metadata and annotate client requests that are proxied (i.e., rerouted, or intercepted). For example, some cloud applications support multiple login instances, for example, a corporate instance to access Google Drive™ like "jocuser@companyxyz.com" and a private instance to access Google Drive™ like "jocuser@gmail.com." In such cases, the proxies may want to annotate the client transactions, e.g., HTTP/HTTPS transactions, to Google Drive™ with a user instance ID used to initiate the client transactions. The proxies may be configured to persist the user instance ID for reporting purposes or to apply policies.

In order to determine the user instance ID, the proxies need to process a login transaction that contains the user instance ID. If such a login transaction does not bypass the proxies and is intercepted, the proxies then need to persist the state of the login transaction, i.e., store the user instance ID extracted from the login transaction and build a mapping from the cookie and URL parameters set for that login with the instance information.

Circumstances arise when metadata like the user instance ID is not accessible to the proxies. For example, the proxies may have missed the login transaction that establishes the metadata mapping. This happens, for example, when the clients 102 are already logged into the cloud applications 108 prior to rerouting of an application session to the proxies. As a result, the proxies do not capture the login transaction. Subsequent transactions, which follow the login transaction and are captured by the proxies, are not useful because they do not contain the required metadata. In another circumstance, some cloud applications, such as native mobile applications, the transaction that establishes the metadata mapping is sent once or very infrequently, and therefore sometimes missed by the proxies.

The disclosed synthetic request injection enables the proxies to separately retrieve the otherwise missing metadata directly from the cloud applications 108 on an ad hoc basis. The proxies no longer need to be dependent on the metadata mapping transactions as the sole source of metadata. This makes the proxies self-sufficient and greatly expands their policy enforcement horizon.

Actions

Beyond obtaining metadata information, the disclosed synthetic request injection can also execute actions on the cloud applications 108, for example, on an ad hoc basis. For example, the synthetic requests can be used by the proxies to perform actions against the cloud applications 108 using the original transaction's authority. In the case of inline CASBs, this can be used to implement real-time enforcement of actions without a prior authorization or a prior access grant, as required with out-of-band API CASBs. This also allows the inline CASBs to inject policy actions for unsanctioned applications for which the CASBs lack API connectors.

The disclosed synthetic request injection can also execute actions on resources (e.g., objects, files, computing instances) of the cloud applications 108. For example, the synthetic requests can retrieve objects from the cloud applications 108. The synthetic requests can change security configuration of the objects on the cloud applications 108. The synthetic requests can be used to modify the security posture of the objects, i.e., change the security configuration of the objects, either after uploading the objects to the cloud applications 108, or after downloading the objects from the cloud applications 108. For example, the synthetic requests can change the share settings of an object from "sharing allowed" to "sharing not allowed," or from "sharing allowed externally" to "sharing allowed only internally." The synthetic requests can move an object from one location to another location in the cloud applications 108, or from one cloud application to another cloud application, for example, when there is an active session with another cloud application.

The information generated/retrieved by the synthetic requests can be used to block transmission of the objects to and from the cloud applications 108. The synthetic requests can encrypt the objects before or after the objects arrive at the cloud applications 108. The synthetic requests can quarantine the objects before or after the objects arrive at the cloud applications 108. The synthetic requests can extract metadata from another request or transaction, for example, to determine the activity being performed, to determine the user instance ID being used, and to determine the sensitivity tag of an object. The synthetic requests can also run inline DLP checks on the objects to determine their sensitivity in real-time, and responsively execute security actions like blocking, allowing, encrypting, quarantining, coaching, and seeking justification based on the determined sensitivity.

In some implementations, transmission (or flow) of objects to or from cloud applications can be controlled/modulated (e.g., blocked) when the synthetic request/s is/are used to determine that the object being manipulated (e.g., being downloaded, moved, versioned etc.) is sensitive based on the retrieved sensitivity metadata and that the account-type from which the manipulation was initiated or attempted is an uncontrolled or private account (e.g., non-corporation instance) based on the retrieved login metadata. This way, a combination of login metadata and sensitivity metadata retrieved by use of one or more synthetic requests can be used for policy enforcement. Generally speaking, metadata of different types/formats/creation dates/creation sources/storage origins, retrieved by one or more synthetic requests or retrieved from one or more sources by one or more synthetic requests, can be analyzed in the aggregate or as a combination to make a policy enforcement decision on one or more objects.

The disclosed synthetic request injection can also in turn cause the cloud applications 108 to execute actions. For example, the synthetic requests can cause the cloud applications 108 to crawl objects residing in the cloud applications 108 and generate an inventory of the objects and associated metadata (e.g., an audit of share settings, collaboration networks, user assignments, and sensitivity statuses of the objects). The inventory can then be provided to the network security system 104 by the corresponding synthetic response. The network security system 104 can then use the inventory for policy enforcement.

Consider, for example, the Box™ storage cloud application which provides an administrative API called the Box Content API™ to provide visibility into an organization's accounts of its users. The synthetic requests can poll the administrative API to discover any changes made to any of the accounts. Alternatively, the synthetic requests can register with the administrative API to inform the network security system 104 of any significant events. For example, the synthetic requests can use Microsoft Office365 Webhooks API™ to learn when a file has been shared externally. In other implementations, the disclosed synthetic request-response mechanism can interface with user APIs, in addition to/instead of administrative APIs.

Retrieving metadata and executing actions are some examples of target network security objectives that can be achieved using the disclosed synthetic request injection. A person skilled in the art will appreciate that the application of the disclosed concept of configuring a network intermediary or middleware like the network security system 104 with network request-response (or request-reply) mechanism and methods to self-generate requests to satisfy a cloud security requirement may vary from use case-to-use case, architecture-to-architecture, and domain-to-domain. The request-response mechanism and methods can be implemented in various network protocols for inter-process communications like FTP, FTPS, GOPHER, HTTP, HTTPS, IMAP, IMAPS, LDAP, LDAPS, POP3, POP3S, RTMP, RTMPS, RTSP, SCP, SFTP, SMTP, SMTPS, SPDY and TFTP.

Endpoint Devices

An "unmanaged device" is referred to as a Bring Your Own Device (BYOD) and/or an off-network device whose traffic is not being tunneled through the network security system 104. The network security system 104 analyzes the incoming traffic to determine whether the cloud application transactions are made within the confines of a corporate network and/or from a device with a security agent or security profile installed. A device can be classified as an unmanaged device or as a managed device based on certain device characteristics collected by an endpoint routing agent (ERC). Depending on the type of device, the ERC can be a virtual private network (VPN) such as VPN on demand or per-app-VPN that use certificate-based authentication. For example, for iOS™ devices, it can be a per-app-VPN or can be a set of domain-based VPN profiles. For Android™ devices, it can be a cloud director mobile app. For Windows™ devices, it can be a per-app-VPN or can be a set of domain-based VPN profiles. The ERC can also be an agent that is downloaded using email or silently installed using mass deployment tools like ConfigMgr™, Altris™, and Jamf™.

The ERC collects device information such as registry key, active directory (AD) membership, presence of a process, operating system type, presence of a file, AD domain, encryption check, OPSWAT check, media access control (MAC) address, IMEI number, and device serial number. Based on the collected device information, the ERC classifies the device as unmanaged or managed. Additional or different categories can be used to classify a device such as a semi-managed device category or an unknown device category.

For additional information regarding how the network security system 104 determines whether the incoming traffic is routed from a managed device or an unmanaged device, reference can be made to, for example, commonly owned U.S. patent application Ser. Nos. 14/198,499; 14/198,508; 14/835,640; 14/835,632; and 62/307,305, which are incorporated by reference for all purposes as if fully set forth herein.

Portions of the specification may make distinctions between two types of endpoint devices used by users to access the cloud applications 108. The primary distinction is between the mechanisms for coupling the endpoint devices to the network security system 104. In relation to endpoint devices, the term "computer" will refer to more open systems where the network security system 104 can more directly install software and modify the networking stack. Similarly, in relation to endpoint devices, the terms "mobile" or "tablet" will refer to more closed systems where the network security system options for modifying the network stack are more limited. This terminology mirrors the situation today where computer-endpoint devices running Mac OS X, Windows desktop versions, Android, and/or Linux can be more easily modified than mobile or tablet devices running iOS, and/or Windows Mobile. Thus, the terminology refers to how third-party operating system vendor limitations are addressed to provide access to the network security system as opposed to a fundamental technical difference between the types of endpoint devices. Further, if mobile OS vendors open their systems further, it is likely that the distinction could be eliminated with more classes of endpoint devices. Additionally, it can be the case that certain server computers and other computing devices within an organization can have the client installed to cover machine-to-machine communications.

A closely related point is that some clients interface with the network security system 104 differently. The browser add-on clients or PAC (proxy auto-configuration) files, for example, redirect the browsers to an explicit proxy. Only the traffic needed to apply the policy to is rerouted and it is done so within the application. The traffic arriving at the network security system 104 can have the user identity embedded in the data or within the secure tunnel headers, e.g., additional headers or SSL client side certificates. Other clients redirect select network traffic through transparent proxies. For these connections, some traffic beyond exactly those requests needed by the policy can be routed to the network security system 104. Further, the user identity information is generally not within the data itself, but rather established by the client in setting up a secure tunnel to the network security system 104.

The interconnection between the clients 102, the network security system 104, and the cloud applications 108 will now be described. A public network couples the clients 102, the network security system 104, and the cloud applications 108, all in communication with each other. The actual communication path can be point-to-point over public and/or private networks. Some items, such as the ERC, might be delivered indirectly, e.g., via an application store. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

Policy

The term "policy," sometimes also referred to as a policy definition or policy data or content policy refers to a machine-readable representation of flow control and content control requirements for the cloud applications 108. Typically, a policy is defined by one or more administrators at a corporation, or other entity, and is enforced upon users within that corporation, or entity. It is possible for individuals to define policies for their own usage that are enforced upon them; however, corporate usage is the more common case. It is also possible for a policy to be enforced on visitors or customers of a cloud application, e.g., where a corporation hosts or subscribes to a cloud application and requires visiting customers, users, or employees to adhere to the policy for use. Of particular note is that the policies considered herein are capable of being sensitive to the semantics of a cloud application, which is to say a policy can differentiate between logging in to a cloud application from, say, editing documents on the cloud application.

Context is important for understanding usage; for an entity, the collection of dozens or hundreds of individual policies (e.g., log bulk downloads, prohibit editing documents on the service, only allow bulk downloads for users who are in the "Vice President" group) is referred to singularly as one policy or one policy definition. Thus, a system supporting multiple entities will generally have one policy per entity, each made up of dozens or hundreds of individual flow control and content control policies. Similarly, the policy that is transferred to individual computers can be a subset of a full corporate policy, e.g., solely a machine-readable representation of the URLs of interest, as opposed to the full policy specification for each URL describing the flow control and/or content manipulations.

A "multi-part policy" refers to a policy that specifies triggering of at least one security action when at least one condition about the transaction is met. A multi-part policy applies to a single transaction, but at least one policy condition of the multi-part policy requires evaluation of data or metadata not available in the single transaction. Also, a multi-part policy applies to a single transaction, but at least one policy condition of the multi-part policy requires evaluation of data or metadata available in an external data or metadata store. Further, a multi-part policy applies to a single transaction, but at least one policy condition of the multi-part policy requires evaluation of data or metadata generated by an external engine. A multi-part policy applies in real-time during active analysis, but at least one policy condition of the multi-part policy requires evaluation of data or metadata collected in deferred time or during non-real-time inspection. Examples of multi-part policies include "prevent user from uploading/downloading, if user is at risk as indicated by anomaly detection," "prevent sharing of a content, if the content is sensitive," "prevent download of a file to a device, if the device is at risk as indicated by a malware detection engine," "prevent deletion of a virtual machine, if the virtual machine is a critical server," and others.

Metadata Retrieval

FIG. 1 shows one implementation of the network security system 104 issuing a synthetic request during an application session of a cloud application to retrieve metadata that is otherwise missing from the application session. In FIG. 1, a client issues an authentication request 122 to log into a cloud application. The authentication request 122 provides a metadata mapping. The metadata mapping specifies a login instance (e.g., an email identified by "from-user" or "instance-id" information) used by the client to access the cloud application. The authentication request 122 also includes an authentication token that the client uses to access the cloud application. Successful authentication 138 results in the establishment 114 of an application session 144.

As illustrated in FIG. 1, the authentication request 122 bypasses the network security system 104. The bypass can be due to a variety of reasons, some of which are discussed above. More importantly, the bypass results in the network security system 104 not able to capture the metadata mapping. This presents itself as a technical problem because certain security policies are based on the "from-user" or "instance-id" information.

Eventually though, the client is rerouted to the network security system 104, by, for example, an endpoint routing client (ERC), such as a browser add-in or an agent running on the client. When this happens, from there onwards, the application session 144 is intermediated by the network security system 104 and subsequent requests from the client are intercepted by the network security system 104. In other implementations, the application session 144 comes under the ambit of the network security system 104 when an incoming request 152 is sent by the client towards the cloud application and rerouted to the network security system 104 for policy enforcement. Most commonly, the incoming request 152 is a client request of a communication protocol, e.g., HTTP/HTTPS client request that attempts to execute an application activity transaction on the cloud application. The communication protocols such as HTTP, HTTPS, FTP, IMAP, SNMP and SNTP define the basic patterns of dialogue which support request-response messaging patterns and commonly operate in an application layer.

Upon receiving the incoming request 152 during the application session 144, the network security system 104 determines 154 whether it has access to metadata required to enforce a security policy on the incoming request 152. In one implementation, this determination is made by inspecting a transaction header (e.g., HTTP and HTTPS headers) of the incoming request 152 and probing whether certain fields and variables supply the required metadata. In another implementation, this determination is made by looking up a metadata mapping store (e.g., a Redis in-memory cache) and inquiring whether there already exists a metadata mapping associated with an application session identifier ("app-session-ID") of the application session 144. In the scenario illustrated in FIG. 1, both these evaluations would reveal that the required metadata is missing because the authentication request 122 that provided the metadata mapping was never captured by the network security system 104.

Accordingly, when the network security system 104 determines that it does not have access to the required metadata for the policy enforcement, it holds 164 the incoming request 152 and does not transmit it to the cloud application. Then, the network security system 104 generates a synthetic request 168 and injects the synthetic request 168 into the application session 144 to transmit the synthetic request 168 to the cloud application. The synthetic request 168 is configured to retrieve the missing metadata from the cloud application by inducing an application server of the cloud application to generate a response that includes the missing metadata. The network security system 104 configures the synthetic request 168 with the authentication token supplied by the incoming request 152 so that the synthetic request 168 can access the cloud application.

The network security system 104 then receives a synthetic response 176 to the synthetic request 168 from the cloud application. The synthetic response 176 supplies the missing metadata 178 to the network security system 104. The network security system 104 then uses the metadata 178 for metadata-based policy enforcement 184. For example, if the metadata 178 specifies that the login instance was from a controlled account (e.g., a corporate email), then the network security system 104 releases the incoming request 152 and transmits 186 it to the cloud application. In contrast, if the metadata 178 specifies that the login instance was from an uncontrolled account (e.g., a private email), then the network security system 104 blocks the incoming request 152 and does not transmit it to the cloud application, or, in other implementations, alerts the end user that a policy enforcement has prevented the activity from being completed.

The discussion now turns to some example implementations of how, in different scenarios, the network security system 104 constructs the synthetic requests and retrieves metadata from the synthetic responses. A person skilled in the art will appreciate that the disclosed synthetic request injection is not limited to these example implementations.

There may exist, now and in future, other ways of implementing the disclosed synthetic request injection. This disclosure may not explicitly enumerate these other ways. Still, these other ways are within the scope of this disclosure because the intended purpose of the disclosed synthetic request injection is to enforce and improve network security. Variants of this intended purpose may be realized in different ways in different network architectures without deviating from the disclosed concept of configuring a network intermediary or middleware like the network security system 104 with network request-response (request-reply) mechanism and methods to self-generate requests to achieve a variety of network security objectives.

Synthetic Listener Mode

Figure 2:
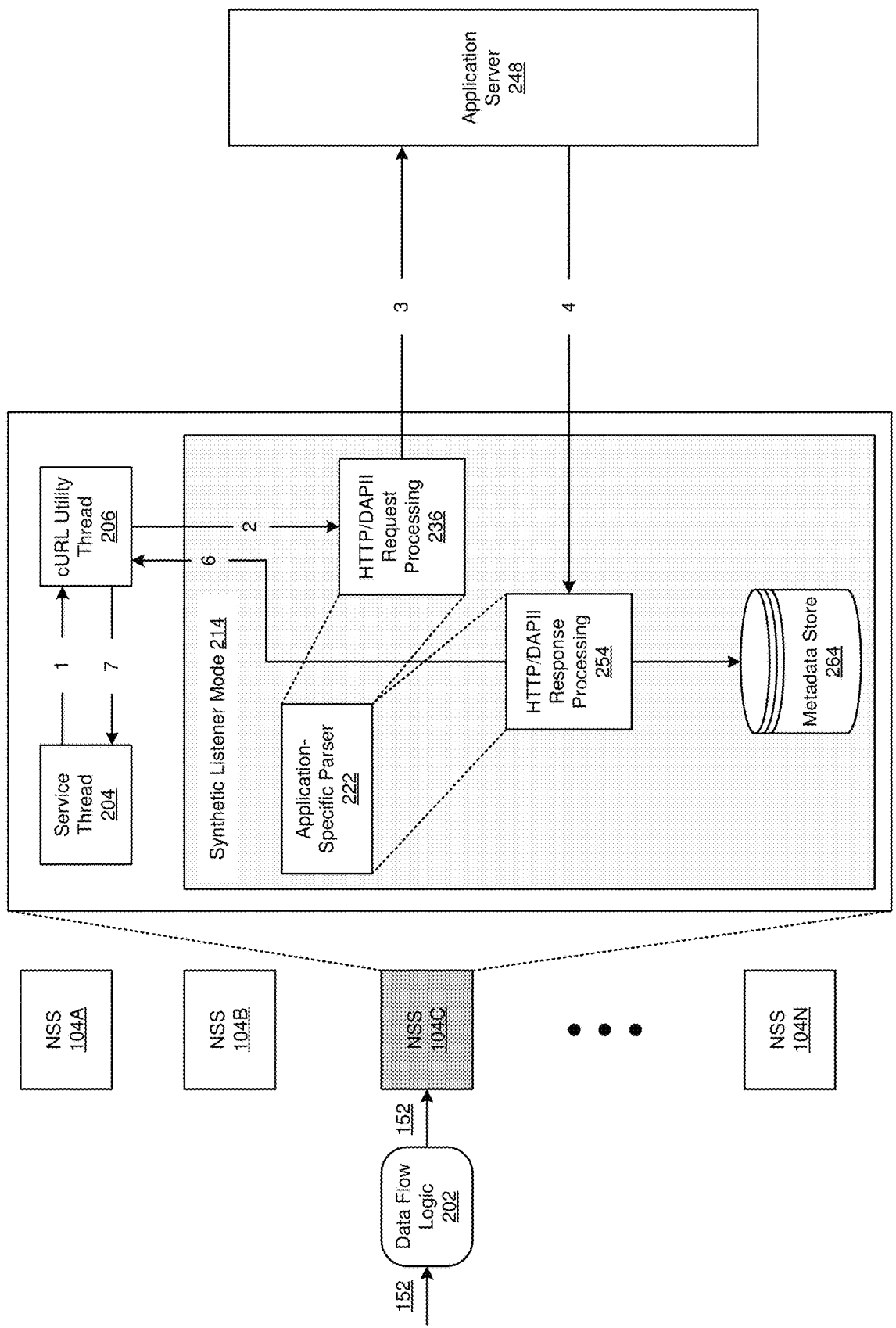
FIG. 2 depicts a synthetic listener mode of injecting a synthetic request in an application session of a cloud application and extracting metadata from a corresponding synthetic response in accordance with one implementation of the technology disclosed.

FIG. 2 depicts a synthetic listener mode of injecting a synthetic request in an application session of a cloud application and extracting metadata from a corresponding synthetic response in accordance with one implementation of the technology disclosed. In some implementations of the synthetic listener mode, the network security system 104 uses application-specific parsers (or connectors) and synthetic templates to construct the synthetic requests and extract the metadata-of-interest from the synthetic responses.

FIG. 2 shows many instances 104A-N of the network security system 104. A data flow logic 202, running to the network security system 104, injects the incoming request 152 to a processing path of a particular instance 104C of the network security system 104. In one implementation, the particular instance 104C of the network security system 104 passes the incoming request 152 to a service thread 204. The service thread 204 holds the incoming request 152 and instructs a client URL (cURL) utility thread 206 to initiate a cURL request (operation 1). Additional information about the cURL requests can be found at, e.g., The Art Of Scripting HTTP Requests Using Curl, https://curl.se/docs/httpscripting.html (last visited Mar. 17, 2021) and CURL, https://en.wikipedia.org/w/index.php?title=CURL&oldid=1002535730 (last visited Mar. 18, 2021), which are incorporated by reference for all purposes as if fully set forth herein.

The cURL utility thread 206 injects the cURL request into a synthetic listener mode 214 (operation 2). The synthetic listener mode 214 selects an application-specific parser 222 that is specific to the cloud application targeted by the incoming request 152 (e.g., by identifying the cloud application as a resource from a URL parameter or an HTTP request header field of the incoming request 152). The application-specific parser 222 specifies match conditions that are specific to request and response syntaxes defined for a particular application programming interface (API) of the cloud application.

The application-specific parser 222 implements a DAPII (Deep Application Programming Interface Inspection), e.g., HTTP/DAPII request processing 236, which uses a synthetic template to determine whether the metadata-of-interest is missing from the application session 144. When the metadata-of-interest is found to be missing, the synthetic template constructs a synthetic request using headers, fields, values, and parameters defined with syntax that elicits the metadata-of-interest from an application server 248 of the cloud application. At operation 3, the constructed synthetic request is sent to the application server 248.

At operation 4, a synthetic response from the application server 248 is routed to the synthetic listener mode 214. In some implementations, the synthetic response is processed by a service thread (not shown). The application-specific parser 222 implements an HTTP/DAPII response processing 254 to extract the metadata-of-interest from the synthetic response. The extracted metadata (e.g., the "from-user" or "instance-id" information) is stored in a metadata store 264 (at operation 5) for use in policy enforcement. At operation 6, a cURL response is sent back to the cURL utility thread 206, which in turn sends back a response to the service thread 204 (at operation 7). The service thread 204 then releases the held incoming request 152.

Synthetic Templates

As discussed above, the synthetic requests are constructed by synthetic templates of application-specific parsers, according to one implementation of the technology disclosed. A particular application-specific parser of a cloud application can have a set of synthetic templates. Respective synthetic templates in the set of synthetic templates can correspond to respective activities, for example, one synthetic template for upload activities, synthetic template for download activities, and yet another synthetic template for share activities. The set of synthetic templates can include a default synthetic template for generic activities (e.g., logins, log-outs). The set of synthetic templates can also include a specialized synthetic template for native apps running on endpoints (e.g., mobiles, computers).

Figure 3:
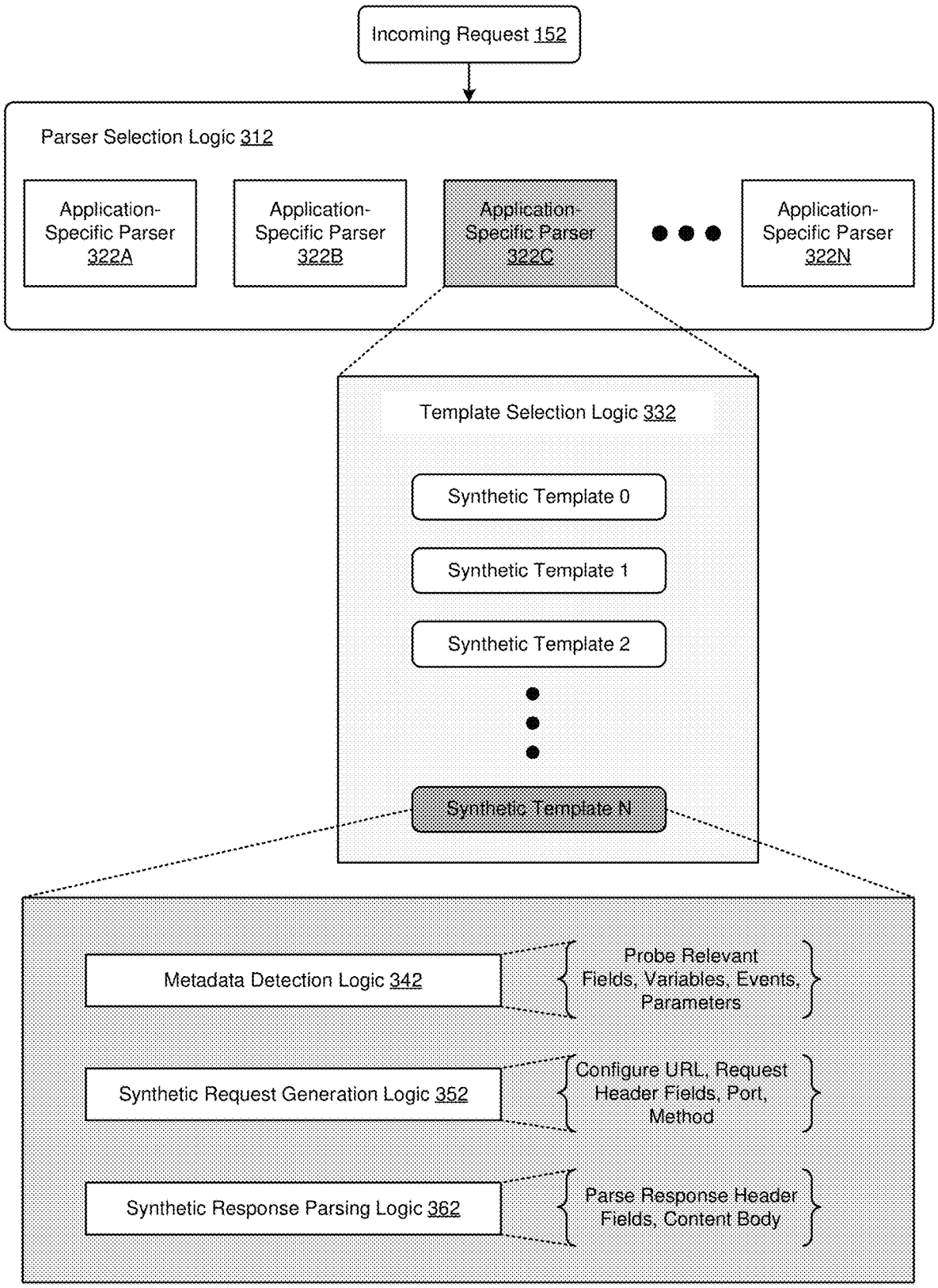
FIG. 3 shows one implementation of a processing path that generates synthetic requests using application-specific parsers and synthetic templates.

FIG. 3 shows one implementation of a processing path that generates synthetic requests using application-specific parsers and synthetic templates. In FIG. 3, a parser selection logic 312 selects a particular application-specific parser 322C from a plurality of application-specific parsers 322A-N. The particular application-specific parser 322C is specific to the cloud application targeted by the incoming request 152. The parser selection logic 312 determines that the incoming request 152 is directed to the cloud application because a resource of the cloud application is specified by a URL parameter or a request header field of the incoming request 152 of a communication protocol (e.g., FTP, FTPS, GOPHER, HTTP, HTTPS, IMAP, IMAPS, LDAP, LDAPS, POP3, POP3S, RTMP, RTMPS, RTSP, SCP, SFTP, SMTP, SMTPS, SPDY and TFTP). The parser selection logic 312 then invokes the particular application-specific parser 322C. In some implementations, when no application-specific parser is available for a given cloud application, the parser selection logic 312 can select a universal parser that, for example, applies to an entire category of cloud applications (e.g., social media sites, messenger apps, blogs).

A template selection logic 332 selects a particular synthetic template from a set of synthetic templates 0-N of the particular application-specific parser 322C. In one implementation, the template selection logic 332 uses if-then-else rules and match conditions to select the particular synthetic template. For example, if the metadata-of-interest is available, then the synthetic listener mode is exited and normal processing of the incoming request 152 resumed. If the metadata-of-interest is missing and the activity is a generic activity (e.g., a login event), then a default synthetic template is used to construct the synthetic request. If the metadata-of-interest is missing and the activity is a particular activity (e.g., an upload event), then a specialized synthetic template that is specific to the particular activity is used to construct the synthetic request. If the metadata-of-interest is missing and the cloud application is a native app, then a specialized synthetic template that is specific to native apps is used to construct the synthetic request. Also, in some implementations, the synthetic templates are defined as JSON files.

Once the particular synthetic template of the particular application-specific parser 322C is selected, a metadata detection logic 342 of the particular synthetic template can determine whether relevant fields, variables, events, or parameters of the incoming request 152 or a metadata-mapping store contain the metadata-of-interest. If not, a synthetic request generation logic 352 of the particular synthetic template can construct the synthetic request by configuring those request header fields that elicit a response from the application server of the cloud application which supplies the metadata-of-interest. In some implementations, the synthetic request generation logic 352 uses some of the fields, variables, events, or parameters that are part of the incoming request 152 to construct the synthetic request.

A synthetic response parsing logic 362 of the particular synthetic template can parse response header fields and content body of the synthetic response to extract the metadata-of-interest. Alternatively, the metadata extraction can be done directly by the particular application-specific parser 322C, without using the particular synthetic template.

Processing Flow

Figure 4:
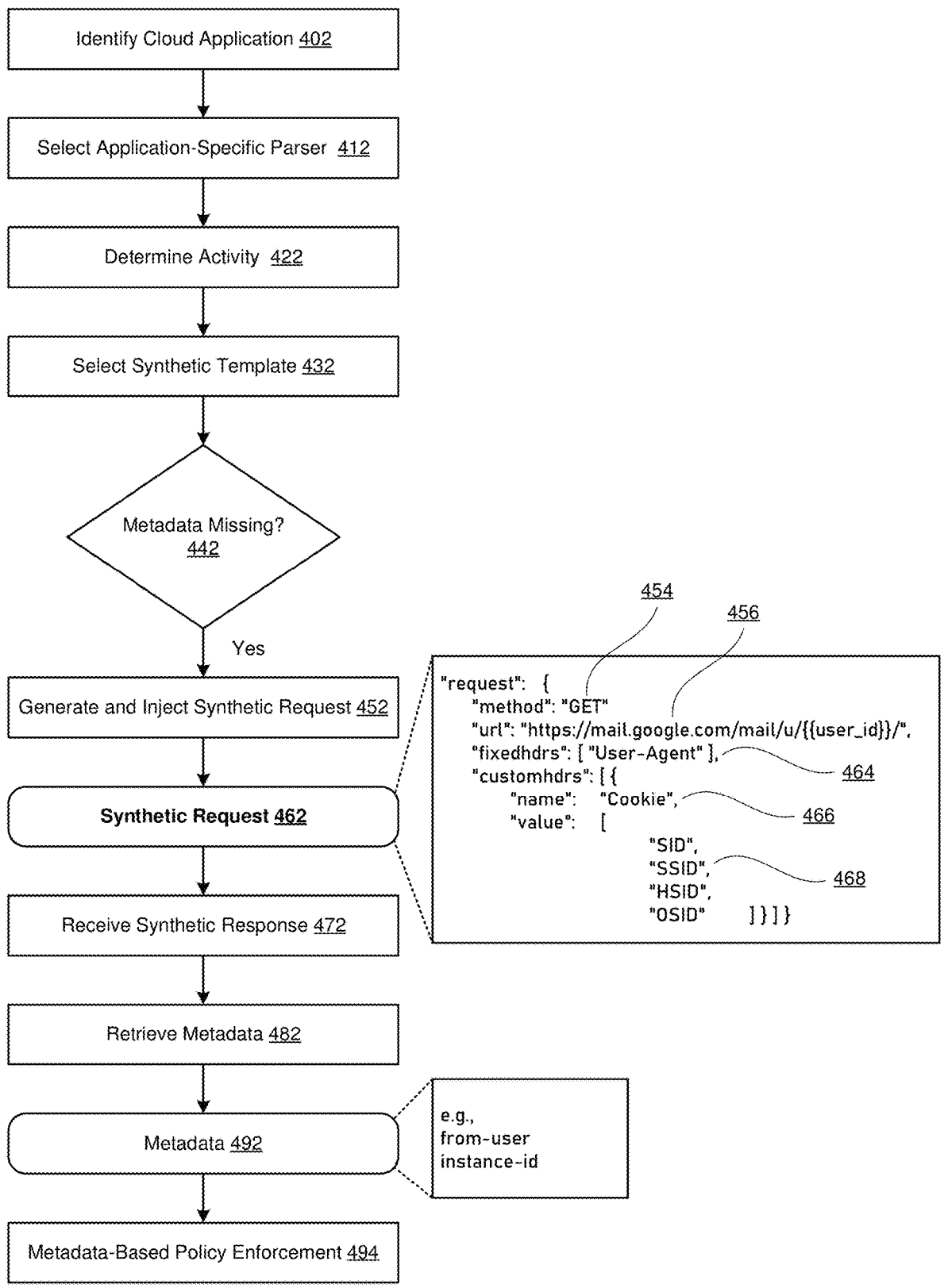
FIG. 4 shows one implementation of a processing flow that generates an example synthetic request.
Figure 5:
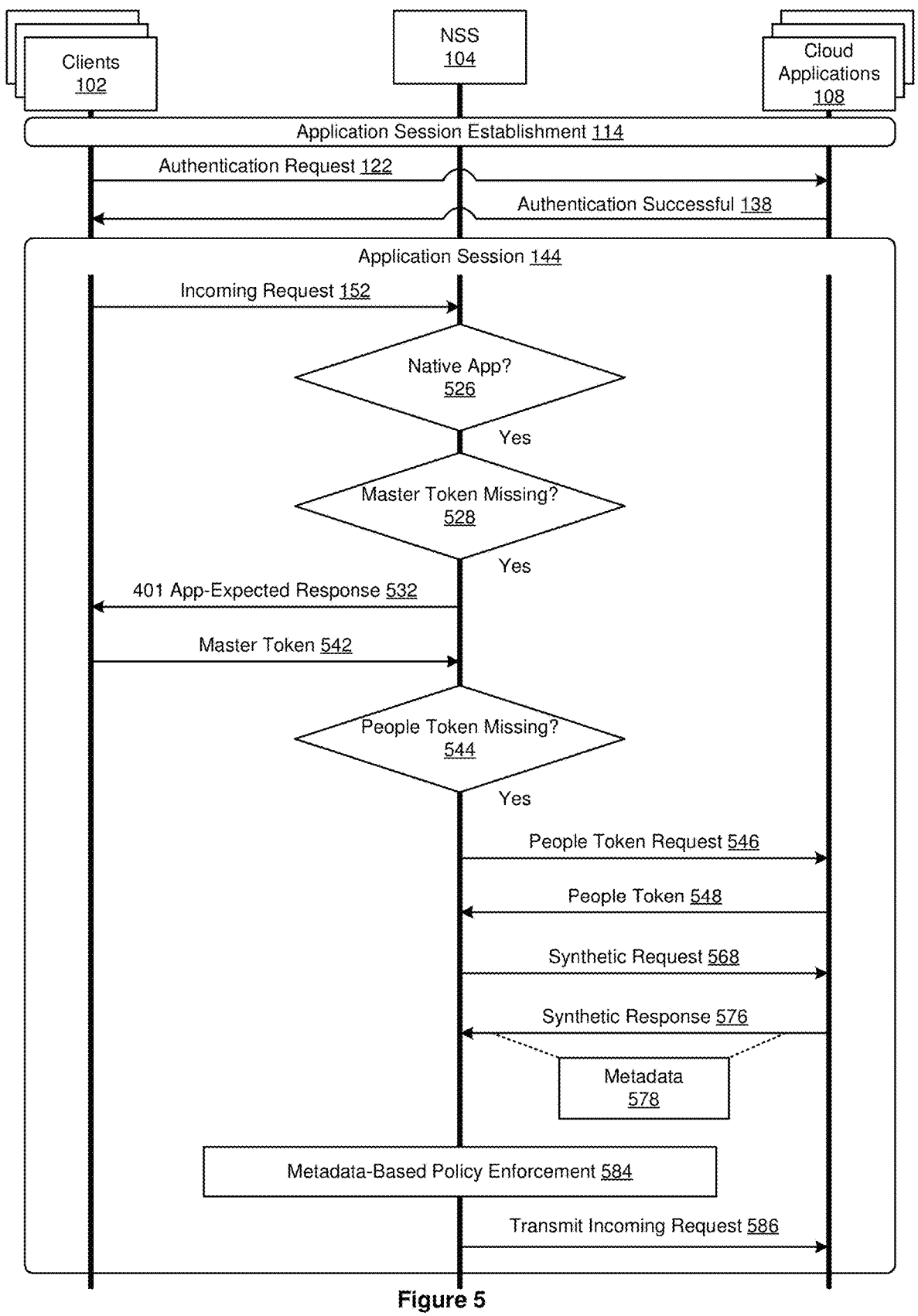
FIG. 5 shows one implementation of using bi-directional synthetic requests for native apps.
Figure 9:
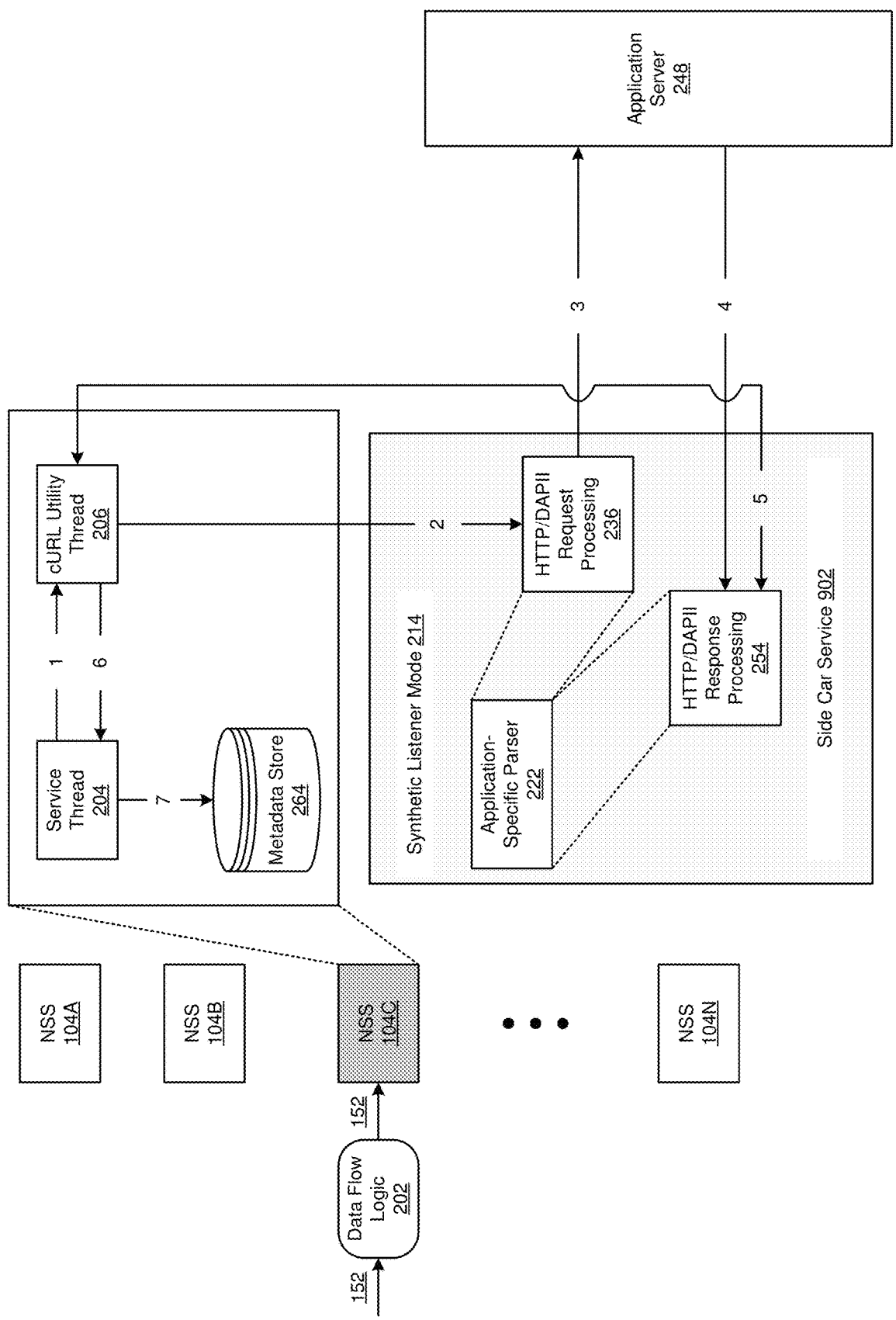
FIG. 9 shows one implementation of a side car service that is shared by multiple instances of a network security system to generate synthetic requests.
Figure 10:
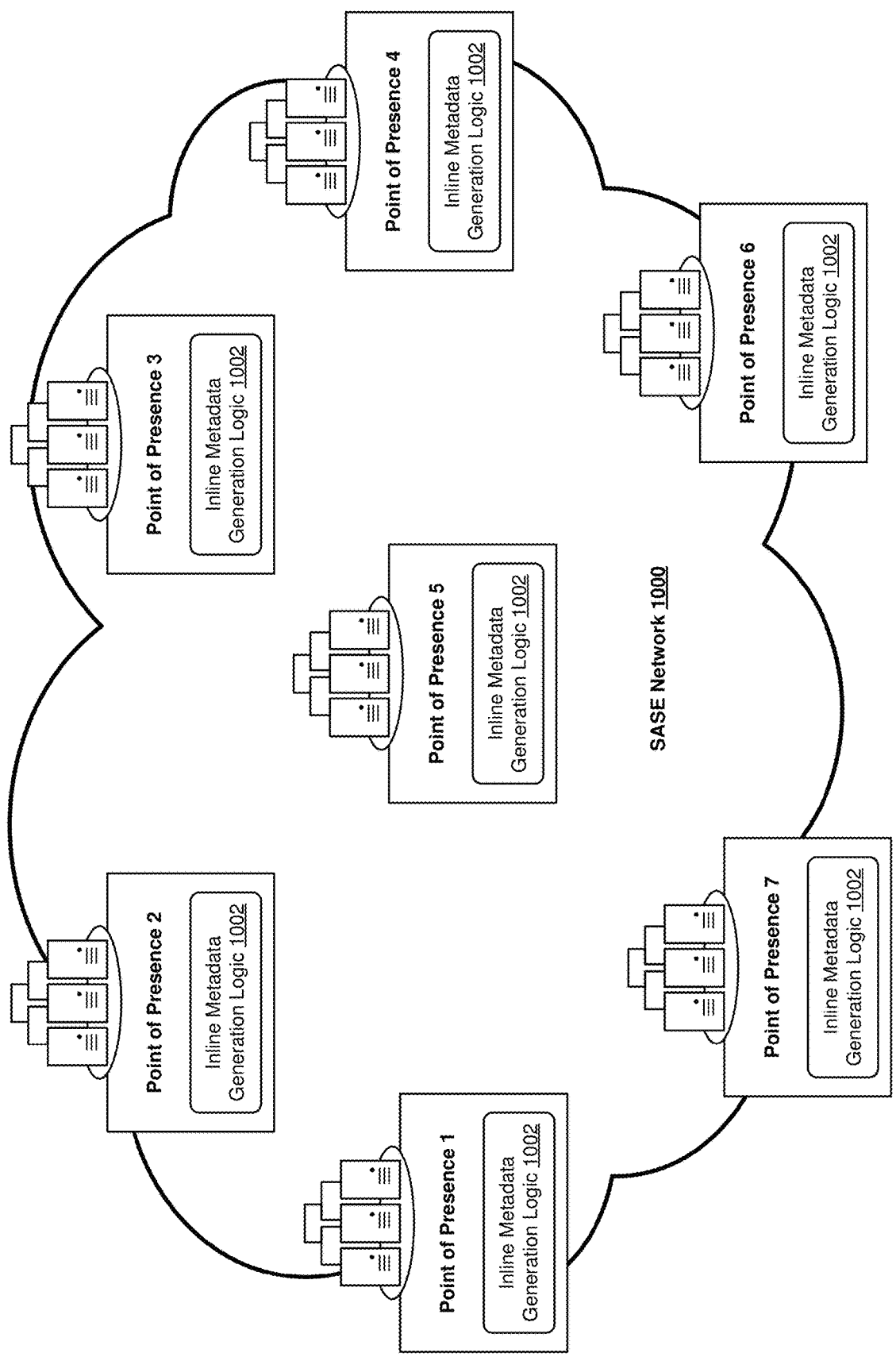
FIG. 10 shows an example secure access service edge (SASE) network with a plurality of geographically distributed points of presence.
Figure 11:
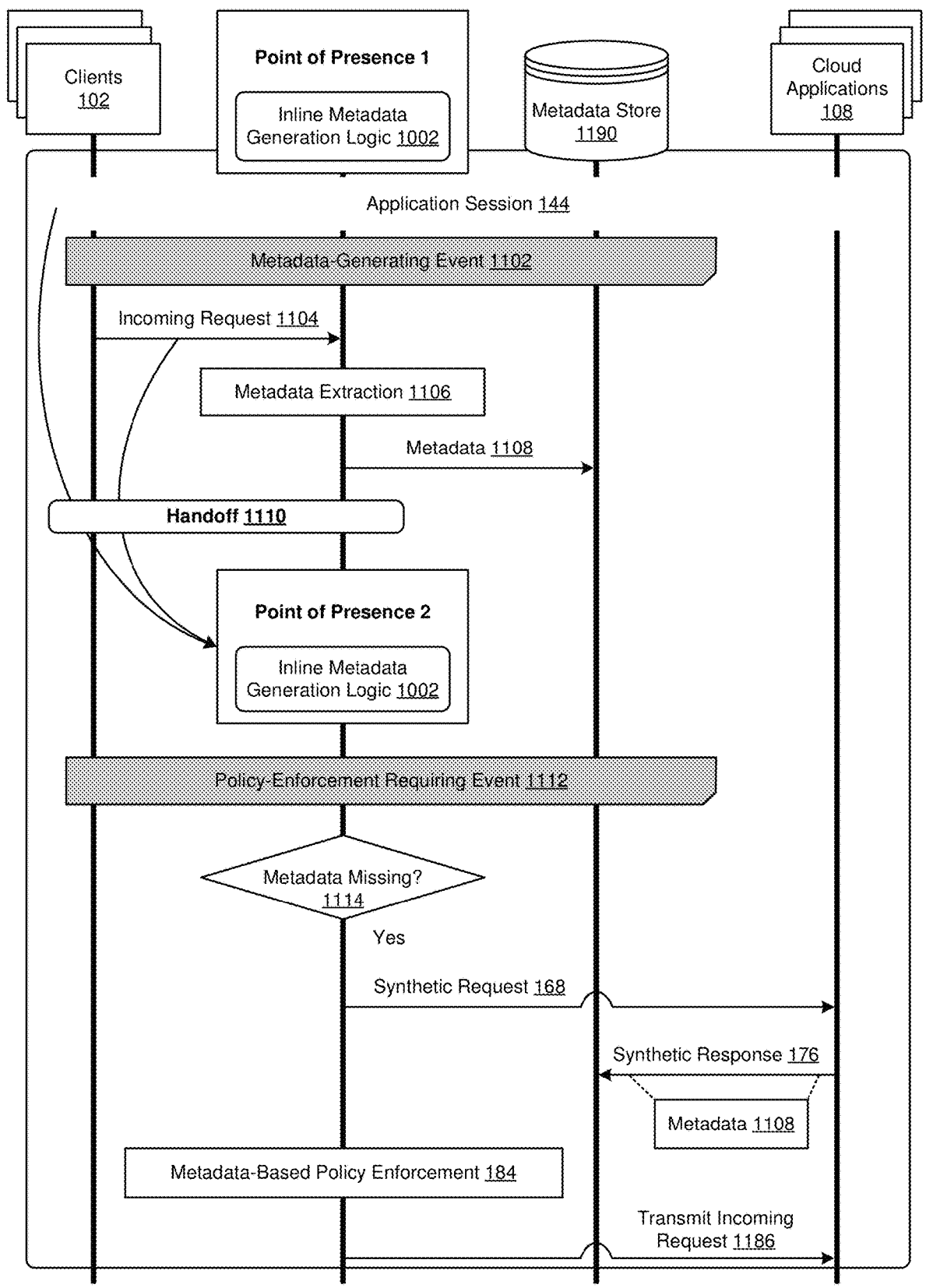
FIG. 11 shows one implementation of use of synthetic requests in a proxy handoff situation.

FIG. 4 shows one implementation of a processing flow that generates an example synthetic request. The steps illustrated in FIG. 4 can be executed on server-side or client-side. At step 402, a client transaction requesting interaction with a cloud application is intercepted. At step 412, an application-specific parser specific to the cloud application is invoked. At step 422, the application-specific parser processes the client transaction and determines an activity being performed by the client transaction.

At step 432, a particular synthetic template is selected that is specific to the cloud application and the determined activity. At step 442, the particular synthetic template determines that the metadata-of-interest required to process the client transaction is missing. At step 452, the particular synthetic template is used to generate and inject a synthetic request 462. The synthetic request 462 uses a method, e.g., HTTP GET method 454, has a URL 456, has a fixed header 464 like user-agent, and has a custom header 466 with cookie data 468 like SID, SSID, HSID, and OSID.

At step 472, a synthetic response is received to the synthetic request 462. At step 482, the metadata-of-interest 492 is retrieved from the synthetic response. At step 494, the retrieved metadata 492 is used for policy enforcement on the client transaction.

Object-Based Storage Services

Cloud-based storage which have resources that store data, e.g., documents, is one of fundamental technology alongside cloud compute and network required in a cloud environment. Cloud storage thus can also be referred to as cloud-based data stores or cloud-based resources in the context of this application. Cloud storage services provide users functionality to persist and operate data in the cloud and that is the target of DLP policies in the context of this application, e.g., logging in, editing documents, downloading bulk data, reading customer contact information, entering payables, and deleting documents. Cloud storage services 108 can be a network service or application, or can be web-based (e.g., accessed via a URL) or native, such as sync clients.

Figure 21:
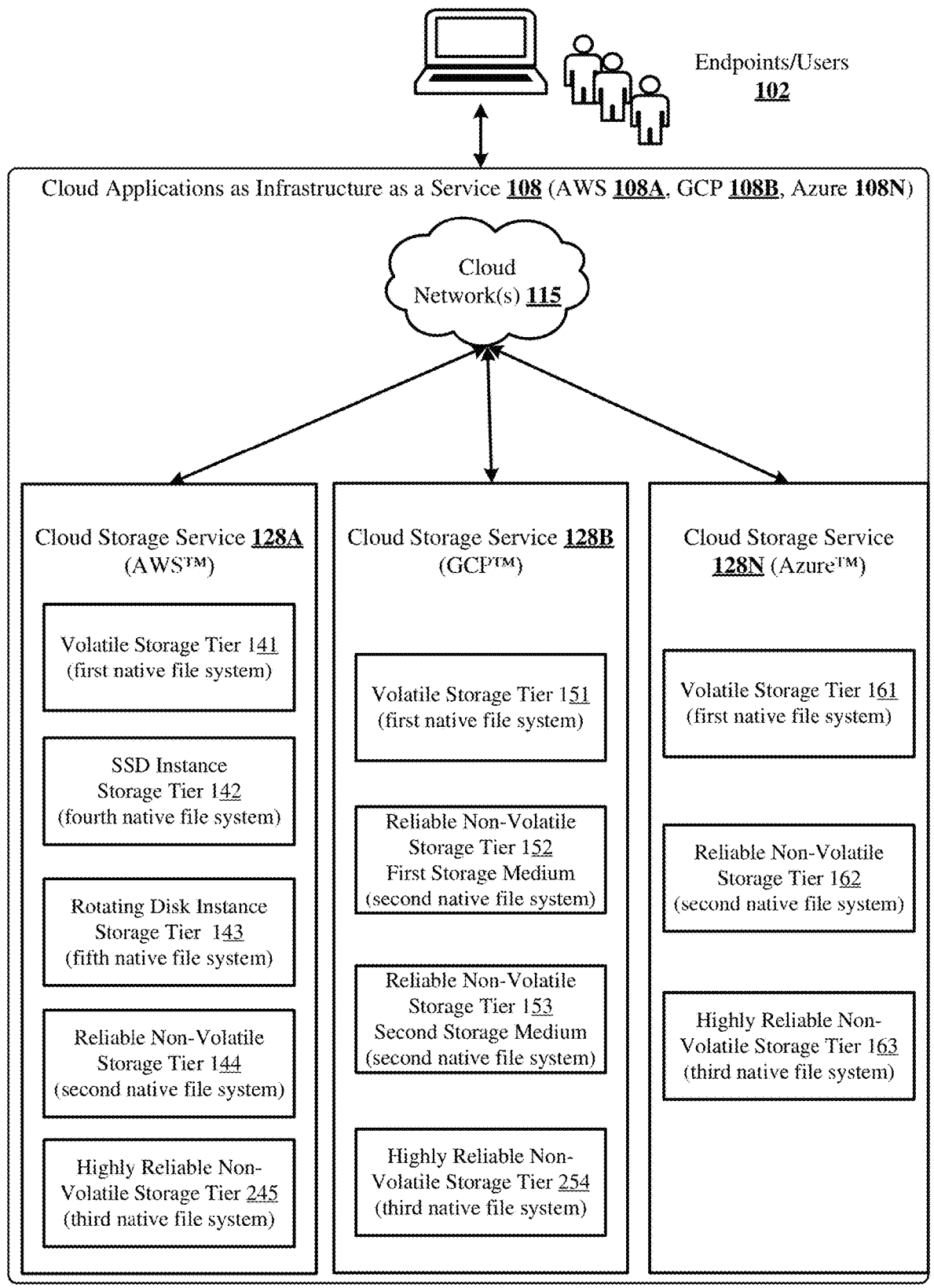
FIG. 21 illustrates one implementation of the technology disclosed operating in a cloud-based environment with resources in different cloud storage services.

Examples of cloud applications which provide cloud storage services today include applications such as BOX™, DROPBOX™, GOOGLE DRIVE™, SALESFORCE.COM™, MICROSOFT ONEDRIVE 365™, platforms such as APPLE ICLOUD DRIVE™, ORACLE ON DEMAND™, and ALIBABA CLOUD™, and infrastructure such as AMAZON AWS™, GOOGLE CLOUD PLATFORM™ (GCP), and MICROSOFT AZURE™. In FIG. 21, Cloud applications 108 offer infrastructure-as-a-service (IaaS) that provide cloud-based computation, storage, and other functionality that enable organizations and individuals to deploy applications and services on an on-demand basis and at commodity prices.

Consider three example cloud applications as IaaS: AMAZON WEB SERVICES™ (AWS) 108A, GOOGLE CLOUD PLATFORM™ (GCP) 108B, and MICROSOFT AZURE™ 108N with cloud storage services. GCP as an example provides three main storage services for different types of storages: Persistent Disk™ for block storage, Filestore™ for network file storage, and Cloud Storage™ for object storage. However, it is understood that environment 100 can include any number of various cloud applications 108, and is not limited to these.

Block storage and file storage are the traditional storage types. Block storage operates at a lower level—the raw storage device level—and manages data as a set of numbered, fixed-size blocks. File storage operates at a higher level—the operating system level—and manages data as a named hierarchy of files and folders. Block and file storage are often accessed over a network in the form of a Storage Area Network (SAN) for block storage, using protocols such as iSCSI or Fibre Channel, or as a Network Attached Storage (NAS) file server or "filer" for file storage, using protocols such as Common Internet File System (CIFS) or Network File System (NFS). Whether directly-attached or network-attached, block or file, this kind of storage is very closely associated with the server and the operating system that is using the storage.

Object storage is a non-traditional data storage architecture for large stores of unstructured data. It designate each piece of data as an object, keeps it in a separate storehouse, and bundle it with metadata and a unique identifier for easy access and retrieval. https://cloud.google.com/learn/what-is-object-storage Object storage offers a range of benefits for managing unstructured data that does not fit easily into traditional database. Unstructured data includes email, videos, photos, webpages, audio files, sensor data and other type of web content. Common use cases include using object storage as a persistent data store for building or migrating to cloud-native applications, storing large amounts of any data type and performing big data analytics, managing machine-to-machine data efficiently and reducing costs for storing and globally distributing rich media.

To accommodate a variety of potential use cases, cloud storage services offer different storage choices, examples of which include memory, message queues, storage area network (SAN), direct-attached storage (DAS), network attached storage (NAS), databases, and backup and archive. Each of these storage options differs in performance, durability, and cost, as well as in their interfaces. Combinations of storage options form a hierarchy of data storage tiers.

In FIG. 21, AMAZON WEB SERVICES™ (AWS) 108A offers multiple cloud-based storage tiers. Each tier has a unique combination of performance, durability, availability, cost, and interface, as well as other characteristics such as file systems and APIs. AWS 108A also offers an on-demand cloud computing platform called ELASTIC COMPUTE CLOUD™ (EC2), which allows AWS consumers to create and run compute instances on AWS 108A. EC2 instances use familiar operating systems like Linux, Windows, or OpenSolaris. Consumer can select an instance type based on amount and type of memory and computing power needed for the application or software they plan to run on the EC2 instance. The different AWS 128A storage tiers are made accessible through EC2.

Examples of AWS 128A cloud storage services accessible via EC2 are Amazon SIMPLE STORAGE SERVICE™ (S3)

(scalable storage in the cloud), AMAZON GLACIER™ (low-cost archive storage in the cloud), Amazon ELASTIC BLOCK STORAGE™ (EBS) (persistent block storage volumes for Amazon EC2 virtual machines), Amazon EC2 INSTANCE STORAGE™ (temporary block storage volumes for Amazon EC2 virtual machines), Amazon ELASTICACHE™ (in-memory caching service), AWS IMPORT/EXPORT™ (large volume data transfer), AWS STORAGE GATEWAY™ (on-premises connector to cloud storage), Amazon CLOUDFRONT™ (global content delivery network (CDN)), Amazon SQS™ (message queue service), Amazon RDS™ (managed relational database server for MySQL, Oracle, and Microsoft SQL Server), Amazon DYNAMODB™ (fast, predictable, highly-scalable NoSQL data store), Amazon REDSHIFT™ (Fast, powerful, full-managed, petabyte-scale data warehouse service), and databases on Amazon EC2™ (self-managed database on an Amazon EC2 instance). For additional information about different storage options and services offered by AWS cloud storage service 128A, reference can be made to J. Baron and S. Kotecha, "Storage options in the AWS cloud," Amazon Web Services, Washington D.C., Tech. Rep., October 2013, which is incorporated by reference for all purposes as if fully set forth herein.

In FIG. 21, five example AWS 128A storage tiers are illustrated as blocks 141-145, i.e., volatile storage tier 141, solid-state drive (SSD) instance storage tier 142, rotating disk instance storage tier 143, reliable non-volatile storage tier 144, and highly reliable non-volatile storage tier 145. Volatile storage tier 141 represents the in-memory storage of an EC2 instance, such as file caches, object caches, in-memory databases, and random access memory (RAM) disks. Volatile storage tier 141 has a first native file system that is an in-memory file system suitable for providing rapid access to data. Examples of first native file system are Apache Ignite™ and temporary file storage facility (tmpfs). Volatile storage tier 141 improves the performance of cloud-based applications by allowing data retrieval from fast, managed, in-memory caches, instead of slower disk-based databases.

Although volatile storage tier 141 is the fastest storage tier, it has the least durability and reliability of 99.9% (three nines), making it is suitable for temporary storage such as scratch disks, buffers, queues, and caches. EC2 local instance store volumes, Amazon SQS™, Amazon ElastiCache™ (Memcached or Redis) are some examples of AWS 128A offerings under the volatile storage tier 141.

AWS 128A offers ephemeral storage called instance tier that is physically attached to an EC2 instance. The ephemeral storage uses either rotating disks or solid-state drives (SSDs). SSD volumes can be non-volatile memory express (NVMe) based or SATA based. Ephemeral storage can also be redundant array of separate disks (RAID) configured to improve performance.

The illustrated SSD instance storage tier 142 is implemented as AWS ephemeral storage that uses SSDs as a storage medium and provides temporary block storage for an EC2 instance. This tier comprises a preconfigured and pre-attached block of disk storage on the same physical server that hosts the EC2 instance. SSD instance storage tier 142 has a fourth native file system that is very fast and typically best for sequential access. SSD instance storage tier, to accommodate a variety of potential use cases, is optimized for high sequential input/output (I/O) performance across very large datasets. Example applications include NoSQL databases like Cassandra™ and MongoDB™, data warehouses, Hadoop™ storage nodes, seismic analysis, and cluster file systems.

Rotating disk instance storage tier 143 is implemented as AWS ephemeral storage that uses hard disk drives (HDDs) as a storage medium and has a fifth native file system. Throughput-Optimized HDD™ and Cold HDD™ are examples of HDD volume type storage offered by AWS 128A. Throughput-Optimized HDD™ volumes are low-cost HDD volumes designed for frequent-access, throughput-intensive workloads such as big data, data warehouses, and log processing. These volumes are significantly less expensive than SSD volumes. Cold HDD™ volumes are designed for less frequently accessed workloads such as colder data requiring fewer scans per day. Cold HDD™ volumes are significantly less expensive than Throughput-Optimized HDD™ volumes.

Reliable non-volatile storage tier 144 is implemented as AWS Elastic Block Store™ (EBS) with a second native file system. This implementation provides block level storage volumes for use with EC2 instances. This implementation provides EBS volumes that are off-instance, network-attached storage (NAS) persisting separately from the running life of an EC2 instance. After an EBS volume is mounted to an EC2 instance, it can be used as a physical hard drive, typically by formatting it with the native file system of choice and using the file I/O interface provided by the EC2 instance operating system. There is no AWS data APIs for EBS. Instead, EBS presents a block-device interface to the EC2 instance. That is, to the EC2 instance, an EBS volume appears just like a local disk drive. To write to and read data from reliable non-volatile storage tier 244, the native file system I/O interfaces of the chosen operating system are used.

Highly reliable non-volatile storage tier 145 depicts an example AWS Amazon Simple Storage Service™ (S3) with a third native file system. This tier provides object storage with a web service interface to store and retrieve huge amounts of data at very low costs and high latency. It delivers the highest level of rated durability of 99.999999999% (eleven nines), approximately.

Amazon S3 provides standards-based REST and SOAP web services APIs for both management and data operations. These APIs allow access of S3 objects (files) to be stored in uniquely-named buckets (top-level folders). Buckets are a simple flat folder with no file system hierarchy. Each object can have a unique object key (file name) that serves as an identifier for the object within that bucket.

The third native file system of S3 is an object-based file system that operates on the whole object at once, instead of incrementally updating portions of the objects. The third native file system uses a PUT command to write objects into S3, a GET command to read objects from S3, a DELETE command to delete objects, a POST command to add objects using HyperText Markup Language (HTML) forms, and a HEAD command to return an object's metadata but not the data itself. In other implementations, a file system hierarchy (e.g., folder1/folder2/file) can also be emulated in S3 by creating object key names that correspond to the full path name of each file.

FIG. 21 also shows four examples of Google Cloud Platform™ (GCP) 128B storage tiers as blocks 151-154. This includes volatile storage tier 151, reliable non-volatile storage tier 252 with a first storage medium, reliable non-volatile storage tier 153 with a second storage medium, and highly reliable non-volatile storage tier 154. GCP 128B allows consumers to create scalable virtual machines. Each virtual machine has access to memory in volatile storage tier

151 hosting a first native file system. The reliable non-volatile storage tier 152 offers persistent storage of data on a first storage medium (e.g., NVMe SSDs). This storage tier hosts a second native file system. The reliable non-volatile storage tier 153 also hosts the second native file system but offers persistent storage of data on a second storage medium (Seq. HDD). The highly reliable non-volatile storage tier 154 is an object store hosting a third native file system.

FIG. 21 further illustrates three example Microsoft Azure™ (Azure) 128C storage tiers as blocks 161-163, i.e., volatile storage tier 161, reliable non-volatile storage tier 162, and highly reliable non-volatile storage tier 163. For online transactional processing (OLTP), online analytical processing (OLAP), and hybrid transaction/analytical processing (HTAP), Azure 128C allows consumers to optimize performance using in-memory storage of volatile storage tier 261 that hosts a first native file system. The reliable non-volatile storage tier 162 provides persistent storage of data using a block storage scheme and hosts a second native file system. The highly reliable non-volatile storage tier 163 provides object storage by storing data as blobs inside containers and hosts a third native file system.

Recent developments in cloud-based object storage enable it to store any amount of data on the cloud with rich functionalities and optimized performance. Cloud service providers like AMAZON WEB SERVICES™ (AWS), GOOGLE CLOUD PLATFORM™ (GCP), and MICROSOFT AZURE™ offering infrastructure as a service (IaaS) all provide object storage solutions for the cloud. For example, Amazon Simple Storage Service™ (S3) is depicted in highly reliable non-volatile storage tier 145 in FIG. 1 with a third native file system. This AWS tier provides object storage with a web service interface to store and retrieve large amounts of data. Google Cloud Platform™ also has highly reliable non-volatile storage tier 154 in FIG. 1 which is an object store hosting a third native file system. The highly reliable non-volatile storage tier 163 provided by Microsoft Azure™ has object storage by storing data as blobs inside containers and hosts a third native file system.

Amazon S3, for example, is durable and scalable cloud object storage that is optimized for reads and is built with an intentionally minimalistic feature set. It provides a simple and robust abstraction for file storage that frees one from many underlying details that one normally deals with in traditional storage. Instead of being closely associated with a server, Amazon S3 storage is separate of a server and is accessed over the Internet. Instead of managing data as blocks or files using SCSI, CIFS, or NFS protocols, data is managed as objects using an Application Program Interface (API) built on standard HTTP verbs.

Common use cases for Amazon S3 storage include backup and archive for on-premises or cloud data; content, media, and software storage and distribution; big data analytics; static website hosting; cloud-native mobile and Internet application hosting; and disaster recovery. To support these use cases and many more, Amazon S3 offers a range of storage classes designed for various generic use cases: general purpose, infrequent access, and archive. To help manage data through its lifecycle, Amazon S3 offers configurable lifecycle policies. By using lifecycle policies, one can have their data automatically migrate to the most appropriate storage class, without modifying their application code. In order to control who has access to their data, Amazon S3 provides a rich set of permissions, access controls, and encryption options.

With Amazon S3, one does not have to worry about device or file system storage limits and capacity planning—a single bucket can store an unlimited number of files. One also does not need to worry about data durability or replication across availability zones—Amazon S3 objects are automatically replicated on multiple devices in multiple facilities within a region. The same with scalability—if their request rate grows steadily, Amazon S3 automatically partitions buckets to support very high request rates and simultaneous access by many clients.

Each Amazon S3 object consists of data (the file itself) and metadata (data about the file). The data portion of an Amazon S3 object is opaque to Amazon S3. This means that an object's data is treated as simply a stream of bytes—Amazon S3 does not know or care what type of data one is storing, and the service doesn't act differently for text data versus binary data. The metadata associated with an Amazon S3 object is a set of name/value pairs that describe the object. There are two types of metadata: system metadata and user metadata. System metadata is created and used by Amazon S3 itself, and it includes things like the date last modified, object size, MD5 digest, and HTTP Content-Type. User metadata is optional, and it can be specified at the time an object is created. One can use custom metadata to tag their data with attributes that are meaningful.

Objects are stored in containers called buckets, and each object is identified by a unique user-specified key (filename) that serves as an identifier for the object within that bucket. An object can store virtually any kind of data in any format. Objects can range in size from 0 bytes up to 5 TB, and a single bucket can store an unlimited number of objects. This means that Amazon S3 can store a virtually unlimited amount of data.

Buckets are generally used for organizing objects in Amazon S3. A bucket is associated with an AWS account that is responsible for storing and retrieving data on the bucket. The account, which owns the bucket, is charged for data transfer. Buckets are a simple flat folder (top-level folders) with no file system hierarchy, i.e., one cannot have a sub-bucket within a bucket. Buckets form the top-level namespace for Amazon S3, and bucket names are global. This means that their bucket names must be unique across all AWS accounts, much like Domain Name System (DNS) domain names, not just within their own account. Bucket names can contain up to 63 lowercase letters, numbers, hyphens, and periods. One can create and use multiple buckets; one can have up to 100 per account by default. It is a best practice to use bucket names that contain their domain name and conform to the rules for DNS names. This ensures that their bucket names are their own, can be used in all regions, and can host static websites. Buckets play a vital role in access control and pave the way for creating usage reports on S3.

Even though the namespace for Amazon S3 buckets is global, each Amazon S3 bucket is created in a specific region that one chooses. This lets one control where their data is stored. One can create and use buckets that are located close to a particular set of end users or customers in order to minimize latency or located in a particular region to satisfy data locality and sovereignty concerns, or located far away from their primary facilities in order to satisfy disaster recovery and compliance needs. One can control the location of their data; data in an Amazon S3 bucket is stored in that region unless one explicitly copies it to another bucket located in a different region.

Buckets and objects are also used in other cloud storage services such as MICROSOFT AZURE™, GOOGLE CLOUD PLATFORM™, and ALIBABA CLOUD STORAGE™. For example, Microsoft Azure provides software as a service (SaaS), platform as a service (PaaS) and infrastructure as a service (IaaS) like Amazon AWS. In the context of MICROSOFT AZURE™, the buckets correspond to blobs. Azure Blob storage, Microsoft's object storage solution for the cloud, is an object-based storage service made up of containers and objects. Containers are similar to prefixes in the world of Amazon S3. Azure Blob storage is optimized for storing massive amounts of unstructured data that does not adhere to a particular data model or definition (e.g., text or binary data). Users or client applications can access object in Blob storage via HTTP/HTTPS, from anywhere in the web. Objects in Azure Blob storage are accessible via the Azure Blob storage REST API, Azure PowerShell, Azure CLI, or an Azure Blob client library. https://docs.microsoft.com/en-us/azure/storage/blobs/storage-blobs-introduction GOOGLE CLOUD PLATFORM™ (GCP) is a suite of cloud computing services offered by Google as a part of Google Cloud™. Alongside a set of management tools, GCP provides a series of modular cloud services including computing, data storage, data analytics and machine learning. Google's Cloud Storage™ is Google's object storage solution for the cloud, providing service for storing your objects in Google Cloud™. An object is an immutable piece of data consisting of a file of any format. Objects are stored in containers called buckets. Buckets are the basic containers that hold data in Google's Cloud Storage™ (GCS). Buckets are used to organize your data and control access to your data. Everything that you store in GCS must be contained in a bucket. Unlike directories and folders, buckets cannot be nested. All buckets are associated with a project which consists of a set of users, a set of APIs, billing, authentication, and monitoring settings for those APIs. While there is no limit to the number or buckets you can have in a project or location, there are limits to the rate you can create or delete buckets. You can have one project or multiple projects, and you can group your projects under an organization.

A bucket in Google's Cloud Platform™, like buckets of Amazon S3, is created with a globally-unique name and a geographic location where the bucket and its contents are stored. Bucket names have more restrictions than object names and must be globally unique, because every bucket resides in a single Google Cloud Storage™ namespace. Also, bucket names can be used with a CNAME redirect, which means they need to conform to DNS naming conventions. The name and location of the bucket cannot be changed after creation, though you can delete and re-create the bucket to achieve a similar result. There are also optional bucket settings that can be configured during bucket creation and be changed later.

Bucket labels are key:value metadata pairs that allow you to group your buckets along with other Google Cloud™ resources such as virtual machine instances and persistent disks. For example, you can use labels (metadata pairs) to create a team key that has values alpha, beta, and delta, and apply the team:alpha, team:beta, and team:delta labels to different buckets in order to indicate which team is associated with those buckets. You can apply multiple labels to each bucket, with a maximum of 64 labels per bucket. As a generally the case for bucket metadata, bucket labels are not associated with individual objects or object metadata. https://cloud.google.com/storage/docs/key-terms.

Objects are the individual pieces of data stored in Google's Cloud Storage™ (GCS). There is no limit on the number of objects that can be created in a bucket. Objects have two components: object data and object metadata. Object data is typically a file that you want to store in GCS. Object metadata is a collection of name-value pairs that describe various object qualities. An object's name is treated as a piece of object metadata in GCS. Object names can contain any combination of Unicode characters (UTF-8 encoded) and must be less than 1024 bytes in length, and must be unique within a bucket.

Google's Cloud Storage™ (GCS) uses a flat namespace to store objects, which means that GCS see all objects in a given bucket as separate with no hierarchical relationship. A common character used in object names is the slash (/) character as if they were stored in a virtual hierarchy. For example, you could name one object /europe/france/paris.jpg and another object /europe/france/cannes.jpg. When you list these objects, they appear to be in a hierarchical directory structure under the folders europe and France, though the objects are stored separately with no hierarchical relationship whatsoever.

An object in GCS can have different versions: by default, when you overwrite an object, GCS deletes the old version and replaces it with a new version. Each object version is uniquely identified by its generation number, found in the object's metadata. When object versioning has created an older version of an object, you can use the generation number to refer to the older version. This allows you to restore an overwritten object in your bucket, or permanently delete older object versions that you no longer need. Generation numbers are also used when you include preconditions in your requests.

A resource is an entity within Google Cloud™. Each storage entity like project, bucket, and object in Google Cloud™ is a resource, as are compute entities such as compute engine instances. Each resource has a unique name that identifies it, much like a filename. Buckets have a resource name in the form of projects/_/buckets/[BUCKET_NAME], where [BUCKET_NAME] is the ID of the bucket. Objects have a resource name in the form of projects/_/buckets/[BUCKET_NAME]/objects/[OBJECT_NAME], where [OBJECT_NAME] is the ID of the object.

Figure 22:
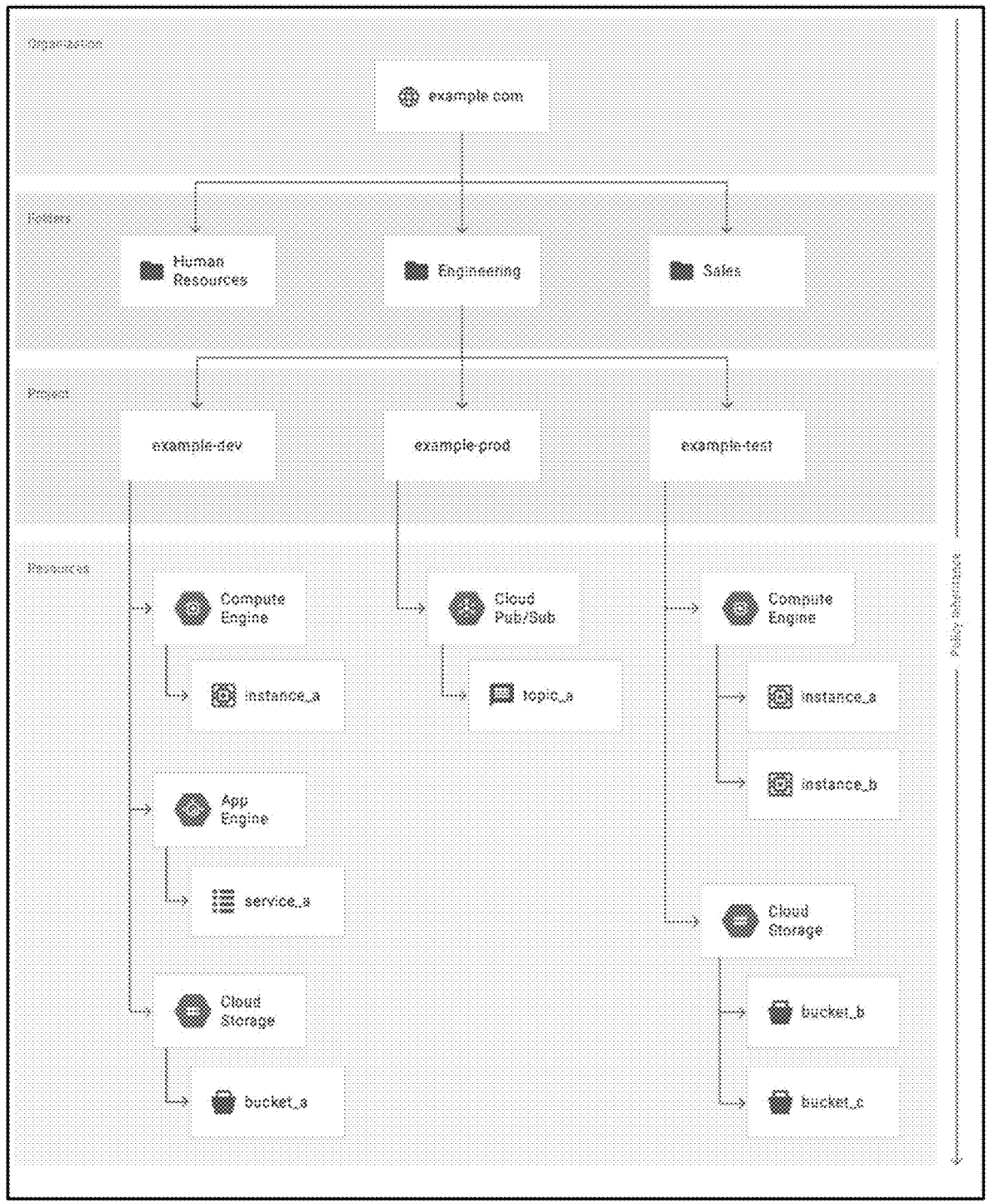
FIG. 22 one example of resources on GOOGLE CLOUD PLATFORM™.

In the context of GOOGLE CLOUD PLATFORM™ 108B as shown in FIG. 22, a resource can be a folder 2212 under the organization 2202 on or of a cloud storage service, a project 2222 on or of a cloud storage service, and/or a resource 2232 on or of a cloud storage service. Furthermore, a resource can be a computing instance 2242, 2262 on or of a cloud storage service, a topic 2252 on or of a cloud storage service, a service 2272 on or of a cloud storage service, a bucket 2282, 2292 on or of a cloud storage service, and/or an object within a bucket 282, 392.

Figure 23:
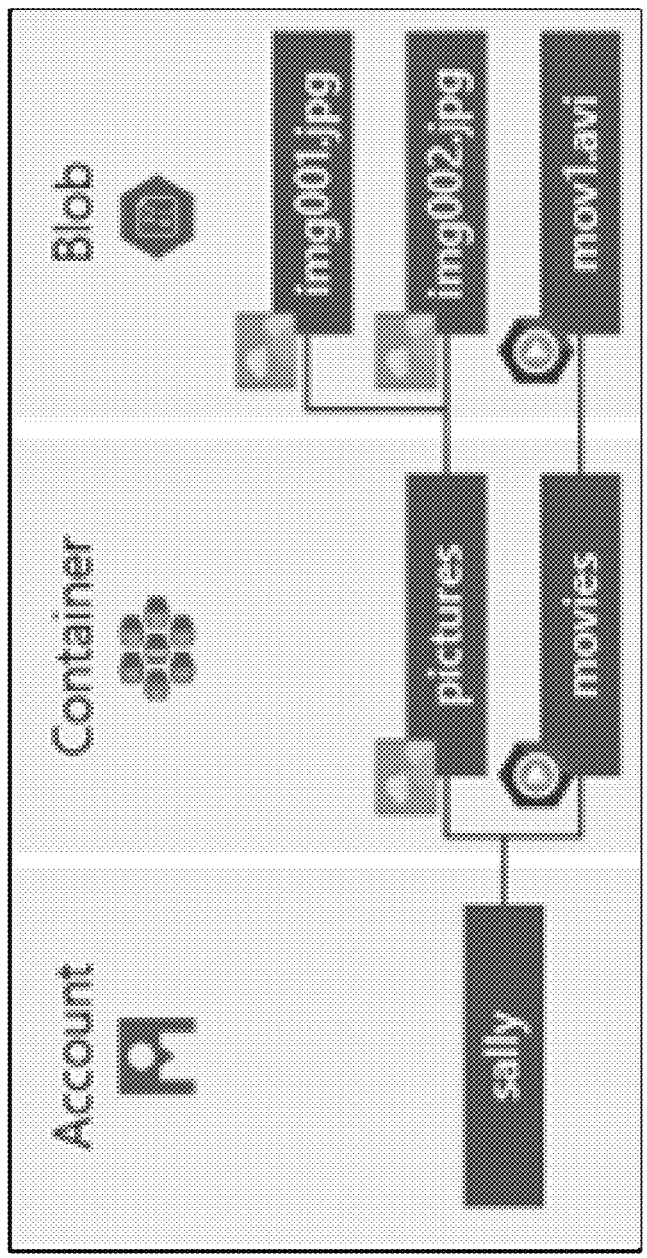
FIG. 23 shows one example of resources on MICROSOFT AZURE™.

Azure Blob™ storage offers three types of resources, the storage account, a container in the storage account, and a blob in a container. FIG. 23 is a diagram that shows the relationship between these resources. In the context of MICROSOFT AZURE™ 108C, a resource can be an account 2302 on or of a cloud storage service, a container 2312 on or of a cloud storage service, and/or a blob 2322 on or of a cloud storage service. A storage account provides a unique namespace in Azure for data. Every object stored in Azure Blob storage has an address that include unique account name. The combination of the account name and the Azure blob endpoint forms the base address for the objects in the storage account. For example, if your storage account is named mystorageaccount, then the default endpoint for Blob storage is: http://mystorageaccount.blob.core.windows.net.

A container organizes a set of blobs, similar to a directory in a file system. A storage account can include an unlimited number of containers, and a container can store an unlimited number of blobs. Azure Blob storage supports different types of blobs: page, block, and append. In simplest terms, block blobs store text and binary, which are made up of blocks of data that can be managed individually. Append blobs are made up of blocks like block blobs, but are optimized for append operations. Append blobs are ideal for scenarios such as logging data from virtual machines. Page blobs are used to house the virtual hard drive (VHD) files and serve as disks for Azure virtual machines. Blob storage provides programmatic access for the creation of containers and objects within the storage account. Blob storage inherits the availability and durability of the storage account it resides in. Blob storage is priced by storage consumption, data transfer, and various operations. The maximum size for an individual object is 4.7 TB for block and 8 TB for page. The maximum throughput for a single blob is 60 MB/s.

FIG. 24 also illustrates one implementation of a storage hierarchy 2402 of Amazon S3 with an account 2412, a bucket 2422, and an object 2432. Also shown is a storage hierarchy 2404 of Azure with a subscription 2414, a storage account 2424, a blob container 2434, a block blob 2444, and a block 2454. All of the above and their constituent components and subcomponents can be considered a resource in the context of this application. https://cloud.google.com/storage/docs/introduction.

Object Metadata

Figure 12:
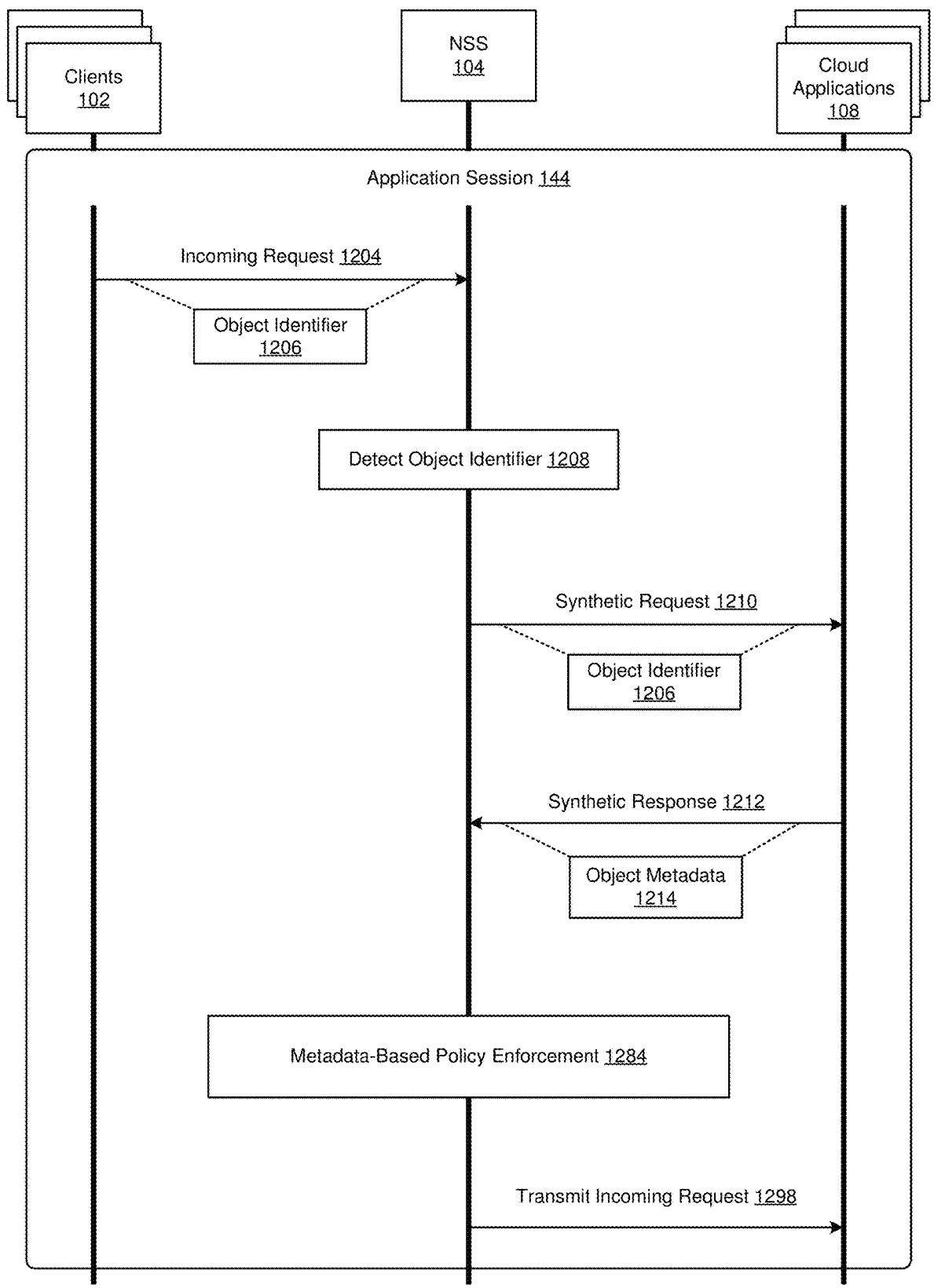
FIG. 12 shows one implementation of using synthetic requests to retrieve object metadata from cloud applications.

FIG. 12 shows one implementation of using synthetic requests to retrieve object metadata from cloud applications. In FIG. 12, an incoming request 1204 is intercepted by the network security system 104. The incoming request 1204 includes an object identifier 1206 of a target object residing in cloud applications. The network security system 104 detects 1208 the object identifier 1206 from the incoming request 1204 (e.g., from the HTTP request header). The 104 proxy then configures a synthetic request with the object identifier 1206 and issues the synthetic request to the cloud application. The synthetic request is configured to retrieve object metadata 1214 about the target object from the cloud application using the object identifier 1206. Examples of the object metadata 1214 include object name, object size, object type, and object sensitivity.

Then, a synthetic response 1212 is received by the network security system 104. The synthetic response 1212 supplies the object metadata 1214 to the network security system 104. Then, the network security system 104 uses the supplied object metadata 1214 for policy enforcement 1284 on the held incoming request 1204. In some implementations, the network security system 104 releases the flow 1298 to transmit the incoming request 1204 to the cloud application. In other implementations, the incoming request 1204 is blocked and not transmitted to the cloud application, preventing the incoming request 1204, for example, to share sensitive data to unauthorized users.

Figure 13:
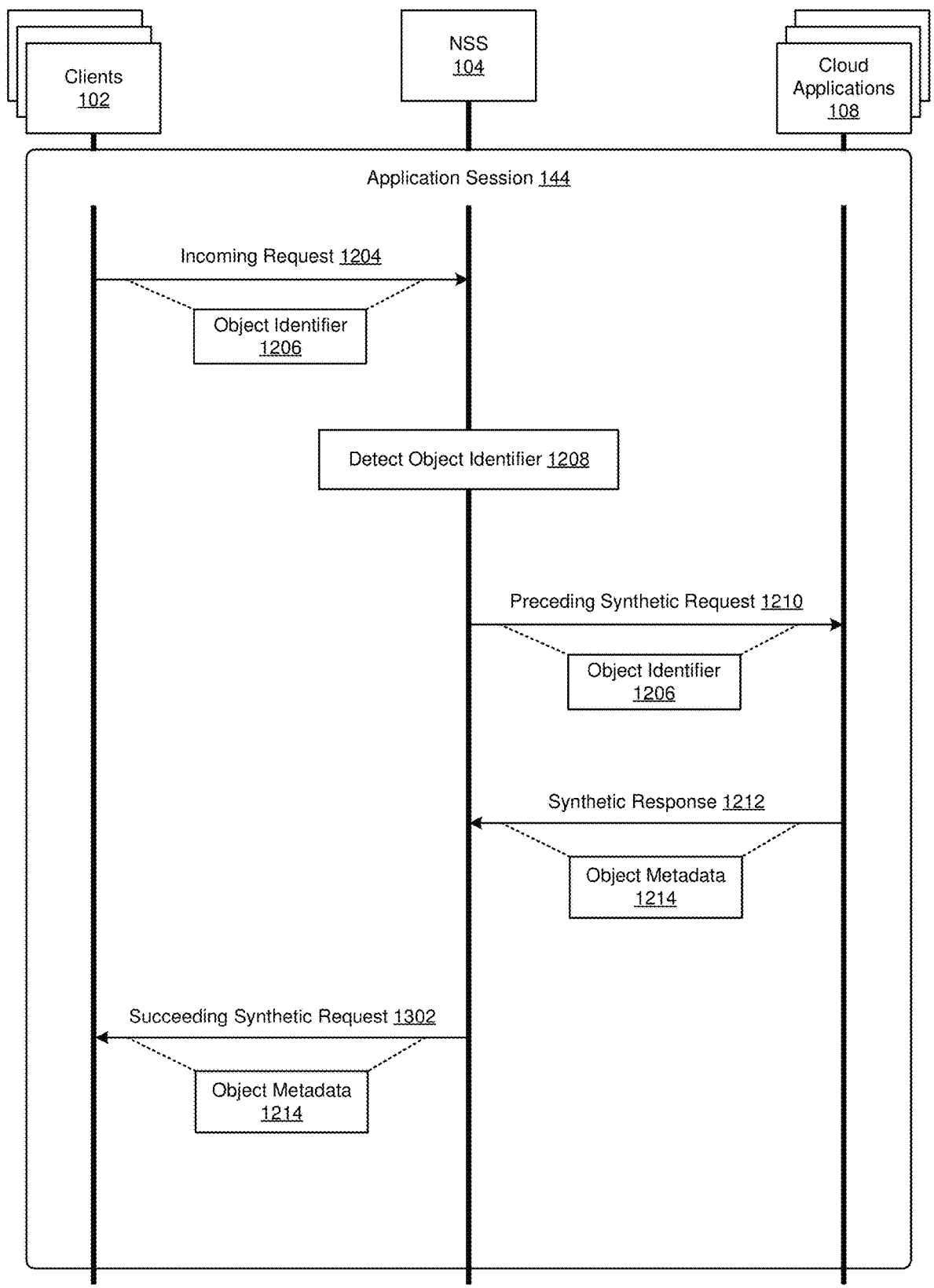
FIG. 13 shows one implementation of a succeeding synthetic request being issued to a client to convey object metadata, generated by a preceding synthetic request.

FIG. 13 shows one implementation of a succeeding synthetic request being issued to a client to convey object metadata, generated by a preceding synthetic request. In FIG. 13, the object metadata 1214, generated by the preceding synthetic request 1210, is sent by the network security system 104 to the client using a succeeding synthetic request 1302. One example of the object metadata 1214 conveyed to the client by the succeeding synthetic request 1302 includes notification about completion of a transaction like an upload or a download. The notification serves as a confirmation, for example, via a GUI that the requested transaction was successful.

Figure 14:
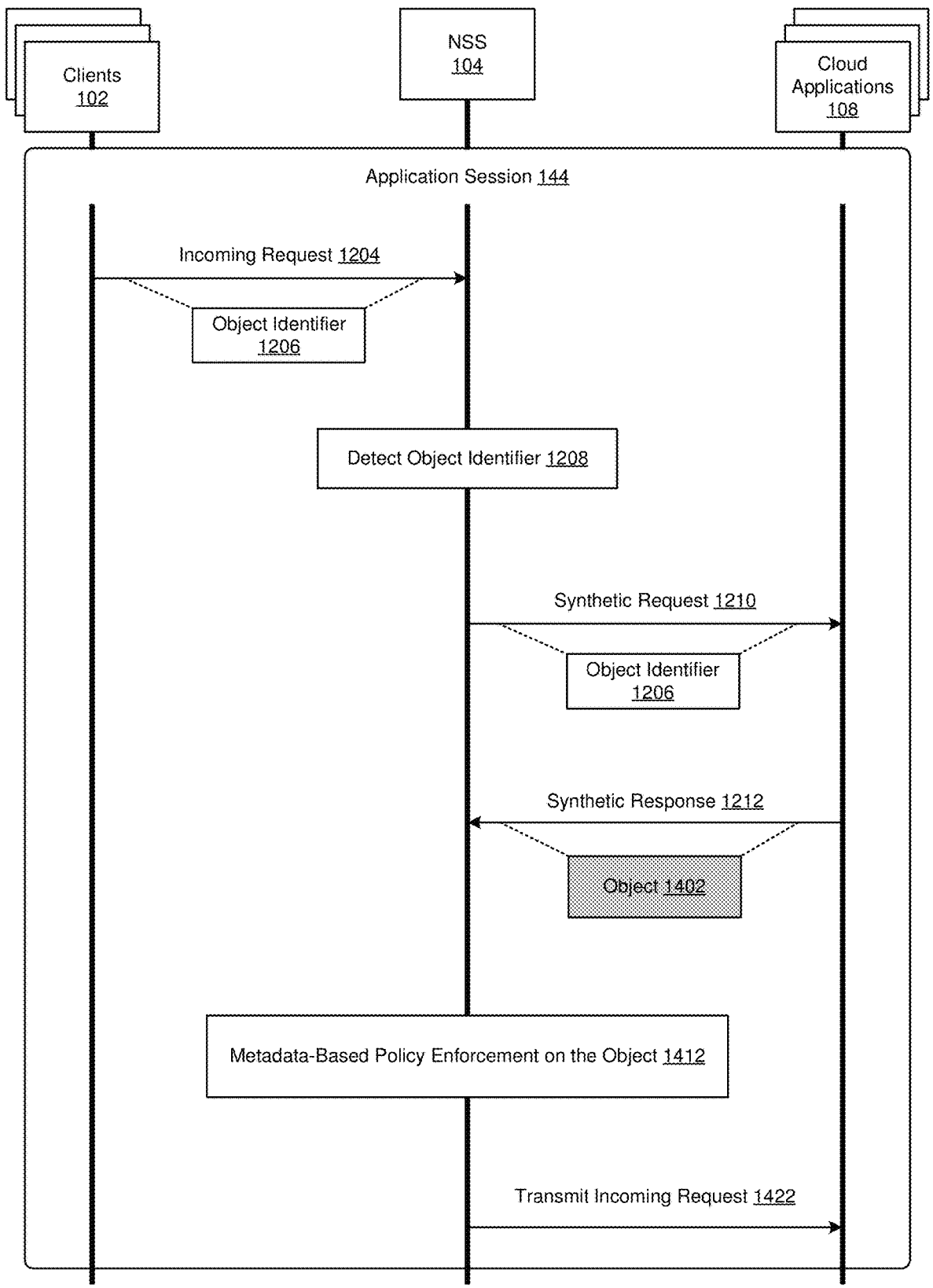
FIG. 14 shows one implementation of using synthetic requests to retrieve objects from cloud applications.
Figure 15:
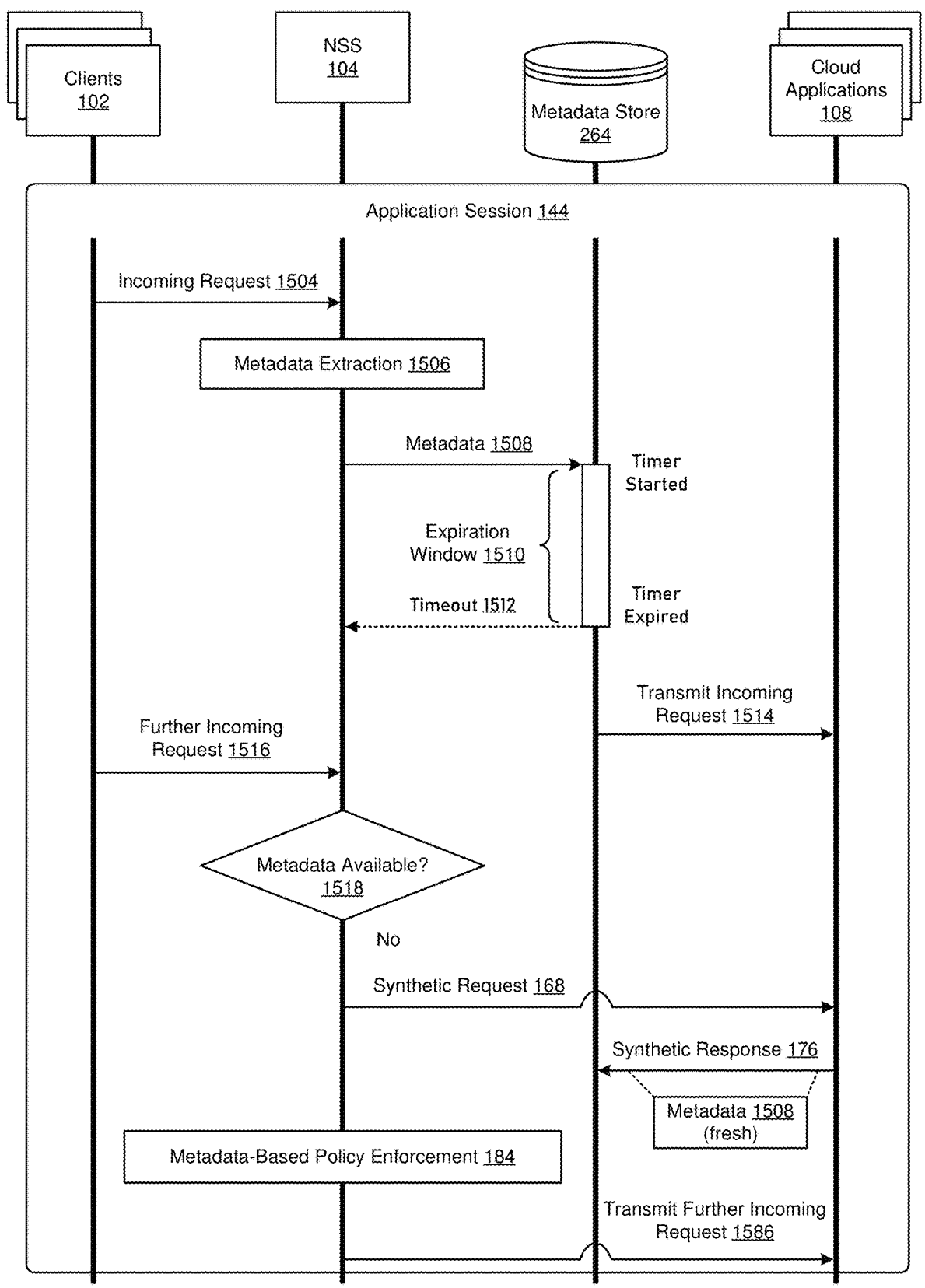
FIG. 15 shows one implementation of using synthetic requests to retrieve a fresh version of expired metadata.
Figure 16:
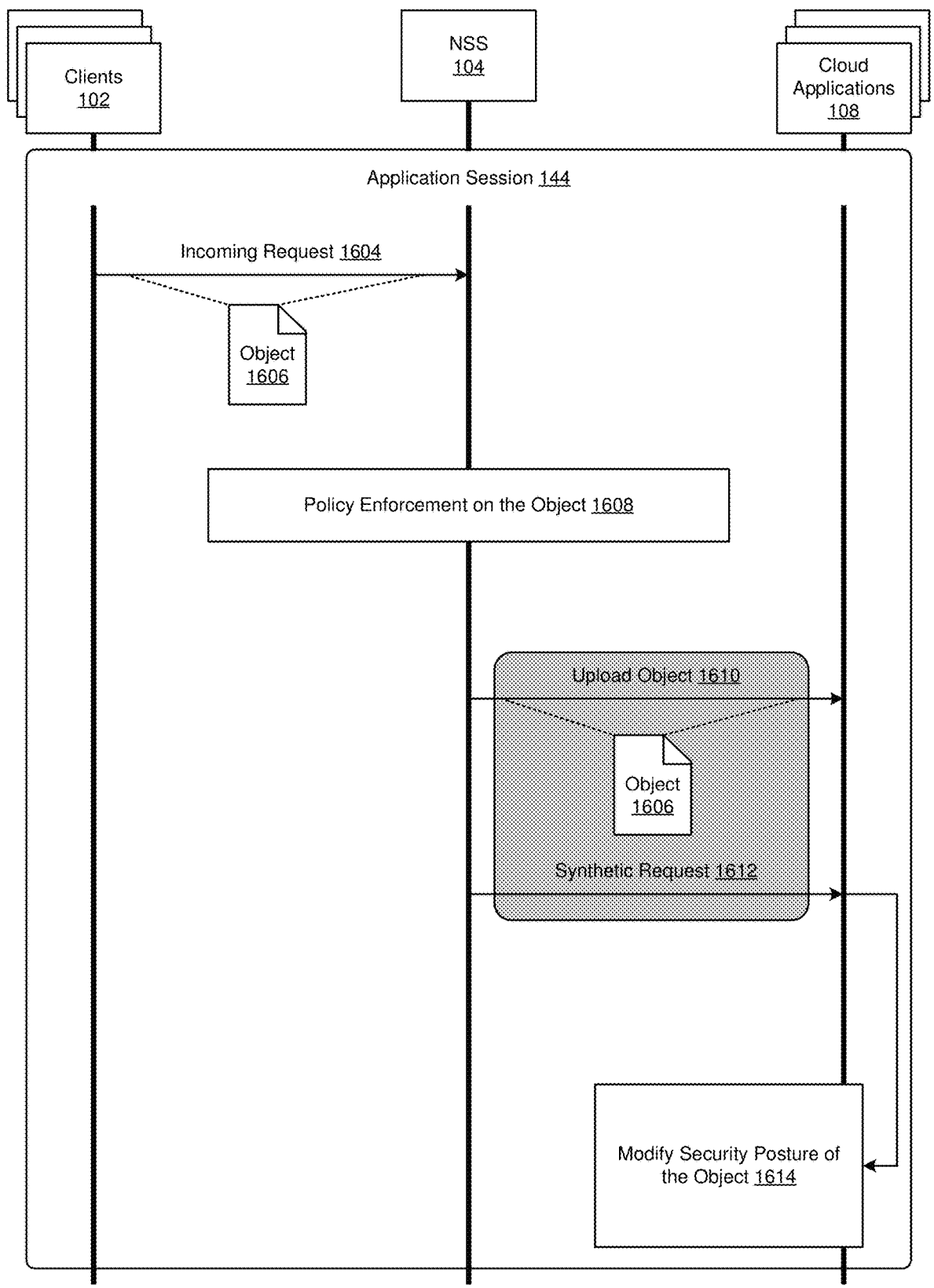
FIG. 16 shows one implementation of using synthetic requests to modify security postures of objects residing in cloud applications.
Figure 17:
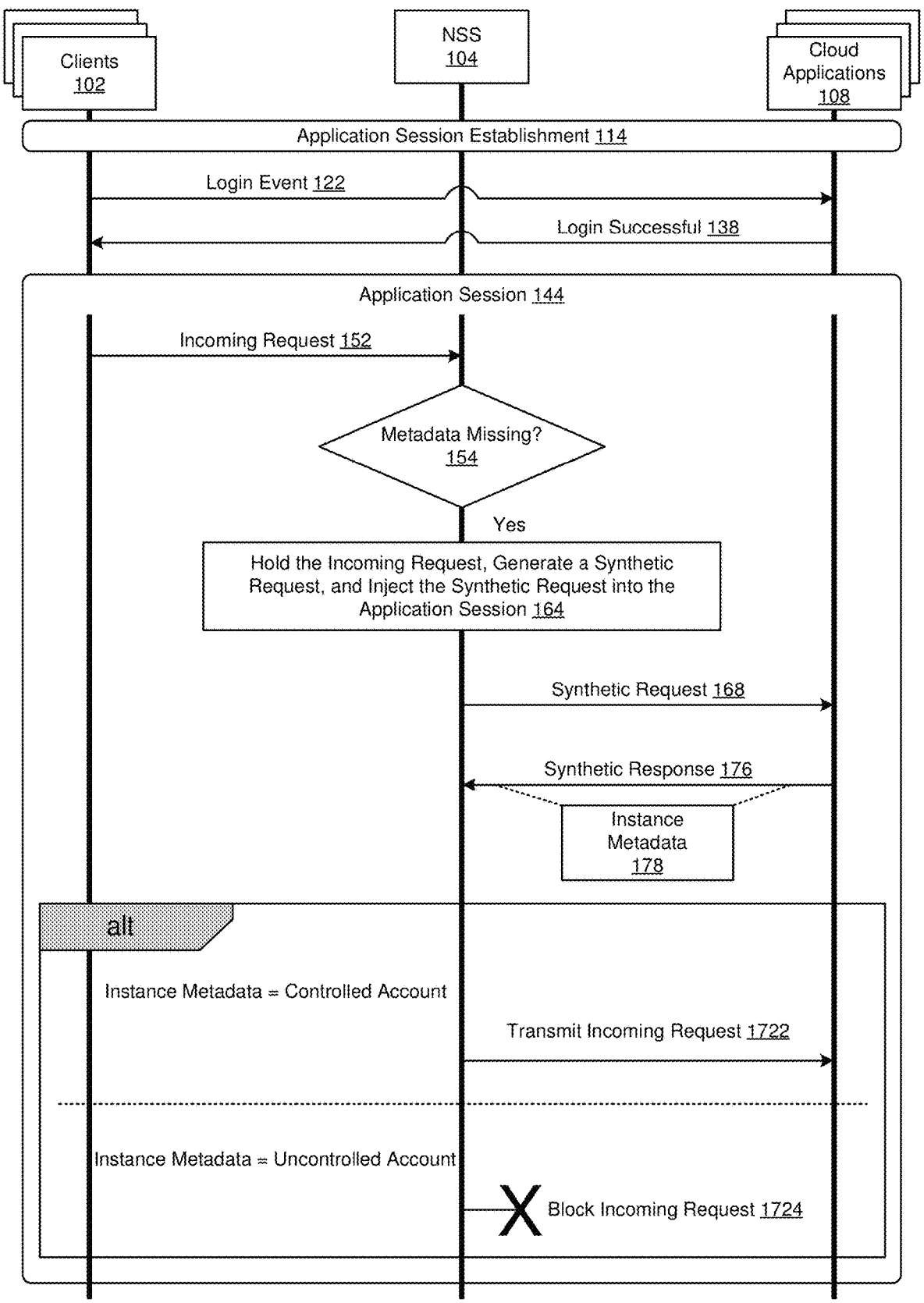
FIG. 17 shows one implementation of using synthetic requests to disambiguate a login event that bypassed a network security system.

FIG. 14 shows one implementation of using the synthetic requests to retrieve objects from the cloud applications 108. In such an implementation, the synthetic response 1212 supplies the target object 1402 to the network security system 104 from the cloud application. Also, the policy enforcement 1412 is then on the object 1402 itself, for example, running DLP checks on the object 1402 for sensitivity determination, in addition to or instead of being on the held incoming request 1204. In some implementations, based on the results of the policy enforcement 1412, the network security system 104 releases the flow 1422 to transmit the incoming request 1204 to the cloud application. In other implementations, the incoming request 1204 is blocked and not transmitted to the cloud application.

Sensitive Metadata

Data loss prevention (DLP) solutions provide capabilities to classify sensitive data in cloud apps, generally detecting sensitive data in documents and preventing unauthorized access, saving or sharing of the sensitive data. Enterprise security teams spend an enormous amount of time honing DLP for data protection and for reducing false positives. Endpoint DLP disclosed in earlier relevant patent applications has the potential to tackle security issues such as exfiltration of sensitive data that resides on cloud applications but "in-use" at the endpoints which have access to that sensitive data. Protecting such in-use sensitive data can be achieved by enforcing security policy by a Network Security System (NSS), which is interposed between client endpoints and cloud-based services monitoring of data movement between endpoints and cloud applications and among the applications. For example, cloud application admins can prohibit sensitive data to be shared with unauthorized users or moved to uncontrolled locations. To this end, the first action taken by the data loss prevention (DLP) to identify sensitive data that is mandated by central policies for protection of cloud-based services (e.g., data at rest).

DLP is a very resource intensive process, e.g., string evaluation for detecting sensitive data is computationally expensive, taking up extensive memory and CPU resources. As much of the collaboration among workers has moved to the cloud, a vast majority of documents are stored there. DLP can utilize the extensive CPU and memory resources of the cloud to complete the heavy duty of centralized sensitivity classification for stored files. The sensitivity classification can be stored as and identified by the sensitivity metadata of objects which have the files as data.

The sensitivity classifications can also be stored in centralized metadata store on a server. Such a centralized process for sensitivity classification is commonly referred to as the "content sensitivity scan" on server side. The content sensitivity scan can apply on endpoint system memory to identify sensitive data in-use by clients on endpoints.

Regardless of the location where the data may be present, content sensitivity scan demands deep inspection of document(s) of the content and produce sensitivity classification by subjecting the document(s) to content analysis techniques like language-aware data identifier inspection, document fingerprinting, file type detection, keyword search, pattern matching, proximity search, regular expression lookup, exact data matching, metadata extraction, and language-agnostic double-byte character inspection.

Content-based analysis is computationally intensive and time consuming. Not all endpoints and the Network Security System (NSS) have sufficient computational resources to perform content analysis ad hoc, which also impacts user experience. In such cases, the Network Security System (NSS) can enforce security policy by relying on previously generated sensitivity metadata, rather than by performing the computationally intensive and time consuming content sensitivity scan on the data in traffic.

As used herein, phrases such "previously generated", "proactively generated", "generated in advance of", and "generated prior to" refer to the sensitivity metadata being generated ahead of time in anticipation of its use in responding to the client request. For example, sensitivity metadata can be generated when the document is: (i) first stored on mass storage media like network mounted file servers and cloud storage services (known as data at rest), (ii) first transmitted over the network (known as data in motion), or (iii) first created by a user on the endpoint (known as data in use).

Sensitivity metadata can be retrieved from a cloud-based metadata store populated by the content sensitivity scan. The cloud-based metadata store can be a distributed in-memory cache such as Amazon ElastiCache. Sensitivity metadata can also be retrieved from an on-premise metadata store. Or sensitivity classification can be retrieved from the sensitivity metadata of objects residing in object-based storage services.

Group Membership Metadata

This application uses the terms "information" and "metadata" interchangeably, in some implementations.

Many cloud applications such as apps, bots, and other integrations can work with channels and groups that have members from multiple workplaces and organizations. The collaborative apps such as Slack, Microsoft Teams, Cisco WebEx, Zoom, Google Meet, and so on, provide a workplace for a group of users to share information and messages for collaboration across companies and organizations. Slack's shared channels, for example, allow users to connect across Slack workspaces, creating a direct line of communication between the user and users from another company or organization for collaboration. For example, one Slack feature called Slack Connect allows channel members to invite people from other companies to join the same Slack channel. For collaboration hubs like or similar to Slack, there exists a security issue for the cloud application to ensure the right information would be shared with the right people. The security enforcement needs to evaluate possible data loss or exfiltration if the channel is comprised of members who are unauthorized to be exposed to sensitive data in accordance with applicable security policy (e.g., members outside the organization's account on the cloud application).

In some implementations, the disclosed synthetic request injection can be used for data loss prevention (DLP) in the context of sharing sensitive content with a user group that is a group of users managed as a unit by cloud service providers. A user group can be, e.g., a group of IAM users on AWS, a group of users on a network directory, a group of users sharing a folder on cloud application, a public/private/shared channel having a group of members, a team having a group of members, or a social media group. A user group may include a mix of authorized and unauthorized users in accordance with security policy settings configured by subscribers of cloud service providers.

In one implementation involving making posts to a user group, when the network security system 104 intercepts an incoming request that attempts to make a post (or notification) to a particular group, the network security system 104 can first analyze the request to determine 2108 whether the attempted post contains sensitive data (e.g., a sensitive object or link thereto, or sensitive text or images).

Figure 25:
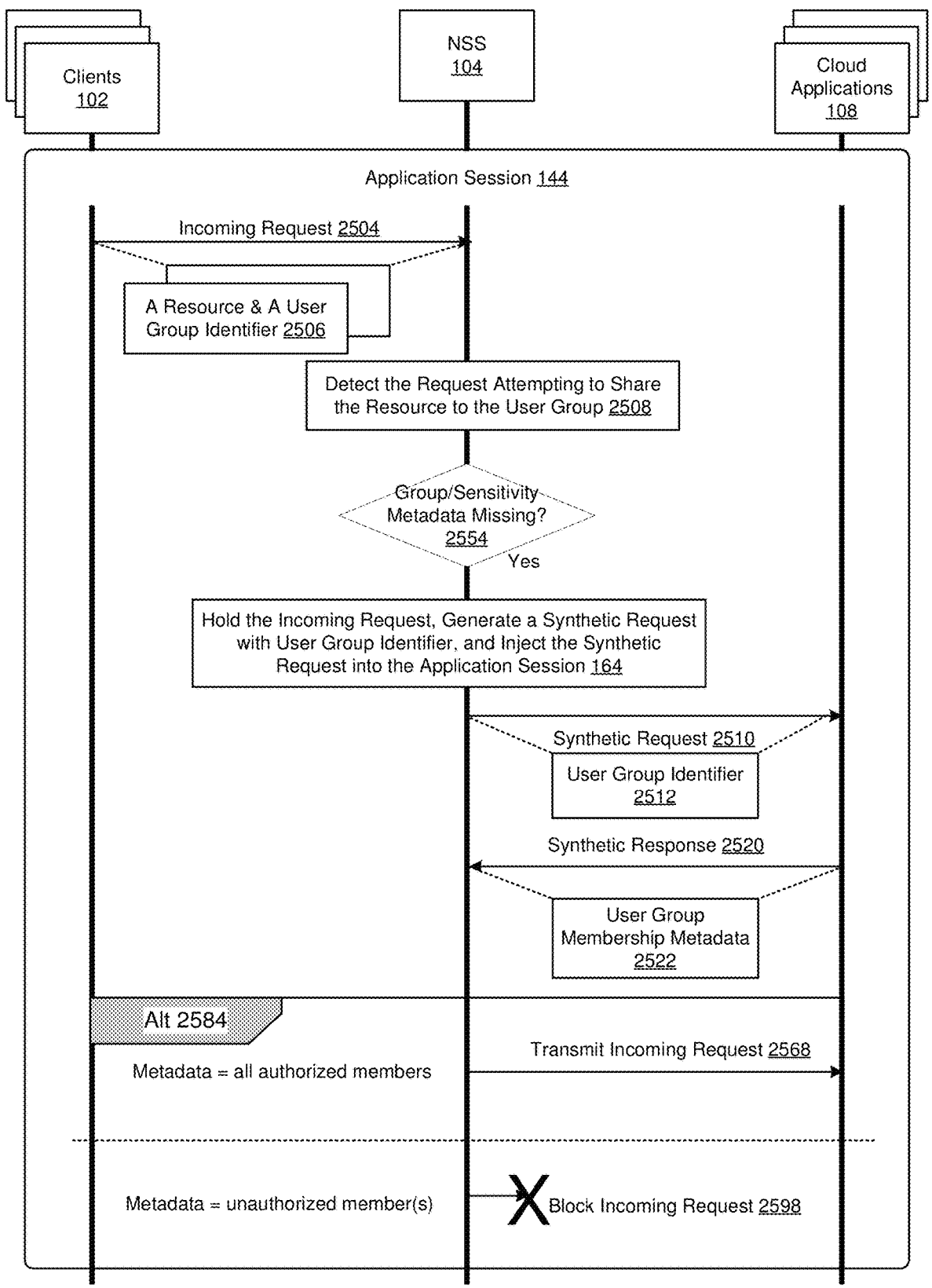
FIG. 25 shows one implementation of using synthetic requests to retrieve a group membership metadata for enforcing a security policy restricting users to share sensitive content with a user group that can be accessed by members outside the organization.

FIG. 25 shows one implementation of using synthetic requests to retrieve a group membership metadata for enforcing a security policy restricting users to share sensitive content with a user group that can be accessed by members outside the organization. In the FIG. 25, the network security system 104 intercepts an incoming request that is directed to toward a user group hosted on a cloud application by an organization. The network security system 104 detects that the incoming request attempts to share content of a resource with members of the user group. The synthetic requests are used to retrieve, in a corresponding synthetic response 2520, metadata about profiles of respective users of the particular user group and determine whether the user group can be accessible to users outside the organization.

In one implementation, such determination can be based on the information about any members of the user group have non-corporate/private/uncontrolled emails or other login instances. In another implementation, the synthetic request can retrieve the group membership metadata by probing the data of the channel or conversation where the members thereof communicate and collaborate each other. The network security system 104 then enforces one or more security policies (or DLP policies) based on an analysis of the retrieved group membership metadata. This can include executing security action like blocking the posting request 2598, when it is determined that the group include unauthorized users in accordance with a predefined policy 2584.

The network security system 104 can block the client request to prevent posting of the sensitive content of the resource to the particular group 2598, and thereby preventing unauthorized users from having access to the sensitive content. If that is not the case (e.g., all the members in the particular group are authorized users), then following the predefined policy 2184, the network security system 104 can allow the request and fulfill the posting of the sensitive content on the particular group 2568. Other security actions include seeking user justification, notifying sensitive nature of the attempted post, encrypting the sensitive content, quarantining sensitive content, or coaching the user on the security policies.

FIG. 25 also shows one implementation to determine whether the resource the request attempts to share with that particular user group is sensitive or not by using synthetic requests to retrieve sensitive metadata of the resource hosted by the cloud application. The network security system 104 can separately determine the sensitivity of the resource to be shared by subjecting the content of the resource to content analysis techniques 2554 (e.g., string evaluation, sub-string inspection, or language-aware data identifier inspection). The generated sensitivity classification then can be encoded in sensitivity metadata stored in a cloud-base metadata store for DLP policy enforcement in the future. In other implementations, the sensitivity of the content may be inferred from previously generated sensitivity classification stored as and identified as already available sensitive metadata, and without running a DLP analysis ad hoc.

In one example, the sensitivity metadata can be retrieved from cloud-based metadata store populated by inspection services. In another example, sensitivity metadata can be retrieved from the cloud application if the post content is resided therein (i.e., data at rest). In another example, the sensitivity data can be available in the local metadata store at the endpoint if the post content is transmitted from the endpoint (i.e., data in motion or data in use). A person skilled in the art will appreciate that the scale of the content can range from a document to an entire networked storage media. A person skilled in the art will also appreciate that the type and form of the post content can range from text, image, source code, to audio or video, and so on.

Upon determining that the content of the attempted post is sensitive, the network security system 104 then issues a synthetic request 2510 to retrieve metadata about the membership of the group of users. In one example, the group membership metadata can be probed to determine whether the group contains any members that are not supposed to have access to the sensitive content mandated by the security policy of the cloud application. In one implementation, the synthetic request injection can determine the group membership based on the login instances used by the members to participate in the particular channel or conversation (e.g., corporate v/s personal emails). In another implementation, the group membership metadata can be determined by members' personal profiles maintained by an application server of the cloud application. In another implementation, the group membership can be determined by the metadata of a channel or a workplace which is the dedicated space for the group of users to collaborate seamlessly.

Collaborative apps such as Slack, Microsoft Teams, Cisco WebEx, and other integrations work with channels and workspaces for collaboration among a group of users that have members across from companies and organizations. In one example, Slack app can detect when a channel has members from multiple workspaces or organizations. The following is an example of data from Slack API that, or parts of which, can be retrieved by the disclosed synthetic request injection. An example data, the "is_ext_shared": false field below is a flag indicating that this Slack channel is not shared externally with a remote organization. A synthetic request injection can be used to fetch the "false" value of the key-value pair, causing the network security system 104 to determine that the channel does not have any member of external users of a remote organization:

```
{
    "ok": true,
    "channel": {
        "id": "C012AB3CD",
        "name": "general",
        "is_channel": true,
        "is_group": false,
        "is_im": false,
        "created": 1449252889,
        "creator": "W012A3BCD",
        "is_archived": false,
        "is_general": true,
        "unlinked": 0,
        "name_normalized": "general",
        "is_read_only": false,
        "is_shared": false,
        "parent_conversation": null,
        "is_ext_ shared": false,
        "is_org_shared": false,
        "pending_shared": [ ],
        "is_pending_ext_shared": false,
        "is_member": true,
        "is_private": false,
        "is_mpim": false,
        "last_read": "1502126650.228446",
        "topic": {
            "value": "For public discussion of generalities",
            "creator": "W012A3BCD",
            "last_set": 1449709364
        },
        "purpose": {
            "value": "This part of the workspace is for fun. Make fun
            here.",
            "creator": "W012A3BCD",
            "last_set": 1449709364
        },
        "previous_names": [
            "specifics",
            "abstractions",
            "etc"
        ],
        "locale": "en-US"
    }
}
```

Additional information about the Slack API regarding conversations can be found at conversations.info, https://api.slack.com/methods/conversations.info (last visited Apr. 9, 2021), which is incorporated by reference for all purposes as if fully set forth herein. This notion applies analogously to using synthetic request-response mechanism in the place of APIs of other cloud applications like Facebook Messenger, Zoom, and Google Chat.

Bucket-Level Ownership Metadata

An opportunity arises to make improved DLP solution self-sufficient to separately retrieve metadata from cloud service providers that host some of their resources in object storage, while adhering to the demanding intermediation protocols of the cloud service providers. Improved security posture and reduced risk of data loss, exposure, and exfiltration across multi-cloud environments may result.

All of the above-mentioned object storage entities, e.g., projects, containers, buckets, blobs, blocks, objects and their constituent components and subcomponents are considered a cloud-based resource that has a unique name to identify it. Generally, a cloud-based resource can be identified by their names, unified resource identifiers (URIs), unified resource locators (URLs), domain names, directory addresses, IP addresses, keys, unique DNS-compliant name, region names, or any other identifiers alone or in combination thereof. For object storage entities, the resource name is much like a file name in a single global namespace of the cloud service provider, i.e., the resource name of the cloud domain is an unique file path destinated on the cloud. A resource with an unique resource name coupled with the cloud service provider's base URI constitute much like a unique file path destinated on the cloud. Such an unique URL is referred as a cloud destination in the context of this application.

For example, buckets form the top-level namespace for Amazon S3, and bucket names are global within the AWS realm. One example of the resource identification is as follows: https://packtpub.s3.amazonaws.com/books/acda-guide.pdf. In this example, packtpub is the name of the S3 bucket and books/acda-guide.pdf is the key. When the resource being logged is an S3 bucket, the resource name includes "packtpub" as an entry.

In Microsoft Azure™, data container such as account name provides a unique namespace in Azure for data. Every object stored in Azure Blob storage has an address that include unique account name. In one example, Azure's blob can be identified as follows:

The resource URL syntax assigns each resource a corresponding base URI, which refers to the resource itself. For the storage account, the base URI includes the name of the account only: https://myaccount.blob.core.windows.net.

For a container, the base URI includes the name of the account and the name of the container: https://myaccount.blob.core.windows.net/mycontainer.

For a blob, the base URI includes the name of the account, the name of the container, and the name of the blob: https://myaccount.blob.core.windows.net/mycontainer/myblob.

A storage account may have a root container, a default container that can be omitted from the URI. A blob in the root container can be referenced without naming the container, or the root container can be explicitly referenced by its name ($root). The following URIs both refer to a blob in the root container: https://myaccount.blob.core.windows.net/myblob, https://myaccount.blob.core.windows.net/$root/myblob.

A snapshot is a read-only version of a blob stored as it was at the time the snapshot was created. You can use snapshots to create a backup or checkpoint of a blob. A snapshot blob name includes the base blob URI plus a date-time value that indicates when the snapshot was created. For example, assume that a blob has the following URI: https://myaccount.blob.core.windows.net/mycontainer/myblob. The URI for a snapshot of that blob is formed as follows: https://myaccount.blob.core.windows.net/mycontainer/myblob?snapshot=<DateTime>.

Each resource provided by Google Cloud Platform™ has a unique resource name as the resource's identifier. Buckets of Google Cloud™ have a resource name in the form of projects/_/buckets/[BUCKET_NAME], where [BUCKET_NAME] is the ID of the bucket. Objects have a resource name in the form of projects/_/buckets/[BUCKET_NAME]/objects/[OBJECT_NAME], where [OBJECT_NAME] is the ID of the object. An example of a full resource name format for GCP storage bucket is //storage.googleapis.com/projects/_/buckets/[BUCKET_NAME], which is the unique bucket name prefixed with Google Cloud storage's based URI://storage.googleapis.com. A #[NUMBER] appended to the end of the resource name indicates a specific generation of the object. #0 is a special identifier for the most recent version of an object. #0 is useful to add when the name of the object ends in a string that would otherwise be interpreted as a generation number.

Thus, in one implementation, a resource is a bucket on or of a cloud storage service. In another implementation, a resource is a container on or of a cloud storage service. In another implementation, a resource is a project on or of a cloud storage service. In another implementation, a resource is a blob on or of a cloud storage service. In other implementations, a resource is an object on or of a cloud storage service. All the above resources can have respective unique resource name/file path/URL as destinations on the cloud. Bucket-level resources are referred to resources which host a collection of objects, blocks of objects, such as Amazon S3 buckets, GCP buckets and Azure blobs.

As used herein, a "resource-level transaction" is referred as an operation or actions on the data itself that causes manipulation of data and data objects in a cloud-based resource by merely referencing the cloud-based resource. Some example transactions include copying, moving, or syncing a cloud-based resource from a source location to a destination location by merely naming the cloud-based resource. Another example includes copying, moving, or syncing a cloud-based resource from a source location to a destination location by merely referencing the cloud-based resource, via, e.g., a link or hyperlink of the cloud resource destination or URL.

Bucket-level resources, in the context of this application, refer to, e.g., Amazon S3 buckets, GCP buckets and Azure blobs that are high-level logical constructs within which data is assembled and organized as of object-based storage. Bucket-level resources, e.g., Amazon S3 buckets form the top-level namespace for Amazon S3, and bucket names are global across all AWS accounts. A bucket-level resource name combining base URI (universal resource identifier) of cloud services can form a unique cloud destination like universal resource location URL specifying the resource in the cloud.

Resource-level transactions manipulate data stored in object-based storage without identifying data stored in the resources. This is because, for example, the data portion of an Amazon S3 object is opaque to Amazon S3. This means that an object's data is treated as simply a stream of bytes which range in size from 0 bytes up to 5 TB. Amazon S3 does not know or care what type of data is stored in the object, and the transactions doesn't act differently for text data versus binary data.

For example, one can use a "cp" or "syn" command in AWS to move an S3 bucket from a corporate organization account to another organization account without identifying the objects or data of the S3 bucket. Additional details about the "cp" command for AWS can be found here: https://docs.aws.amazon.com/cli/latest/reference/s3/cp.html, which is incorporated herein by reference. Details about GCP's "cp" command can be found here: https://cloud.google.com/storage/docs/gsutil/commands/cp, which is incorporated herein by reference. In other implementations, Google Cloud Transfer Service can be used for data transfer, additional details about which can be found here: https://cloud.google.com/storage-transfer/docs/how-to, which is incorporated herein by reference.

The following are resource-level transaction examples that use an AWS CLI (Command Line Interface) command to copy S3 buckets across AWS accounts:

aws s3 sync s3://SOURCE-BUCKET-NAME s3://DESTINATION-BUCKET-NAME—source-region SOURCE-REGION-NAME—region DESTINATION-REGION-NAME aws s3 sync s3://sourcebucket s3://destinationbucket The technical problem here is when such resource-level transactions cause data objects propagated out of an organization's account, the transactions themselves do not contain any content onto which data loss prevention (DLP) analysis can prevent data egress which manipulate data on a cloud storage against security policy. As a result, such transactions are not detected by a DLP engine, which is configured to look for sensitive content in network traffic to and from the cloud storage services.

In some implementations, synthetic request injection mechanism can be used for data loss prevention (DLP) in the context of moving sensitive content from a controlled location to an uncontrolled location in the cloud. The technology disclosed teaches a network security system (NSS) using synthetic requests to retrieve resource-level metadata from cloud applications to prevent exfiltration of sensitive data resulting from user-made resource-level transactions (user-made transaction operated on the resources of a cloud application).

Resource-level metadata is referred to the properties, tags, or labels configured and stored as metadata associated with the respective cloud resource. Most resource-level metadata are created and configured at the time the resource is created or launched. Additional tags like user created tags can be added on during the lifecycle of the resource. Example resource-level metadata are the metadata associated with a cloud resource such as a bucket and object in object-based storage services. Object metadata of a GCP object is a collection of name-value pairs that describe various object qualities. In the like fashion, metadata associated with an Amazon S3 object is a set of name/value pairs that describe the object.

Buckets, the objects' containers also have properties which are configured when they are created. The properties of an Amazon S3 bucket include settings for versioning, tags, default encryption, logging, notification, and more. For example, a tag is key-value pair that represents a label assigned to the bucket. The default encryption is another example resource-level metadata which provides AWS consumers with automatic server-side encryption. Buckets created in Google's Cloud Storage™ have associated metadata which identifies properties of the bucket and specifies how the bucket should be handled when it's accessed. Some metadata exists as key: value pairs. For example, the name of a bucket is represented by the metadata entry name: my-bucket-name for the JSON API. The XML API presents such metadata as <elements></elements>, such as <LocationConstraint>US</LocationConstraint> for the bucket location.

Figure 26:
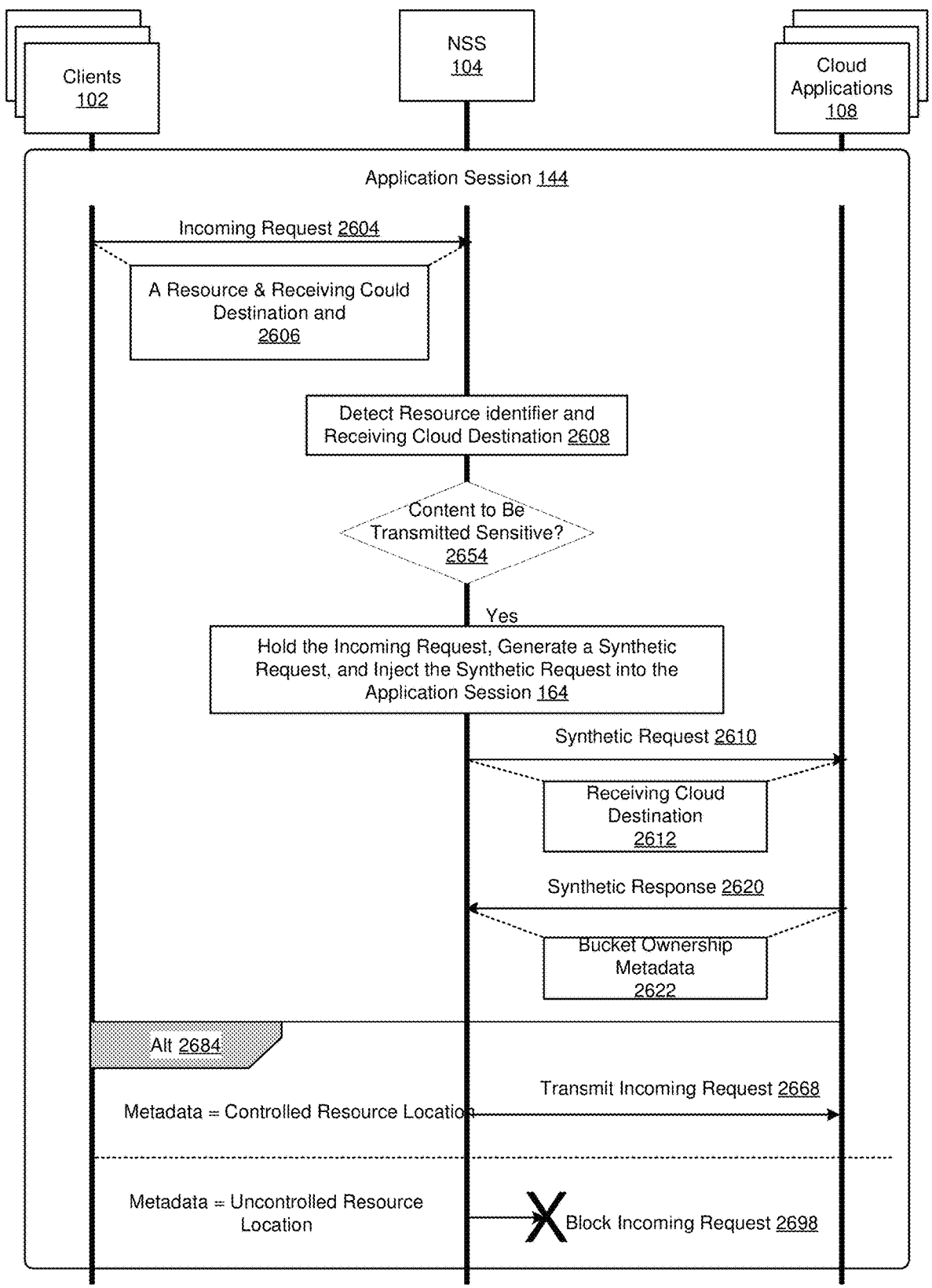
FIG. 26 shows one implementation of using synthetic requests to retrieve ownership metadata of a bucket-level resource residing in cloud applications for enforcing security policy preventing sensitive data transmitted to an uncontrolled location.

FIG. 26 shows one implementation, where the network security system 104, interposed between clients and cloud applications, intercepts a client request that attempts to make a resource-level transaction (e.g., move, copy, backup, clone, version a content residing in a cloud application) which causes a content of a cloud application propagated from a first cloud resource location (referred as a transmitting cloud destination, e.g., a first Amazon S3 bucket, GCP bucket, or Azure blob) to a second cloud resource location (referred as a receiving cloud destination, e.g., a second Amazon S3 bucket, GCP bucket, or Azure blob). The transmitting cloud destination, in some implementations, hosts the resource which are subjected to the action of the incoming request (referred as the target resource). The data/content of the resource can be a file, a folder, a node, or a cloud-based resource such as an object or the entirety of the first Amazon S3 bucket, GCP bucket, or Azure blob itself being moved to the second Amazon S3 bucket, GCP bucket or Azure blob. A person skilled in the art will appreciate that the scale of cloud-based resources can range from a file to an entire network drive. Also, a person skilled in the art will appreciate that the type and form of content can range from text, images, audio, video to source code, or computing instance, and so on.

Once the network security system 104 establishes that the content (data of the target resource) is sensitive 2654, either by running a DLP inspection on the data or by inferring sensitivity from the properties of the target resource, the network security system 104 then determines whether the receiving cloud destination is a controlled location or an uncontrolled location based on resource-level metadata, such as the metadata describing the ownership of the resource. The NSS 104 uses a synthetic request to retrieve resource-level metadata from the cloud application. A controlled location can be, for example, a cloud resource that is owned by an organization which also owns the transmitting cloud destination, a cloud resource that is owned by a same organization to which a user making the client request also belongs to, or a cloud resource that is generally under the ambit of policy enforcement by the network security system 104.

In one implementation, the synthetic requests can be configured to retrieve, in corresponding synthetic responses 2620, information that identifies ownership of the receiving cloud destination (e.g., a destination bucket, a destination container). The following is an example of request syntax specific to AWS HeadBucket API that can be used to construct a synthetic request to retrieve ownership information ("ExpectedBucketOwner") about a particular Amazon S3 bucket:

HEAD/HTTP/1.1
Host: Bucket.s3.amazonaws.com
x-amz-expected-bucket-owner: ExpectedBucketOwner The corresponding resource metadata in the key: value pairs include x-amz-expected-bucket-owner-header key and x-amz-expected-source-bucket-owner-header key where the value thereof is the account ID of the expected bucket owner. Additional information about request syntaxes and parameters for verifying bucket owner that can be included in the synthetic requests can be found at HeadBucket https://docs.aws.amazon.com/AmazonS3/latest/API/API_HeadBucket.html (last visited Nov. 20, 2021), which is incorporated by reference for all purposes as if fully set forth herein.

If the receiving cloud destination is a controlled location, then following a predefined policy 2684, the network security system 104 can allow the request and fulfill transmission/delivery of the sensitive content to the receiving cloud destination. However, if the receiving cloud destination is an uncontrolled location that does not qualify as a controlled location, then following the predefined policy, the network security system 104 can block the request and prevent transmission/delivery of the sensitive content to the receiving cloud destination, thereby preventing/mitigating the risk of data exfiltration.

In some implementations, the Network Security System (NSS) 104 uses a synthetic request to retrieve sensitivity metadata of the target resource to determine whether there is sensitive content subjected to the action of the request. In some implementations, the Network Security System (NSS) 104 uses a synthetic request to retrieve the target resource data and run a DLP inspection thereto to determine if the content of the target resource is sensitive or not. In another implementation, the proxy can issue a synthetic request to add/edit/modify the sensitivity metadata of the resource according the result of the sensitivity scan over the target resource.

Bucket-Level Security Posture Metadata

Figure 27:
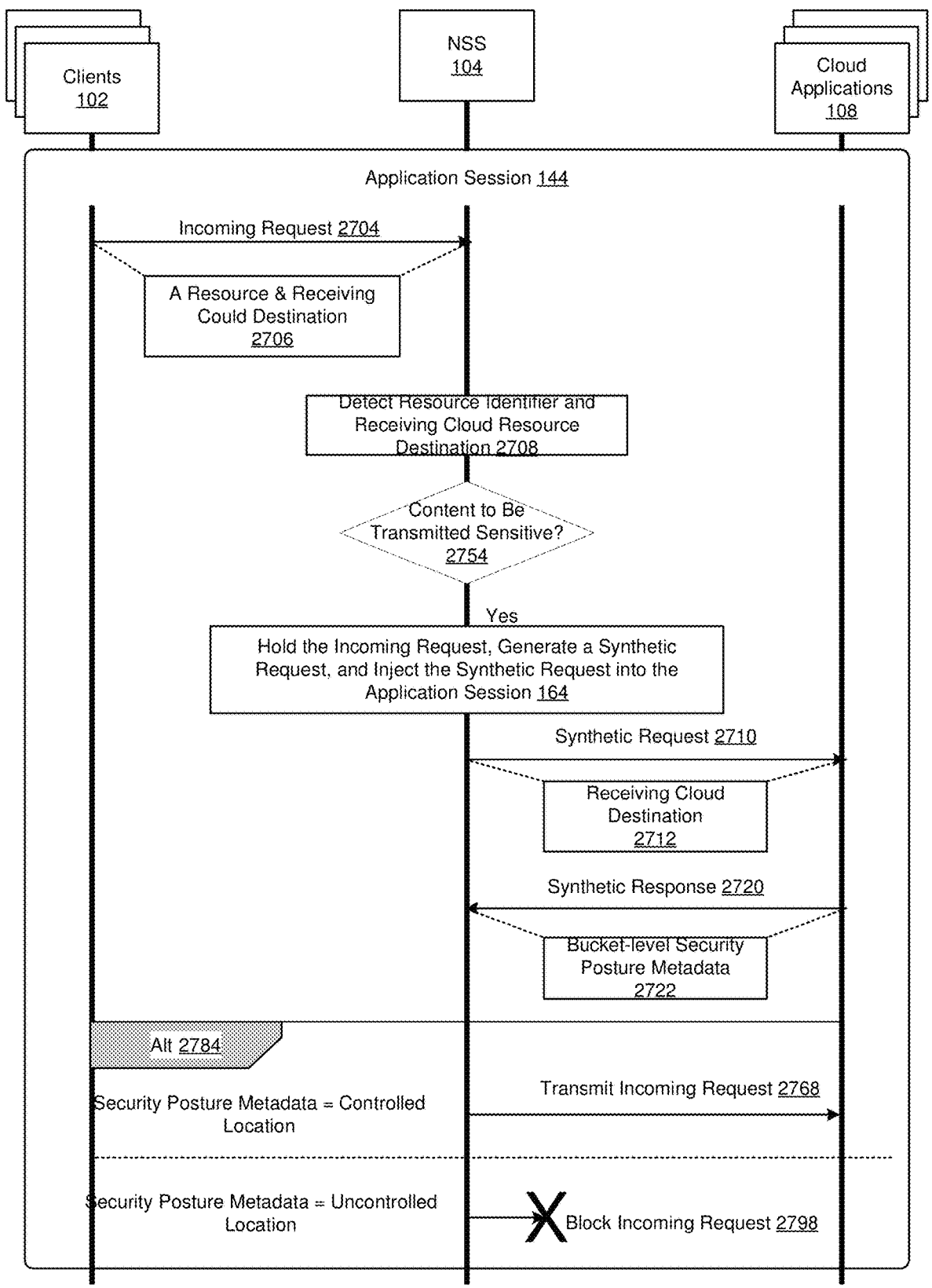
FIG. 27 shows one implementation of using synthetic requests to retrieve security posture metadata of a bucket-level resource residing in cloud application for security policy enforcement preventing sensitive data transmitted to an unsecured location.

In other implementations, in addition to or instead of conditioning the transmission/delivery of the sensitive content to the receiving cloud destination on the receiving cloud destination being a controlled location, the transmission/delivery of the sensitive content to the receiving cloud destination can be further or alternatively contingent on the security configuration of the receiving cloud destination. FIG. 27 shows one implementation that following a predefined policy, the network security system 104 can allow an incoming request and fulfill transmission/delivery of the sensitive content to the receiving cloud destination if the receiving cloud destination is encrypted or configured to encrypt its hosted content (i.e., data at rest). However, if the receiving cloud destination is not setup for encryption of data at rest, then following the predefined policy 2784, the network security system 104 can block 2798 the request and prevent transmission/delivery of the sensitive content to the receiving cloud destination, thereby mitigating the risk of data exfiltration.

In one implementation, the synthetic requests can be configured to retrieve, in corresponding synthetic responses 2720, bucket-level metadata that indicate the security posture about the receiving cloud destination. Example security posture metadata include, for example, metadata specifying whether the receiving cloud destination is configured to encrypt data at rest, metadata specifying whether the receiving cloud destination is configured to encrypt new object by default, metadata specifying whether the receiving cloud destination is publicly accessible, and so on. Such security posture metadata is retrievable by the synthetic responses 2720 from the cloud storage services like Amazon S3, Azure Blob™, Google's Cloud Storage™, and so on.

In some examples, it may not be possible to obtain metadata associated with a bucket in the receiving cloud destination. For instance, the receiving cloud destination may not support the provision of bucket-level metadata, NSS 104 may not have permission to request bucket-level metadata, or an error may prevent the receiving cloud destination from providing the metadata. When it is not possible to obtain bucket-level metadata, request 2704 may be treated as a request that would cause data to leave the organization boundary. Policy 2784 may, therefore, direct NSS 104 to block request 2704 when it is not possible to obtain bucket-level metadata and thereby prevent exfiltration of data from the organization.

The following is an example of request syntax specific to AWS that can be used to construct a synthetic request for retrieving security posture information/metadata of a particular Amazon S3 bucket:

GET /?encryption HTTP/1.1
Host: Bucket.s3.amazonaws.com
x-amz-expected-bucket-owner: ExpectedBucketOwner Additional information about the URI request parameters and other similar request syntaxes that can be included in the synthetic requests can be found at GetBucketEncryption, https://docs.aws.amazon.com/AmazonS3/latest/API/API_GetBucketEncryption.html (last visited Nov. 9, 2021), which is incorporated by reference for all purposes as if fully set forth herein.

Instance Metadata

Cloud services like Amazon Web Services™ (AWS), Google Cloud Platform™ (GCP), Microsoft Azure™ and Alibaba Cloud™ as Infrastructure as a service (IaaS) provide consumers fundamental cloud computing resources with convenient, on-demand network access to a shared pool of configurable resources (e.g., networks, servers, storages, operating systems, applications and services). Each storage entity such as bucket and object provided in, e.g., Google Cloud™ and AWS is a resource in the context of this application. Likewise, compute entities providing cloud computing, such as AWS EC2 and other compute engine instances, are also resources in the cloud infrastructure, conventionally referred to as compute resources. In the FIG. 2, AWS 128A also offers an on-demand cloud computing platform called ELASTIC COMPUTE CLOUD™ (EC2), which allows users 202 to create and run compute instances and access different storage tiers on AWS 128A. EC2 of AWS, a type of compute resource is a resource in the context of this application.

Instance metadata is data about your instance that you (e.g., a corporate account admin?) can use to configure or manage the running instance. Instance metadata is divided into categories, for example, host name, events, and security groups.

You can also use instance metadata to access user data that you specified when launching your instance. For example, you can specify parameters for configuring your instance, or include a simple script. You can build generic AMIs (Amazon Machine Images) and use user data to modify the configuration files supplied at launch time. For example, if you run web servers for various small businesses, they can all use the same generic AMI and retrieve their content from the Amazon S3 bucket that you specify in the user data at launch. To add a new customer at any time, create a bucket for the customer, add their content, and launch your AMI with the unique bucket name provided to your code in the user data.

EC2 instances can also include dynamic data, such as an instance identity document which provides information about the instance itself, e.g., the ID of the instance, instance type of the instance, the ID of AWS account that launches the instance, and the Region in which the instance is running, etc. You can use the instance identity document to validate the attributes of the instances. Instance identity document is generated when the instance is launched, stopped, and started, or restarted. The instance identity document is exposed (in plaintext JSON format) through the Instance Metadata Service (IMDS). The instance identity document can be retrieved from a running instance at any time. The following is example output by IMDS:

```
{
  "devpayProductCodes" : null,
  "marketplaceProductCodes" : [ "1abc2defghijklm3nopqrs4tu" ],
  "availabilityZone" : "us-west-2b",
  "privateIp" : "10.158.112.84",
  "version" : "2017-09-30",
  "instanceId" : "i-1234567890abcdef0",
  "billingProducts" : null,
  "instanceType" : "t2.micro",
  "accountId" : "123456789012",
  "imageId" : "ami-5fb8c835",
  "pendingTime" : "2016-11-19T16:32:11Z",
  "architecture" : "x86_64",
  "kernelId" : null,
  "ramdiskId" : null,
  "region" : "us-west-2"
}
```

Parallel Synthetic Requests

Figure 18:
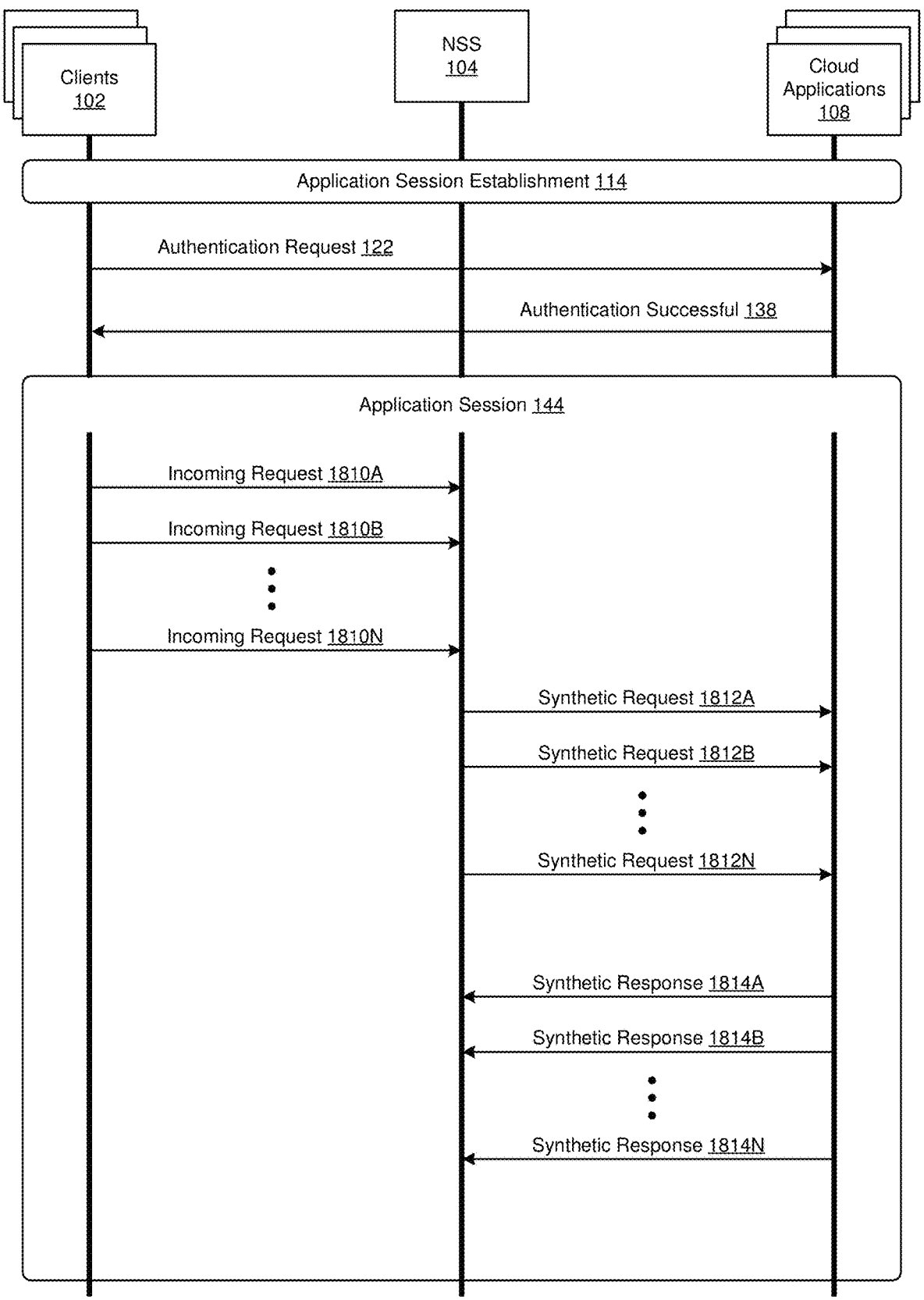
FIG. 18 shows one implementation of issuing multiple synthetic requests during an application session.

FIG. 18 shows one implementation of issuing multiple synthetic requests during an application session. In FIG. 18, during the application session 144, multiple incoming requests 1810A-N can be held and unheld by the network security system 104 in parallel or in sequence in response to the network security system 104 issuing multiple corresponding synthetic requests 1812A-N in parallel or in sequence, and/or the network security system 104 receiving multiple corresponding synthetic responses 1814A-N in parallel or in sequence.

Synthetic Requests for Future Incoming Requests

Figure 19:
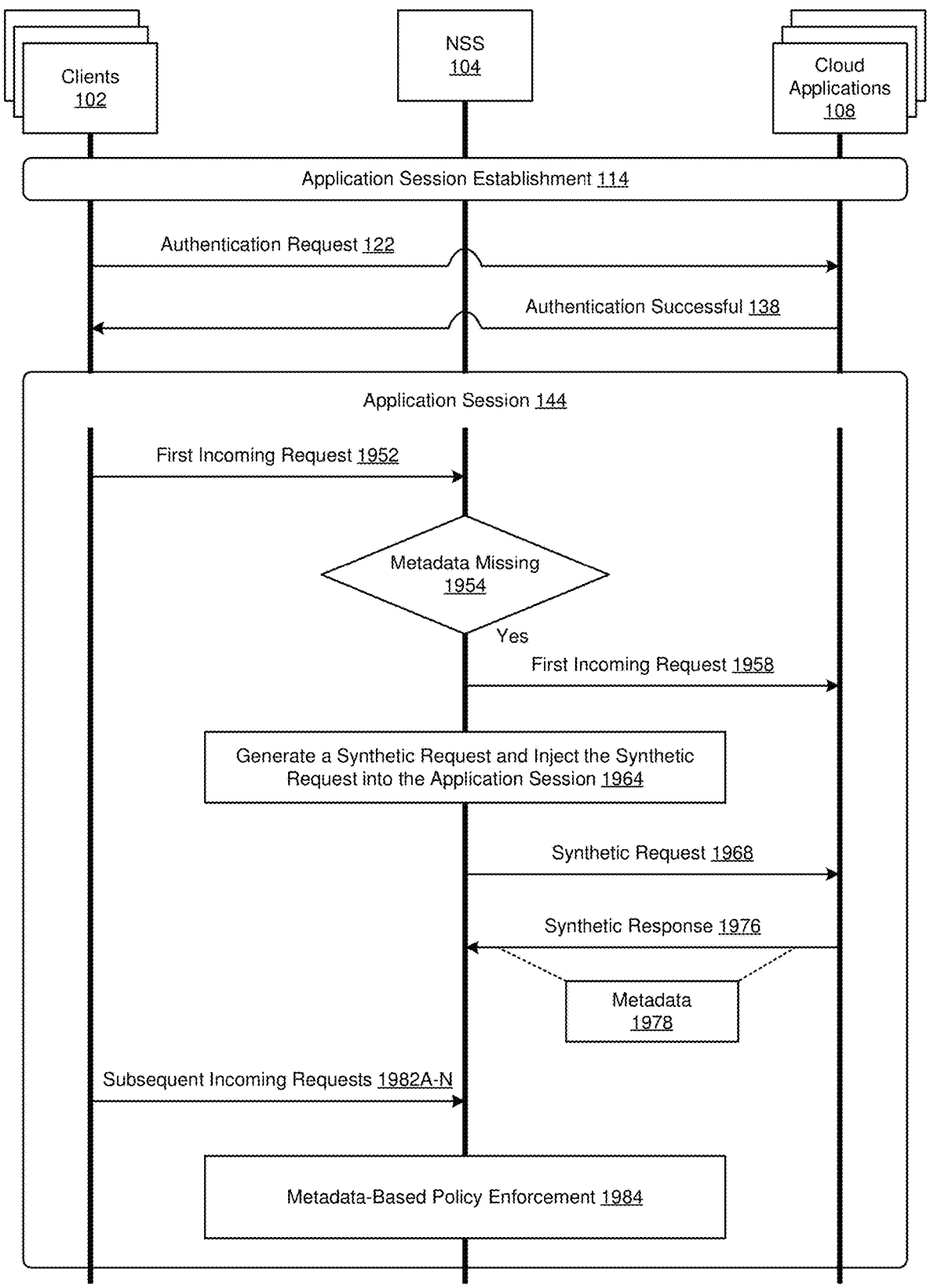
FIG. 19 shows one implementation of issuing a synthetic request to synthetically harvest/generate/garner metadata for policy enforcement on yet-to-be received future incoming requests.

FIG. 19 shows one implementation of issuing a synthetic request to synthetically harvest/generate/garner metadata for policy enforcement on yet-to-be received future incoming requests. In FIG. 19, a first incoming request 1952 is intercepted by the network security system 104. The network security system 104 determines 1954 that the first incoming request 1952 fails to supply the metadata required for policy enforcement. Despite this, the network security system 104 does not hold the first incoming request 1952 and sends 1958 it to the cloud application.

To make the metadata available for future incoming requests, the network security system 104 generates a synthetic request 1968 and injects 1964 it into the application session 144 to transmit the synthetic request 1968 to the cloud application. In response, the network security system 104 receives a synthetic response 1976 that supplies the required metadata 1978.

From there onwards, when the network security system 104 receives subsequent incoming requests 1982A-N, the network security system 104 uses the synthetically harvested/generated/garnered metadata 1978 to perform policy enforcement 1984 on the subsequent incoming requests 1982A-N.

Cloud Security Posture Management

Cloud Security Posture Management (CSPM) is a market segment for IT security tools that are designed to identify misconfiguration issues and compliance risks in the could. Gartner, the IT research and advisory firm that coined the term, describes CSPM as a new category of security products that can help automate security and provide compliance assurance in the cloud. CSPM tools work by examining and comparing a cloud environment against a defined set of best practices and known security risks. Some CSPM tools will alert the cloud customer when there is a need to remediate a security risk, while other more sophisticated CSPM tools will use robotic process automation (RPA) to remediate issues automatically.

CSPM is typically used by organizations that have adopted a cloud-first strategy and want to extend their security best practices to hybrid cloud and multi-cloud environments. CSPM tools are designed to automate cloud security management for like, e.g., Infrastructure as a Service (IaaS) cloud services. CSPM can also be used across diverse infrastructure to minimize configuration mistakes and reduce compliance risks in Software as a Service (SaaS), platform as a Service (PaaS) cloud environment.

Cloud Security Posture Management tools are designed to detect and remediate issues caused by cloud misconfigurations. A specific CSPM tool may only be able to use defined best practices according to a specific cloud environment or service, however, so it is important to know what tools can be used in each specific environment. For example, some tools may be limited to being able to detect misconfigurations in an Amazon AWS or Microsoft Azure environment.

Some CSPM tools can automatically remediate issues by combining real-time continuous monitoring with automation features that can detect and correct issues, such as improper account permissions. Continuous compliance can also be configured according to a number of standards, including HIPAA. Other CSPM tools can be used in tandem with Cloud Access Security Broker (CASB) that safeguards the flow of data between on-premises IT infrastructure and a cloud provider's infrastructure.

Misconfigurations are most often caused by customer mismanagement of multiple connected resources, with cloud-based services to keep track of and manage with many moving pieces. Misconfiguration can be easily made, specially with API-driven approaches to integration, opening an organization to the possibility of a data breach, as it only takes a few misconfigurations in the cloud to leave an organization vulnerable to attack. A specific CSPM can operate comprehensive protection of data, users, and configurations real-time by enforcing consistent policies across cloud applications, e.g., CASB and SSPM (SaaS Security Posture Management).

Example use cases of CSPM further include detecting misconfiguration, preventing configuration drift, maintain compliance and governance, and so on. CSPM is typically designed to discover risky configurations and overly permissive user access by verifying against predefined best practice rules and industry standards, continuously monitor cloud applications for a robust security posture and to prevent configuration drift. CSPM can maintain compliance and governance by simplifying audits and quickly prove governance with pre-built and customizable compliance frameworks. CSPM can be further integrated with Advanced Analytics to discover managed and rogue applications to enforce correct cloud configurations, and seamlessly send alerts via Cloud Ticket Orchestrator and build custom workflows to analyze alerts via Representational Transfer (REST) API.

Figure 28:
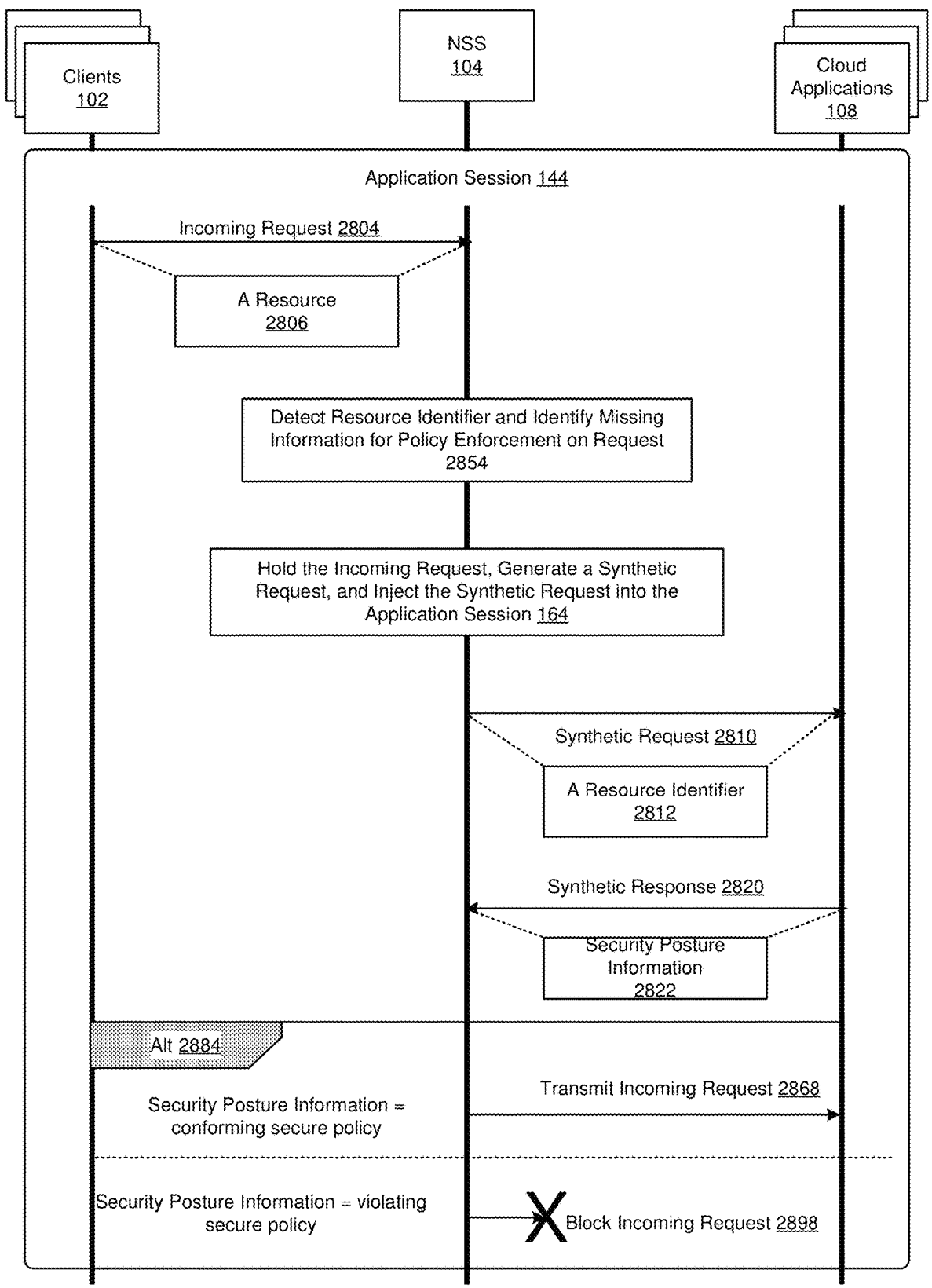
FIG. 28 shows one implementation of using synthetic requests to retrieve/generate/harvest security posture information of a resource hosted on a cloud application for security policy enforcement on an incoming request.

FIG. 28 shows one implementation of using synthetic requests to retrieve/generate/harvest security posture information of a resource hosted on a cloud application for security policy enforcement on an incoming request. In FIG. 28, an incoming request 2804 targeted toward a resource, e.g., a storage entity like Amazon S3 or a compute entity of an EC2 instance hosted on a cloud application. The network security system 104 detects 2854 a resource identifier of the resource from the incoming request and determines if the incoming request 2804 fails to supply the metadata required for security posture policy enforcement on the request.

The network security system 104, then, generates a synthetic request 2810 with the resource identifier 2812 and injects the synthetic request into the application session 144 to transmit the synthetic request to the cloud application. The synthetic request 2810 is configured to retrieve the missing security posture information from the cloud application by inducing an application server of the cloud application to generate a response that includes the missing information. The network security system 104 then receives a synthetic response 2820 to the synthetic request 2810 from the cloud application. The synthetic response 2820 supplies the missing security posture information 2822 to the network security system 104. The network security system 104 then uses the information for security posture policy enforcement on the incoming request.

Figure 29:
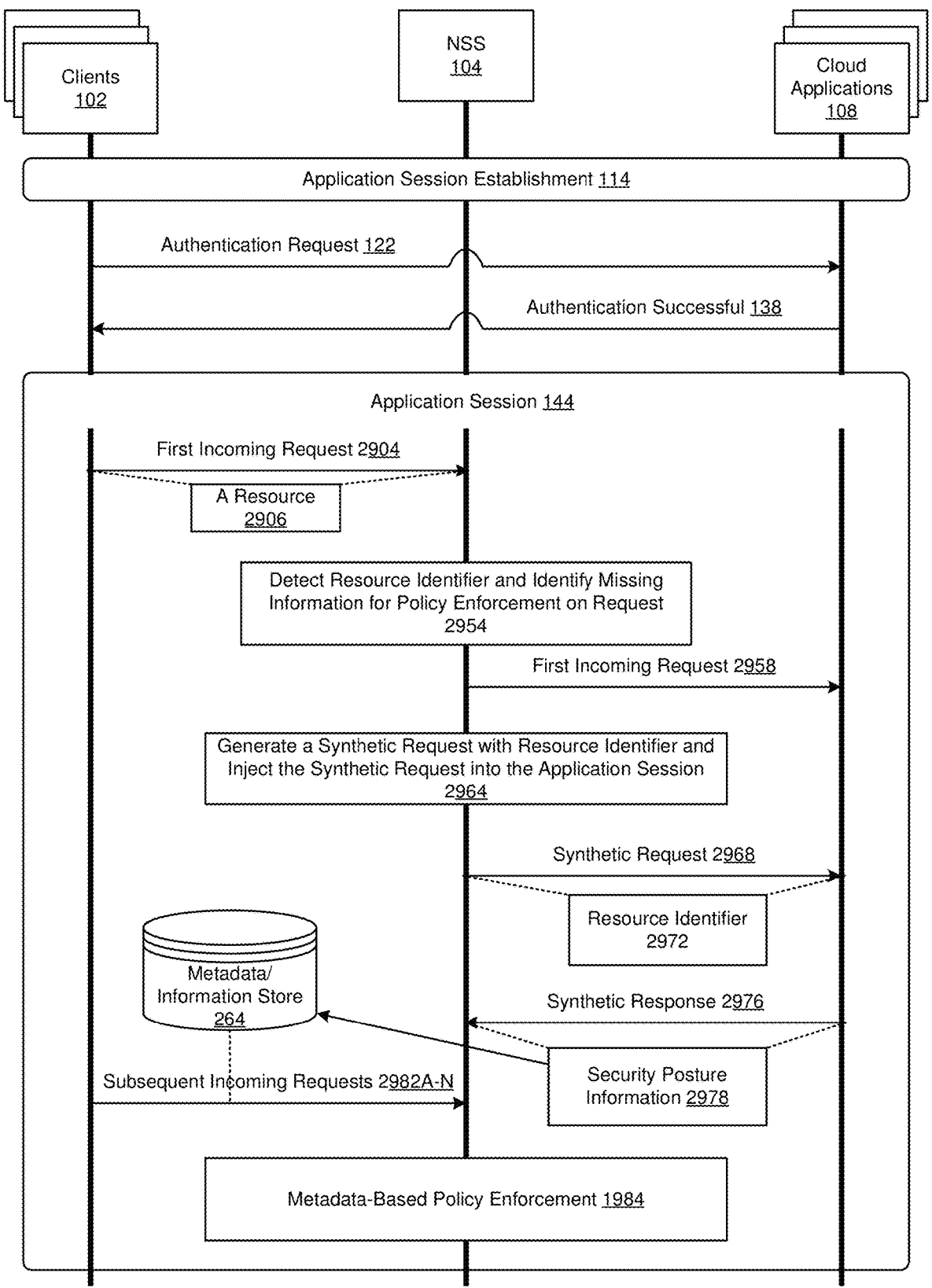
FIG. 29 shows one implementation of using synthetic requests to retrieve/generate/harvest security posture information of a resource hosted on a cloud application for security policy enforcement on yet-to-be received future incoming requests.

FIG. 29 shows one implementation of using synthetic requests to synthetically retrieve/generate/harvest security posture information of a resource hosted on a cloud application for policy enforcement on yet-to-be received future incoming requests. In FIG. 29, a first incoming request 2904 targeted toward a resource, e.g., a storage entity like Amazon S3 or a compute entity of an EC2 instance hosted on a cloud application. The network security system 104 detects 2954 a resource identifier of the resource from the incoming request and determines if the incoming request 2904 fails to supply the metadata required for security posture policy enforcement on the request. Despite this, the network security system 104 does not hold the first incoming request 2952 and sends 2958 it to the cloud application. In another implementation, the network security system 104 blocks the incoming request if the determination indicates the incoming request 2952 fails to supply the metadata required for policy enforcement.

To make the metadata available for future incoming requests, the network security system 104 generates a synthetic request 2968 with the resource identifier 2970 and injects 2964 it into the application session 144 to transmit the synthetic request 2968 to the cloud application. In response, the network security system 104 receives a synthetic response 2976 that supplies the required security posture information 2978. The network security system locally stores the supplied information in a metadata/information store 264 for policy enforcement on future incoming requests that share an application session with the incoming request, thereby obviating generation of further synthetic requests during the application session From there onwards, when the network security system 104 receives subsequent incoming requests 2982A-N, the network security system 104 uses the previously synthetically harvested/generated/garnered information 2978 to perform policy enforcement 2984 on the subsequent incoming requests 2982A-N.

Computer System

Figure 20:
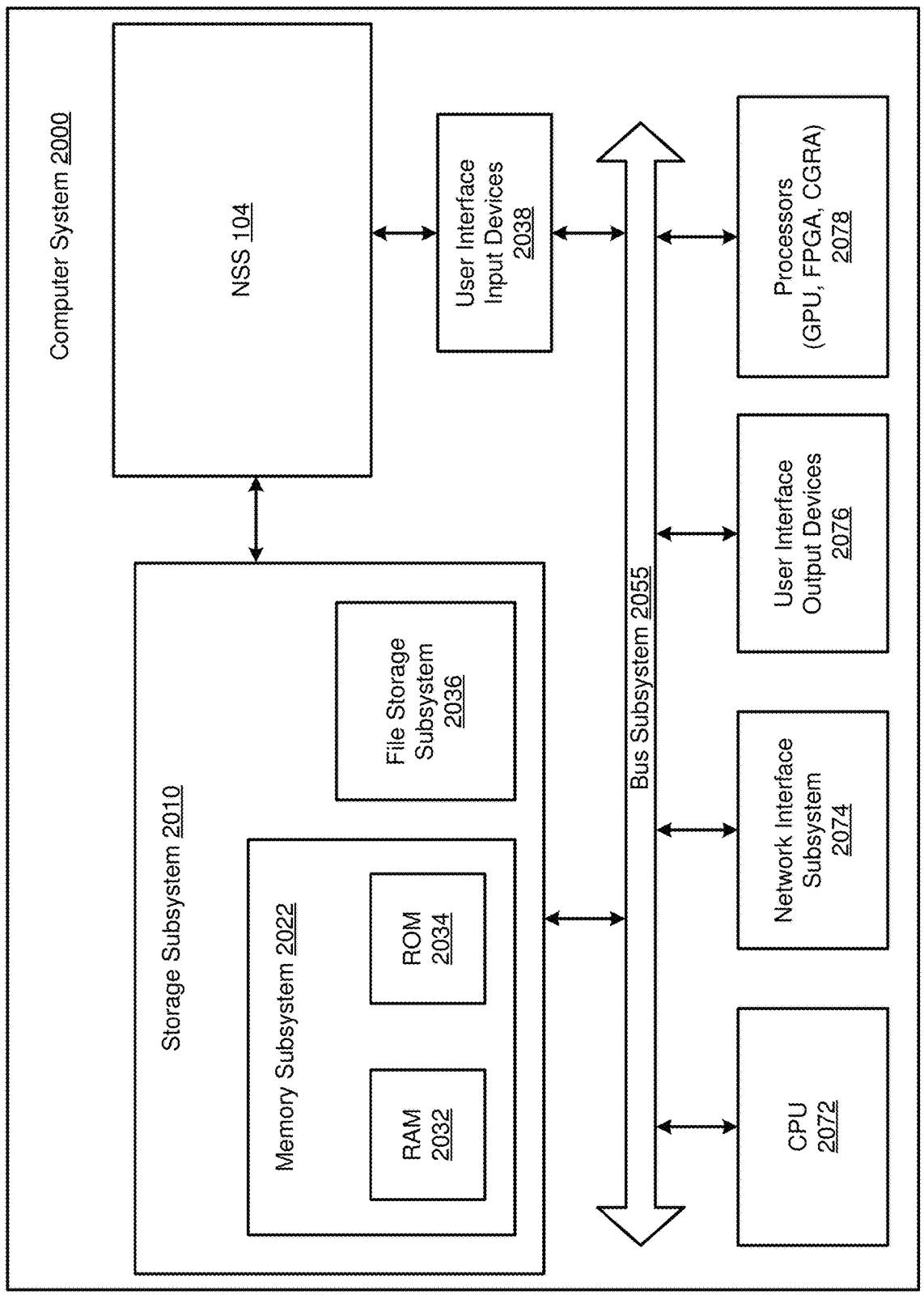
FIG. 20 shows an example computer system that can be used to implement the technology disclosed.

FIG. 20 shows an example computer system 2000 that can be used to implement the technology disclosed. Computer system 2000 includes at least one central processing unit (CPU) 2072 that communicates with a number of peripheral devices via bus subsystem 2055. These peripheral devices can include a storage subsystem 2010 including, for example, memory devices and a file storage subsystem 2036, user interface input devices 2038, user interface output devices 2076, and a network interface subsystem 2074. The input and output devices allow user interaction with computer system 2000. Network interface subsystem 2074 provides an interface to outside networks, including an interface to corresponding interface devices in other computer systems.

In one implementation, the network security system 104 is communicably linked to the storage subsystem 2010 and the user interface input devices 2038.

User interface input devices 2038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2000.

User interface output devices 2076 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 2000 to the user or to another machine or computer system.

Storage subsystem 2010 stores programming and data constructs that provide the functionality of some or all of the modules and methods described herein. These software modules are generally executed by processors 2078.

Processors 2078 can be graphics processing units (GPUs), field-programmable gate arrays (FPGAs), application-specific integrated circuits (ASICs), and/or coarse-grained reconfigurable architectures (CGRAs). Processors 2078 can be hosted by a deep learning cloud platform such as Google Cloud Platform™, Xilinx™, and Cirrascale™ Examples of processors 2078 include Google's Tensor Processing Unit (TPU)™, rackmount solutions like GX4 Rackmount Series™, GX20 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 2022 used in the storage subsystem 2010 can include a number of memories including a main random access memory (RAM) 2032 for storage of instructions and data during program execution and a read only memory (ROM) 2034 in which fixed instructions are stored. A file storage subsystem 2036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 2036 in the storage subsystem 2010, or in other machines accessible by the processor.

Bus subsystem 2055 provides a mechanism for letting the various components and subsystems of computer system 2000 communicate with each other as intended. Although bus subsystem 2055 is shown schematically as a single bus, alternative implementations of the bus subsystem can use multiple busses.

Computer system 2000 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 2000 depicted in FIG. 20 is intended only as a specific example for purposes of illustrating the preferred implementations of the present invention. Many other configurations of computer system 2000 are possible having more or less components than the computer system depicted in FIG. 20.

Particular Implementations

1) Synthetic Request Injection to Retrieve Group Membership Metadata for Cloud Policy Enforcement The technology disclosed configures network security systems with the ability to trigger synthetic requests during application sessions of cloud applications. The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

The implementations described in this section can be combined as features. In the interest of conciseness, the combinations of features are not individually enumerated and are not repeated with each base set of features. The reader will understand how features identified in the implementations described in this section can readily be combined with sets of base features identified as implementations in other sections of this application. These implementations are not meant to be mutually exclusive, exhaustive, or restrictive; and the technology disclosed is not limited to these implementations but rather encompasses all possible combinations, modifications, and variations within the scope of the claimed technology and its equivalents.

The technology disclosed, in particularly, the clauses disclosed in this section, can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

In one implementation, the technology disclosed describes a system. The system comprises a network security system interposed between clients and cloud applications. The network security system configured to receive an incoming request from a client during an application session. The incoming request is directed towards a user group of a cloud application, i.e., a target group of users assembled by the cloud application and targeted by the incoming request, and includes a resource. The network security system analyzes the incoming request and detects that the request attempts to execute an action that causes content of the resource accessible by the target group of users.

The network security system is further configured to determine whether the resource content is sensitive or not. If the network security system determine that the resource content is sensitive, the network security system is further configured to detect an identifier of the user group which identifies the user group in the cloud application. Holding the incoming request to hold off the execution of the action on the resource, the network security system is further configured to generate a synthetic request with the user group identifier and inject the synthetic request into the application session to transmit the synthetic request to the cloud application. The synthetic request is configured to retrieve metadata about the user group using the user group identifier.

The network security system is further configured to receive a response to the synthetic request from the cloud application. The network security system is further configured to determine whether the action is executable on the resource based on the evaluation of the metadata supplied by the response against the security policy, and enforce the policy on the incoming request.

In one implementation of the system, the metadata about the user group includes group membership metadata that is, individually or collectively, indicative as to whether the user group has at least one unauthorized user against the security policy.

In one implementation of the system, the network security system is further configured to fulfill the incoming request if the network security system determines the resource content is not sensitive.

In one implementation of the system, the network security system is further configured to block the incoming request, if the network security system determines the group membership metadata indicates that the user group has at least one unauthorized user.

In one implementation of the system, the network security system is further configured to fulfill the incoming request if the group membership metadata indicates that all the members in the user group are authorized users against the security policy.

In some implementations of the system, the resource is a file, a folder, a node, or an object. In some implementation of the system, the user group is like a user group on a network directory, a user group shared a folder, members of a channel, or members of a team, organized by the cloud application for collaboration. In some implementation of the system, the cloud application is a collaboration app like Slack™, Microsoft Teams™, and Webex™.

In one implementation of the system, the network security system is further configured to determine the sensitivity of the resource by generating a synthetic request with the resource to retrieve the sensitivity metadata of the resource, and receive a response to the synthetic request, The response supplies the sensitivity metadata of the resource.

In one implementation of the system, the network security system is further configured to determine the sensitivity of the resource by detect an identifier of the resource, generating a synthetic request with the resource identifier to retrieve the sensitivity metadata of the resource, and receive a response to the synthetic request. The response supplies the sensitivity metadata of the resource.

In one implementation of the system, the network security system is further configured to determine the sensitivity of the resource by conducting content sensitivity scan, e.g., using data loss prevention (DLP) analysis (e.g., text analysis) over the resource, and generate sensitivity metadata that specify whether the resource is sensitive or not.

In one implementation of the system, the generated sensitivity metadata is stored as object metadata of the resource or stored in a cloud-based metadata store which the network security system has access to.

In one implementation of the system, the network security system is further configured to determine the sensitivity of the resource by inferring from a previously generated sensitivity metadata stored in a cloud-based metadata store which the network security system has access to.

In one implementation of the system, the synthetic request is further configured to store the group membership metadata of the user group to a cloud-based metadata store which the network security system has access to.

In one implementation of the system, the synthetic request is further configured to retrieve the group membership metadata of the user group from a cloud-based metadata store which the network security system has access to.

In one implementation of the system, the network security system is further configured to extract an authentication token from the incoming request, and to configure the synthetic request with the authentication token to access the cloud application.

In another implementation, the technology disclosed describes a computer-implemented method. The computer-implemented method includes a network security system receiving an incoming request from a client during an application session. The network security system is interposed between clients and cloud applications. The incoming request is directed towards a user group of a could application, i.e., a target group of users organized by the cloud application and targeted by the incoming request, and includes a resource.

The computer-implemented method further includes the network security system analyzing the incoming request and detect the incoming request attempting to execute an action causing content of the resource accessible by the target group of users.

The computer-implemented method further includes the network security system determining whether the resource content is sensitive or not.

The computer-implemented method further includes the network security system detecting an identifier which identifies the user group in the cloud application.

The computer-implemented method further includes the network security system holding the incoming request, generating a synthetic request with the user group identifier and injecting the synthetic request into the application session to transmit the synthetic request to the cloud application. The synthetic request is configured to retrieve metadata about the user group using the user group identifier.

The computer-implemented method further includes the network security system receiving a response to the synthetic request from the cloud application, wherein the response supplies the metadata about the user group. The computer-implemented method further includes the network security system evaluating the metadata about the user group to enforce the security policy on the incoming request.

In one implementation of the computer-implemented method, the metadata about the user group includes group membership metadata that is, individually or collectively, indicative as to whether the user group has at least one unauthorized user against the security policy.

In one implementation, the computer-implemented method further includes the network security system fulfilling the incoming request if the network security system determines the resource content is not sensitive.

In one implementation, the computer-implemented method further includes the network security system blocking the incoming request, if the network security system determines the group membership metadata indicates that the user group has at least one unauthorized user.

In one implementation, the computer-implemented method further includes the network security system fulfill the incoming request if the group membership metadata indicates that all the members in the user group are authorized users against the security policy.

In some implementations of the computer-implemented method, the resource is a file, a folder, a node, or an object. In some implementation of the computer-implemented method, the user group is like a user group on a network directory, a user group shared a folder, members of a channel, or members of a team, organized by the cloud application for collaboration. In some implementation of the computer-implemented method, the cloud application is a collaboration app like Slack™, Microsoft Teams™, and Webex™.

In one implementation, the computer-implemented method further includes the network security system determining the sensitivity of the resource by generating a synthetic request with the resource to retrieve the sensitivity metadata of the resource and receiving a response to the synthetic request. The response supplies the sensitivity metadata of the resource.

In one implementation, the computer-implemented method further includes the network security system determining the sensitivity of the resource by detect an identifier of the resource, generating a synthetic request with the resource identifier to retrieve the sensitivity metadata of the resource, and receive a response to the synthetic request. The response supplies the sensitivity metadata of the resource.

In one implementation, the computer-implemented method further includes the network security system determining the sensitivity of the resource by conducting content sensitivity scan, e.g., using data loss prevention (DLP) analysis (e.g., text analysis) over the resource, and generate sensitivity metadata that specify whether the resource is sensitive or not.

In one implementation of the computer-implemented method, the generated sensitivity metadata is stored as object metadata of the resource or stored in a cloud-based metadata store which the network security system has access to.

In one implementation, the computer-implemented method further includes the network security system determining the sensitivity of the resource by inferring from a previously generated sensitivity metadata stored in a cloud-based metadata store which the network security system has access to.

In one implementation of the computer-implemented method, the synthetic request is further configured to store the group membership metadata of the user group to a cloud-based metadata store which the network security system has access to.

In one implementation of the computer-implemented method, the synthetic request is configured to retrieve the group membership metadata of the user group from a cloud-based metadata store which the network security system has access to.

In one implementation of the computer-implemented method further includes the network security system extracting an authentication token from the incoming request, and to configure the synthetic request with the authentication token to access the cloud application.

Other implementations of the computer-implemented method disclosed herein can include a system including memory and one or more processors operable to execute instructions, stored in the memory, to perform the computer-implemented method described above. Yet other implementations of the computer-implemented method disclosed herein can include a non-transitory computer readable storage medium impressed with computer program instructions to enforce policies, the instructions, when executed on a processor, implement a method described above.

In yet another implementation, a non-transitory computer readable storage medium impressed with computer program instructions to enforce policies is described. The instructions, when executed on a processor, implement a method comprising a network security system receiving during an application session an incoming request from a client. The incoming request is directed to access a user group on a cloud application, and includes a resource. The network security system is interposed between clients and cloud applications.

The method further includes the network security system analyzing the incoming request and detect the incoming request attempting to execute an action causing content of the resource accessible by the target group of users.

The method further includes the network security system determining whether the resource content is sensitive or not.

The method further includes the network security system detecting an identifier which identifies the user group in the cloud application.

The method further includes the network security system holding the incoming request, generating a synthetic request with the user group identifier and injecting the synthetic request into the application session to transmit the synthetic request to the cloud application. The synthetic request is configured to retrieve metadata about the user group using the user group identifier.

The method further includes the network security system receiving a response to the synthetic request from the cloud application. The response supplies the metadata about the user group.

The method further includes the network security system evaluating the metadata about the user group to enforce the security policy on the incoming request.

In one implementation, the non-transitory computer readable storage medium further includes the network security system fulfilling the incoming request if the network security system determines the resource content is not sensitive.

In one implementation, the non-transitory computer readable storage medium further includes the network security system blocking the incoming request, if the network security system determines the group membership metadata indicates that the user group has at least one unauthorized user.

In one implementation, the non-transitory computer readable storage medium further includes the network security system fulfill the incoming request if the group membership metadata indicates that all the members in the user group are authorized users against the security policy.

In some implementations of the non-transitory computer readable storage medium, the resource is a file, a folder, a node, or an object. In some implementation of the computer-implemented method, the user group is like a user group on a network directory, a user group shared a folder, members of a channel, or members of a team, organized by the cloud application for collaboration. In some implementation of the computer-implemented method, the cloud application is a collaboration app like Slack™, Microsoft Teams™, and Webex™.

In one implementation, the non-transitory computer readable storage medium further includes the network security system determining the sensitivity of the resource by generating a synthetic request with the resource to retrieve the sensitivity metadata of the resource, and receiving a response to the synthetic request. The response supplies the sensitivity metadata of the resource.

In one implementation, the non-transitory computer readable storage medium further includes the network security system determining the sensitivity of the resource by detect an identifier of the resource, generating a synthetic request with the resource identifier to retrieve the sensitivity metadata of the resource, and receive a response to the synthetic request. The response supplies the sensitivity metadata of the resource.

In one implementation, the non-transitory computer readable storage medium further includes the network security system determining the sensitivity of the resource by conducting content sensitivity scan, e.g., using data loss prevention (DLP) analysis (e.g., text analysis) over the resource, and generate sensitivity metadata that specify whether the resource is sensitive or not.

In one implementation of the non-transitory computer readable storage medium, the generated sensitivity metadata is stored as object metadata of the resource or stored in a cloud-based metadata store which the network security system has access to.

In one implementation, the non-transitory computer readable storage medium further includes the network security system determining the sensitivity of the resource by inferring from a previously generated sensitivity metadata stored in a cloud-based metadata store which the network security system has access to.

In one implementation of the non-transitory computer readable storage medium, the synthetic request is further configured to store the group membership metadata of the user group to a cloud-based metadata store which the network security system has access to.

In one implementation of the non-transitory computer readable storage medium, the synthetic request is configured to retrieve the group membership metadata of the user group from a cloud-based metadata store which the network security system has access to.

In one implementation of the non-transitory computer readable storage medium further includes the network security system extracting an authentication token from the incoming request, and to configure the synthetic request with the authentication token to access the cloud application.

In one implementation, the technology disclosed describes a system. The system comprises a network security system interposed between clients and cloud applications. The network security system is configured to receive from a client an incoming request to access a cloud application in an application session, i.e., a target cloud application targeted by the incoming request.

2) Synthetic Request Injection to Retrieve Bucket-Level Ownership Metadata for Cloud Policy Enforcement In one implementation, the technology disclosed describes a system of enforcing data loss prevention policy. The system comprises a network security system, interposed between clients and cloud applications. The network security system is configured to receive, during an application session, an incoming request from a client. The incoming request includes a resource identifier of a resource which resides at a transmitting cloud destination (i.e., a first cloud resource location, e.g., an Amazon S3 bucket, GCP bucket or Azure blob) in a cloud application.

The network security system analyzes the incoming request and identify a receiving cloud destination (i.e., a second cloud resource location, e.g., an Amazon S3 bucket, GCP bucket or Azure blob). The network security system is further configured to detect the request attempting to execute an action causing content of the resource propagated from the transmitting cloud destination to the receiving cloud destination.

The network security system determines whether the resource contains sensitive content or not (e.g., a sensitive object or link thereto). If the resource contains sensitive content, the network security system holds the incoming request, generates a synthetic request with the receiving cloud destination, injects the synthetic request into the application session and transmits the synthetic request to the cloud application. The synthetic request is configured to retrieve bucket-level ownership metadata of the receiving cloud destination from the cloud application.

The network security system is further configured to receive a response to the synthetic request from the cloud application. The response supplies the bucket-level ownership metadata, which is, individually or collectively, indicative the ownership of the receiving cloud destination. evaluate the retrieved bucket-level ownership metadata and enforce a security policy on the incoming request.

In one implementation of the system, the action of the incoming request includes, e.g., moving, copying, backing up, cloning, and versioning the content of the resource.

In one implementation, the network security system is further configured to fulfill the incoming request, if the bucket-level ownership metadata indicates that the receiving cloud destination is to be determined a controlled location against the security policy.

In one implementation, the network security system is further configured to block the incoming request, if the bucket-level ownership metadata indicates that the receiving cloud destination is not a controlled location against the security policy.

In one implementation, the network security system is further configured to block a part of incoming request where the part of incoming request involves a sensitive object, if the bucket-level ownership metadata indicates that the receiving cloud destination is not a controlled location.

In one implementation of the network security system, the receiving cloud destination is a controlled location when the resource subjected to the action is owned by a consumer account which also owns the receiving cloud destination.

In one implementation of the network security system, the receiving cloud destination is a controlled location when an organization, which the client making the incoming request belongs to, also owns the receiving cloud destination.

In one implementation of the network security system, the receiving cloud destination is a controlled location when the receiving cloud destination is generally under the ambit of the enforcement of the security policy.

In some implementations of the network security system, the data of the resource includes, e.g., a file, a folder, a node, a resource, or a cloud resource location itself (e.g., an Amazon S3 bucket, GCP bucket, or Azure blob).

In one implementation, the network security system is further configured to determine the sensitivity of the resource by generating a synthetic request with the resource identifier to retrieve the sensitivity metadata of the resource, and receiving a response to the synthetic request. The response supplies the sensitivity metadata of the resource.

In one implementation, the network security system is further configured to determine the sensitivity of the resource by conducting content sensitivity scan, e.g., using data loss prevention (DLP) analysis (e.g., text analysis, string or sub-string inspection) over the resource, and generate sensitivity metadata that specify whether the resource is sensitive or not.

In one implementation of the network security system, the generated sensitivity metadata is stored as the resource metadata of the resource (e.g., object metadata, bucket metadata, or blob metadata).

In one implementation of the network security system, the generated sensitivity metadata is stored in a cloud-based metadata store which the network security system has access to.

In one implementation, the network security system is further configured to determine the sensitivity of the resource by inferring from a previously generated sensitivity metadata stored in a cloud-based metadata store which the network security system has access to.

In one implementation of the network security system, the synthetic request is further configured to retrieve the bucket-level ownership metadata from a cloud-based metadata store which the network security system has access to.

In one implementation of the network security system, the security policy is attached to the resource (e.g., a bucket and an object), called resource-based policy.

In another implementation, the technology disclosed describes a computer-implemented method. The computer-implemented method includes a network security system receiving an incoming request from a client during an application session. The network security system is interposed between clients and cloud applications. The incoming request includes a resource identifier of a resource which resides at a transmitting cloud destination (i.e., a first cloud resource location, e.g., an amazon S3 bucket, GCP bucket or Azure blob) in a cloud application.

The computer-implemented method further includes the network security system analyzing the incoming request and identifying a receiving cloud destination (i.e., a second cloud resource location, e.g., an Amazon S3 bucket, GCP bucket or Azure blob).

The computer-implemented method further includes the network security system detecting the request attempting to execute an action causing content of the resource propagated from the transmitting cloud destination to the receiving cloud destination.

The computer-implemented method further includes the network security system determining whether the resource contains sensitive content or not (e.g., a sensitive object or link thereto).

If the resource contains sensitive content, the computer-implemented method further includes the network security system holding the incoming request, generating a synthetic request with the receiving cloud destination, injecting the synthetic request into the application session and transmitting the synthetic request to the cloud application. The synthetic request is configured to retrieve bucket-level ownership metadata of the receiving cloud destination from the cloud application.

The computer-implemented method further includes the network security system receiving a response to the synthetic request from the cloud application. The response supplies the bucket-level ownership metadata, which is, individually or collectively, indicative the ownership of the receiving cloud destination.

The computer-implemented method further includes the network security system evaluating the retrieved bucket-level ownership metadata and enforcing a security policy on the incoming request.

In one implementation of the computer-implemented method, the action of the incoming request includes, e.g., moving, copying, backing up, cloning, and versioning the content of the resource.

In one implementation, the computer-implemented method further includes the network security system fulfilling the incoming request, if the bucket-level ownership metadata indicates that the receiving cloud destination is to be determined a controlled location against the security policy.

In one implementation, the computer-implemented method further includes the network security system blocking the incoming request, if the bucket-level ownership metadata indicates that the receiving cloud destination is not a controlled location against the security policy.

In one implementation, the computer-implemented method further includes the network security system blocking one or more parts of incoming request where the parts of incoming request involves at least one sensitive object, if the bucket-level ownership metadata indicates that the receiving cloud destination is not a controlled location.

In one implementation of the computer-implemented method, the receiving cloud destination is a controlled location when the resource subjected to the action is owned by a consumer account which also owns the receiving cloud destination.

In one implementation of the computer-implemented method, the receiving cloud destination is a controlled location when an organization, which the client making the incoming request belongs to, also owns the receiving cloud destination.

In one implementation of the computer-implemented method, the receiving cloud destination is a controlled location when the receiving cloud destination is generally under the ambit of the enforcement of the security policy.

In some implementations of the computer-implemented method, the data of the resource includes, e.g., a file, a folder, a node, a resource, or a cloud resource location itself (e.g., an Amazon S3 bucket, GCP bucket, or Azure blob).

In one implementation, the computer-implemented method further includes the network security system determining the sensitivity of the resource by generating a synthetic request with the resource identifier to retrieve the sensitivity metadata of the resource, and receiving a response to the synthetic request. The response supplies the sensitivity metadata of the resource.

In one implementation, the computer-implemented method further includes the network security system determining the sensitivity of the resource by conducting content sensitivity scan, e.g., using data loss prevention (DLP) analysis (e.g., text analysis, string or sub-string inspection) over the resource, and generate sensitivity metadata that specify whether the resource is sensitive or not.

In one implementation of the computer-implemented method, the generated sensitivity metadata is stored as the resource metadata of the resource (e.g., object metadata, bucket metadata, or blob metadata).

In one implementation of the computer-implemented method, the generated sensitivity metadata is stored in a cloud-based metadata store which the network security system has access to.

In one implementation, the computer-implemented method further includes the network security system determining the sensitivity of the resource by inferring from a previously generated sensitivity metadata stored in a cloud-based metadata store which the network security system has access to.

In one implementation of the computer-implemented method, the synthetic request is further configured to retrieve the bucket-level ownership metadata from a cloud-based metadata store which the network security system has access to.

In one implementation of the computer-implemented method, the security policy is attached to the resource (e.g., a bucket and an object), called resource-based policy.

Other implementations of the computer-implemented method disclosed herein can include a system including memory and one or more processors operable to execute instructions, stored in the memory, to perform the computer-implemented method described above. Yet other implementations of the computer-implemented method disclosed herein can include a non-transitory computer readable storage medium impressed with computer program instructions to enforce policies, the instructions, when executed on a processor, implement a method described above.

In yet another implementation, a non-transitory computer readable storage medium impressed with computer program instructions to enforce policies is described. The instructions, when executed on a processor, implement a method comprising a network security system receiving an incoming request from a client during an application session. The network security system is interposed between clients and cloud applications. The incoming request includes a resource identifier of a resource which resides at a transmitting cloud destination (i.e., a first cloud resource location, e.g., an amazon S3 bucket, GCP bucket or Azure blob) in a cloud application.

The method further includes the network security system analyzing the incoming request and identifying a receiving cloud destination (i.e., a second cloud resource location, e.g., an Amazon S3 bucket, GCP bucket or Azure blob).

The method further includes the network security system detecting the request attempting to execute an action causing content of the resource propagated from the transmitting cloud destination to the receiving cloud destination.

The method further includes the network security system determining whether the resource contains sensitive content or not (e.g., a sensitive object or link thereto).

If the resource contains sensitive content, the method further includes the network security system holding the incoming request, generating a synthetic request with the receiving cloud destination, injecting the synthetic request into the application session and transmitting the synthetic request to the cloud application, wherein the synthetic request is configured to retrieve bucket-level ownership metadata of the receiving cloud destination from the cloud application.

The method further includes the network security system receiving a response to the synthetic request from the cloud application. The response supplies the bucket-level ownership metadata, which is, individually or collectively, indicative the ownership of the receiving cloud destination.

The method further includes the network security system evaluating the retrieved bucket-level ownership metadata and enforcing a security policy on the incoming request.

In one implementation of the non-transitory computer readable storage medium, the action of the incoming request includes, e.g., moving, copying, backing up, cloning, and versioning the content of the resource.

In one implementation, the non-transitory computer readable storage medium further includes the network security system fulfilling the incoming request, if the bucket-level ownership metadata indicates that the receiving cloud destination is to be determined a controlled location against the security policy.

In one implementation, the non-transitory computer readable storage medium further includes the network security system blocking the incoming request, if the bucket-level ownership metadata indicates that the receiving cloud destination is not a controlled location against the security policy.

In one implementation, the non-transitory computer readable storage medium further includes the network security system blocking one or more parts of incoming request where the parts of incoming request involves at least one sensitive object, if the bucket-level ownership metadata indicates that the receiving cloud destination is not a controlled location.

In one implementation of the non-transitory computer readable storage medium, the receiving cloud destination is a controlled location when the resource subjected to the action is owned by a consumer account which also owns the receiving cloud destination.

In one implementation of the non-transitory computer readable storage medium, the receiving cloud destination is a controlled location when an organization, which the client making the incoming request belongs to, also owns the receiving cloud destination.

In one implementation of the non-transitory computer readable storage medium, the receiving cloud destination is a controlled location when the receiving cloud destination is generally under the ambit of the enforcement of the security policy.

In some implementations of the non-transitory computer readable storage medium, the data of the resource includes, e.g., a file, a folder, a node, a resource, or a cloud resource location itself (e.g., an Amazon S3 bucket, GCP bucket, or Azure blob).

In one implementation, the non-transitory computer readable storage medium further includes the network security system determining the sensitivity of the resource by generating a synthetic request with the resource identifier to retrieve the sensitivity metadata of the resource, and receiving a response to the synthetic request. The response supplies the sensitivity metadata of the resource.

In one implementation, the non-transitory computer readable storage medium further includes the network security system determining the sensitivity of the resource by conducting content sensitivity scan, e.g., using data loss prevention (DLP) analysis (e.g., text analysis, string or substring inspection) over the resource, and generate sensitivity metadata that specify whether the resource is sensitive or not.

In one implementation of the non-transitory computer readable storage medium, the generated sensitivity metadata is stored as the resource metadata of the resource (e.g., object metadata, bucket metadata, or blob metadata).

In one implementation of the non-transitory computer readable storage medium, the generated sensitivity metadata is stored in a cloud-based metadata store which the network security system has access to.

In one implementation, the non-transitory computer readable storage medium further includes the network security system determining the sensitivity of the resource by inferring from a previously generated sensitivity metadata stored in a cloud-based metadata store which the network security system has access to.

In one implementation of the non-transitory computer readable storage medium, the synthetic request is further configured to retrieve the bucket-level ownership metadata from a cloud-based metadata store which the network security system has access to.

In one implementation of the non-transitory computer readable storage medium, the security policy is attached to the resource (e.g., a bucket and an object), called resource-based policy.

3) Synthetic Request Injection to Retrieve Bucket-Level Security Posture Metadata for Cloud Policy Enforcement In one implementation, the technology disclosed describes a system of enforcing data loss prevention policy. The system comprises a network security system, interposed between clients and cloud applications. The network security system is configured to receive, during an application session, an incoming request from a client. The incoming request includes a resource identifier of a resource which resides at a transmitting cloud destination (i.e., a first cloud resource location, e.g., an Amazon S3 bucket, GCP bucket or Azure blob) in a cloud application.

The network security system analyzes the incoming request and identify a receiving cloud destination (i.e., a second cloud resource location, e.g., an Amazon S3 bucket, GCP bucket or Azure blob). The network security system is further configured to detect the request attempting to execute an action causing content of the resource propagated from the transmitting cloud destination to the receiving cloud destination.

The network security system determines whether the resource contains sensitive content or not (e.g., a sensitive object or link thereto). If the resource contains sensitive content, the network security system holds the incoming request, generates a synthetic request with the receiving cloud destination, injects the synthetic request into the application session and transmits the synthetic request to the cloud application. The synthetic request is configured to retrieve bucket-level security posture metadata of the receiving cloud destination from the cloud application.

The network security system is further configured to receive a response to the synthetic request from the cloud application. The response supplies the bucket-level security posture metadata, which is, individually or collectively, indicative the ownership of the receiving cloud destination. evaluate the retrieved bucket-level security posture metadata and enforce a security policy on the incoming request.

In one implementation of the system, the action of the incoming request includes, e.g., moving, copying, backing up, cloning, and versioning the content of the resource.

In one implementation, the network security system is further configured to fulfill the incoming request, if the bucket-level security posture metadata indicates that the receiving cloud destination is to be determined a secured location against the security policy.

In one implementation, the network security system is further configured to block the incoming request, if the bucket-level security posture metadata indicates that the receiving cloud destination is not a secured location against the security policy.

In one implementation, the network security system is further configured to block a part of incoming request where the part of incoming request involves a sensitive object, if the bucket-level security posture metadata indicates that the receiving cloud destination is not a secured location.

In one implementation of the network security system, the receiving cloud destination is a secured location where the receiving cloud destination is configured to encrypt data at rest hosted therein.

In one implementation of the network security system, the receiving cloud destination is a secured location where the receiving cloud destination is configured to encrypt new objects added thereto.

In one implementation of the network security system, the receiving cloud destination is a secured location where the receiving cloud destination is configured not accessible by any unauthorized users.

In some implementations of the network security system, the data of the resource includes, e.g., a file, a folder, a node, a resource, or a cloud resource location itself (e.g., an Amazon S3 bucket, GCP bucket, or Azure blob).

In one implementation, the network security system is further configured to determine the sensitivity of the resource by generating a synthetic request with the resource identifier to retrieve the sensitivity metadata of the resource, and receiving a response to the synthetic request. The response supplies the sensitivity metadata of the resource.

In one implementation, the network security system is further configured to determine the sensitivity of the resource by conducting content sensitivity scan, e.g., using data loss prevention (DLP) analysis (e.g., text analysis, string or sub-string inspection) over the resource, and generate sensitivity metadata that specify whether the resource is sensitive or not.

In one implementation of the network security system, the generated sensitivity metadata is stored as the resource metadata of the resource (e.g., object metadata, bucket metadata, or blob metadata).

In one implementation of the network security system, the generated sensitivity metadata is stored in a cloud-based metadata store which the network security system has access to.

In one implementation, the network security system is further configured to determine the sensitivity of the resource by inferring from a previously generated sensitivity metadata stored in a cloud-based metadata store which the network security system has access to.

In one implementation of the network security system, the synthetic request is further configured to retrieve the bucket-level security posture metadata from a cloud-based metadata store which the network security system has access to.

In one implementation of the network security system, the security policy is attached to the resource (e.g., a bucket and an object), called resource-based policy.

In another implementation, the technology disclosed describes a computer-implemented method. The computer-implemented method includes a network security system receiving an incoming request from a client during an application session. The network security system is interposed between clients and cloud applications. The incoming request includes a resource identifier of a resource which resides at a transmitting cloud destination (i.e., a first cloud resource location, e.g., an amazon S3 bucket, GCP bucket or Azure blob) in a cloud application.

The computer-implemented method further includes the network security system analyzing the incoming request and identifying a receiving cloud destination (i.e., a second cloud resource location, e.g., an Amazon S3 bucket, GCP bucket or Azure blob).

The computer-implemented method further includes the network security system detecting the request attempting to execute an action causing content of the resource propagated from the transmitting cloud destination to the receiving cloud destination.

The computer-implemented method further includes the network security system determining whether the resource contains sensitive content or not (e.g., a sensitive object or link thereto).

If the resource contains sensitive content, the computer-implemented method further includes the network security system holding the incoming request, generating a synthetic request with the receiving cloud destination, injecting the synthetic request into the application session and transmitting the synthetic request to the cloud application. The synthetic request is configured to retrieve bucket-level security posture metadata of the receiving cloud destination from the cloud application.

The computer-implemented method further includes the network security system receiving a response to the synthetic request from the cloud application. The response supplies the bucket-level security posture metadata, which is, individually or collectively, indicative the ownership of the receiving cloud destination.

The computer-implemented method further includes the network security system evaluating the retrieved bucket-level security posture metadata and enforcing a security policy on the incoming request.

In one implementation of the computer-implemented method, the action of the incoming request includes, e.g., moving, copying, backing up, cloning, and versioning the content of the resource.

In one implementation, the computer-implemented method further includes the network security system fulfilling the incoming request, if the bucket-level security posture metadata indicates that the receiving cloud destination is to be determined a secured location against the security policy.

In one implementation, the computer-implemented method further includes the network security system blocking the incoming request, if the bucket-level security posture metadata indicates that the receiving cloud destination is not a secured location against the security policy.

In one implementation, the computer-implemented method further includes the network security system blocking one or more parts of incoming request where the parts of incoming request involves at least one sensitive object, if the bucket-level security posture metadata indicates that the receiving cloud destination is not a secured location.

In one implementation of the computer-implemented method, the receiving cloud destination is a secured location where the receiving cloud destination is configured to encrypt data at rest hosted therein.

In one implementation of the computer-implemented method, the receiving cloud destination is a secured location where the receiving cloud destination is configured to encrypt new objects added thereto.

In one implementation of the computer-implemented method, the receiving cloud destination is a secured location where the receiving cloud destination is configured not accessible by any unauthorized users.

In some implementations of the computer-implemented method, the data of the resource includes, e.g., a file, a folder, a node, a resource, or a cloud resource location itself (e.g., an Amazon S3 bucket, GCP bucket, or Azure blob).

In one implementation, the computer-implemented method further includes the network security system determining the sensitivity of the resource by generating a synthetic request with the resource identifier to retrieve the sensitivity metadata of the resource, and receiving a response to the synthetic request. The response supplies the sensitivity metadata of the resource.

In one implementation, the computer-implemented method further includes the network security system determining the sensitivity of the resource by conducting content sensitivity scan, e.g., using data loss prevention (DLP) analysis (e.g., text analysis, string or sub-string inspection) over the resource, and generate sensitivity metadata that specify whether the resource is sensitive or not.

In one implementation of the computer-implemented method, the generated sensitivity metadata is stored as the resource metadata of the resource (e.g., object metadata, bucket metadata, or blob metadata).

In one implementation of the computer-implemented method, the generated sensitivity metadata is stored in a cloud-based metadata store which the network security system has access to.

In one implementation, the computer-implemented method further includes the network security system determining the sensitivity of the resource by inferring from a previously generated sensitivity metadata stored in a cloud-based metadata store which the network security system has access to.

In one implementation of the computer-implemented method, the synthetic request is further configured to retrieve the bucket-level security posture metadata from a cloud-based metadata store which the network security system has access to.

In one implementation of the computer-implemented method, the security policy is attached to the resource (e.g., a bucket and an object), called resource-based policy.

Other implementations of the computer-implemented method disclosed herein can include a system including memory and one or more processors operable to execute instructions, stored in the memory, to perform the computer-implemented method described above. Yet other implementations of the computer-implemented method disclosed herein can include a non-transitory computer readable storage medium impressed with computer program instructions to enforce policies, the instructions, when executed on a processor, implement a method described above.

In yet another implementation, a non-transitory computer readable storage medium impressed with computer program instructions to enforce policies is described. The instructions, when executed on a processor, implement a method comprising a network security system receiving an incoming request from a client during an application session. The network security system is interposed between clients and cloud applications. The incoming request includes a resource identifier of a resource which resides at a transmitting cloud destination (i.e., a first cloud resource location, e.g., an amazon S3 bucket, GCP bucket or Azure blob) in a cloud application.

The method further includes the network security system analyzing the incoming request and identifying a receiving cloud destination (i.e., a second cloud resource location, e.g., an Amazon S3 bucket, GCP bucket or Azure blob).

The method further includes the network security system detecting the request attempting to execute an action causing content of the resource propagated from the transmitting cloud destination to the receiving cloud destination.

The method further includes the network security system determining whether the resource contains sensitive content or not (e.g., a sensitive object or link thereto).

If the resource contains sensitive content, the method further includes the network security system holding the incoming request, generating a synthetic request with the receiving cloud destination, injecting the synthetic request into the application session and transmitting the synthetic request to the cloud application, wherein the synthetic request is configured to retrieve bucket-level security posture metadata of the receiving cloud destination from the cloud application.

The method further includes the network security system receiving a response to the synthetic request from the cloud application. The response supplies the bucket-level security posture metadata, which is, individually or collectively, indicative the ownership of the receiving cloud destination.

The method further includes the network security system evaluating the retrieved bucket-level security posture metadata and enforcing a security policy on the incoming request.

In one implementation of the non-transitory computer readable storage medium, the action of the incoming request includes, e.g., moving, copying, backing up, cloning, and versioning the content of the resource.

In one implementation, the non-transitory computer readable storage medium further includes the network security system fulfilling the incoming request, if the bucket-level security posture metadata indicates that the receiving cloud destination is to be determined a secured location against the security policy.

In one implementation, the non-transitory computer readable storage medium further includes the network security system blocking the incoming request, if the bucket-level security posture metadata indicates that the receiving cloud destination is not a secured location against the security policy.

In one implementation, the non-transitory computer readable storage medium further includes the network security system blocking one or more parts of incoming request where the parts of incoming request involves at least one sensitive object, if the bucket-level security posture metadata indicates that the receiving cloud destination is not a secured location.

In one implementation of the non-transitory computer readable storage medium, the receiving cloud destination is a secured location where the receiving cloud destination is configured to encrypt data at rest hosted therein.

In one implementation of the non-transitory computer readable storage medium, the receiving cloud destination is a secured location where the receiving cloud destination is configured to encrypt new objects added thereto.

In one implementation of the non-transitory computer readable storage medium, the receiving cloud destination is a secured location where the receiving cloud destination is configured not accessible by any unauthorized users.

In some implementations of the non-transitory computer readable storage medium, the data of the resource includes, e.g., a file, a folder, a node, a resource, or a cloud resource location itself (e.g., an Amazon S3 bucket, GCP bucket, or Azure blob).

In one implementation, the non-transitory computer readable storage medium further includes the network security system determining the sensitivity of the resource by generating a synthetic request with the resource identifier to retrieve the sensitivity metadata of the resource and receiving a response to the synthetic request. The response supplies the sensitivity metadata of the resource.

In one implementation, the non-transitory computer readable storage medium further includes the network security system determining the sensitivity of the resource by conducting content sensitivity scan, e.g., using data loss prevention (DLP) analysis (e.g., text analysis, string or sub-string inspection) over the resource, and generate sensitivity metadata that specify whether the resource is sensitive or not.

In one implementation of the non-transitory computer readable storage medium, the generated sensitivity metadata is stored as the resource metadata of the resource (e.g., object metadata, bucket metadata, or blob metadata).

In one implementation of the non-transitory computer readable storage medium, the generated sensitivity metadata is stored in a cloud-based metadata store which the network security system has access to.

In one implementation, the non-transitory computer readable storage medium further includes the network security system determining the sensitivity of the resource by inferring from a previously generated sensitivity metadata stored in a cloud-based metadata store which the network security system has access to.

In one implementation of the non-transitory computer readable storage medium, the synthetic request is further configured to retrieve the bucket-level security posture metadata from a cloud-based metadata store which the network security system has access to.

In one implementation of the non-transitory computer readable storage medium, the security policy is attached to the resource (e.g., a bucket and an object), called resource-based policy.

Clauses

The technology disclosed, in particular, the clauses disclosed in this section, can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

What is claimed is:

1. A method, comprising:
receiving, at a network security system (NSS) interposed between client devices and cloud application servers, an incoming request from a client device of the client devices, wherein the incoming request is directed toward a resource hosted on a cloud application server of the cloud application servers;
holding, by the NSS, the incoming request;
generating, by the NSS, a synthetic request designed to retrieve information specifying a security posture of the resource from the cloud application server;
transmitting, by the NSS, the synthetic request to the cloud application server;
receiving, in response to the synthetic request at the NSS, information specifying the security posture of the resource; and
applying a policy to the incoming request based on the security posture of the resource.

2. The method of claim 1, wherein:
the incoming request identifies a resource identifier of the resource; and
the synthetic request identifies the resource using the resource identifier.

3. The method of claim 1, wherein the information specifying the security posture of the resource identifies at least one of:
whether the resource contains private content;
whether the resource contains sensitive content;
whether the resource is publicly accessible;
whether the resource is accessible by another resource that is publicly accessible;
whether the resource is accessible by another resource in a way that violates at least one set policy;
read access links to the resource by another resource;
write access links to the resource by another resource;
synchronization access links to the resource by another resource;
identity-based permissions associated with the resource;
resource-based permissions associated with the resource;
a number of roles that have access to the resource;
a number of workloads that have access to the resource;
a measure of sensitive content in the resource;
whether the resource is externally accessible via an access control list (ACL);

whether the resource is unrestrictedly accessible via all ports of the cloud application server;
whether the resource is accessible from outside a geographic region;
whether the resource is anonymously accessible;
whether a secure shell protocol (SSH) port to the resource is open;
whether a multi-factor authentication access to the resource is activated;
whether a preferred configuration of the resource is detected;
whether the resource is encrypted;
whether the resource is located at a controlled location;
an ownership of the resource; and
a location of the resource.

4. The method of claim 1, wherein the resource is a compute resource.

5. The method of claim 1, wherein the resource is a storage resource.

6. The method of claim 1, wherein the information comprises a resource tag or metadata.

7. The method of claim 1, further comprising:
storing, by the NSS, the information specifying the security posture in local storage.

8. The method of claim 7, further comprising:
receiving, by the NSS, a second incoming request that shares an application session with the incoming request;
identifying the security posture of the resource from the local storage; and
applying one or more policies to the second incoming request based on the security posture without generating further synthetic requests during the application session.

9. The method of claim 1, further comprising:
blocking, by the NSS, the incoming request based on determining the security posture of the resource violates the policy.

10. The method of claim 1, further comprising:
transmitting, by the NSS, the incoming request to the cloud application server based on determining the security posture of the resource conforms to the policy.

11. A network security system (NSS) interposed between client devices and cloud application servers, the NSS comprising:
one or more processors; and
a memory having stored thereon instructions that, upon execution by the one or more processors, cause the one or more processors to:
receive an incoming request from a client device of the client devices, wherein the incoming request is directed toward a resource hosted on a cloud application server of the cloud application servers;
hold the incoming request;
generate a synthetic request designed to retrieve information specifying a security posture of the resource from the cloud application server;
transmit the synthetic request to the cloud application server;
receive, in response to the synthetic request, information specifying the security posture of the resource; and
apply a policy to the incoming request based on the security posture of the resource.

12. The NSS of claim 11, wherein:
the incoming request identifies a resource identifier of the resource; and
the synthetic request identifies the resource using the resource identifier.

13. The NSS of claim 11 wherein the information specifying the security posture of the resource identifies at least one of:
whether the resource contains private content;
whether the resource contains sensitive content;
whether the resource is publicly accessible;
whether the resource is accessible by another resource that is publicly accessible;
whether the resource is accessible by another resource in a way that violates at least one set policy;
read access links to the resource by another resource;
write access links to the resource by another resource;
synchronization access links to the resource by another resource;
identity-based permissions associated with the resource;
resource-based permissions associated with the resource;
a number of roles that have access to the resource;
a number of workloads that have access to the resource;
a measure of sensitive content in the resource;
whether the resource is externally accessible via an access control list (ACL);
whether the resource is unrestrictedly accessible via all ports of the cloud application server;
whether the resource is accessible from outside a geographic region;
whether the resource is anonymously accessible;
whether a secure shell protocol (SSH) port to the resource is open;
whether a multi-factor authentication access to the resource is activated;
whether a preferred configuration of the resource is detected;
whether the resource is encrypted;
whether the resource is located at a controlled location;
an ownership of the resource; and
a location of the resource.

14. The NSS of claim 11, wherein the resource is a compute resource.

15. The NSS of claim 11, wherein the resource is a storage resource.

16. The NSS of claim 11, wherein the information comprises a resource tag or metadata.

17. The NSS of claim 11, wherein the instructions comprise further instructions that, upon execution by the one or more processors, cause the one or more processors to: store the information specifying the security posture in local storage.

18. The NSS of claim 17, wherein the instructions comprise further instructions that, upon execution by the one or more processors, cause the one or more processors to:
receive a second incoming request that shares an application session with the incoming request;
identify the security posture of the resource from the local storage; and
apply one or more policies to the second incoming request based on the security posture without generating further synthetic requests during the application session.

19. The NSS of claim 11, wherein the instructions comprise further instructions that, upon execution by the one or more processors, cause the one or more processors to:
block the incoming request based on determining the security posture of the resource violates the policy.

20. The NSS of claim 11, wherein the instructions comprise further instructions that, upon execution by the one or more processors, cause the one or more processors to:

transmit the incoming request to the cloud application server based on determining the security policy of the resource conforms to the policy.

* * * * *